US010089592B2

(12) United States Patent
Orlowski

(10) Patent No.: US 10,089,592 B2
(45) Date of Patent: Oct. 2, 2018

(54) MEASURING VIDEO ASSET VIEWING

(75) Inventor: Robert Alan Orlowski, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/360,704

(22) Filed: Jan. 28, 2012

(65) Prior Publication Data

US 2014/0351835 A1 Nov. 27, 2014
US 2017/0169384 A9 Jun. 15, 2017

Related U.S. Application Data

(63) Continuation-in-part of application No. 12/981,301, filed on Dec. 29, 2010, now Pat. No. 8,365,212.

(51) Int. Cl.
*H04H 60/33* (2008.01)
*H04N 7/16* (2011.01)
(Continued)

(52) U.S. Cl.
CPC ......... *G06Q 10/08* (2013.01); *H04N 21/4532* (2013.01); *H04N 21/812* (2013.01);
(Continued)

(58) Field of Classification Search
CPC ............. H04N 21/4532; H04N 21/812; H04N 21/23424; H04N 21/4821; H04N 21/2668;
(Continued)

(56) References Cited

U.S. PATENT DOCUMENTS 5,374,951 A 12/1994 Welsh
5,790,935 A 8/1998 Payton
(Continued)

FOREIGN PATENT DOCUMENTS

CA 2860802 8/2014
CA 2861861 9/2014
(Continued)

OTHER PUBLICATIONS

Extended European Search Report—EP 14182927.5—dated Dec. 16, 2014.
(Continued)

*Primary Examiner* — Fred Peng
(74) *Attorney, Agent, or Firm* — Banner & Witcoff, Ltd.

(57) ABSTRACT

A computer-implemented method of using channel tuning data from a video asset viewing device connected to a network to measure video asset viewing at a second-by-second level during one or more user defined lead-in periods, and then correlating that with video asset viewing during a user defined target period, for the purpose of analyzing how viewing activity during the lead-in period(s) correlates with viewing activity during the target period, thus producing longitudinal viewing metrics; all while maintaining viewer anonymity. Additionally, viewing metrics can be categorized based on user defined demographic, geographic, and histogram groupings representing the percentage of video asset viewing with the result that the analyst is able to gain detailed insight into customer viewing behavior. The lead-in video asset may be any video asset or assets. The target may be any subsequent video asset. The metrics produced are useful to service providers, advertisers, and content producers.

34 Claims, 71 Drawing Sheets

(51) Int. Cl.

| | |
|---|---|
| ***H04H 60/32*** | (2008.01) |
| ***H04H 60/45*** | (2008.01) |
| ***H04H 60/56*** | (2008.01) |
| ***G06Q 10/08*** | (2012.01) |
| ***H04N 21/45*** | (2011.01) |
| ***H04N 21/81*** | (2011.01) |
| *H04N 21/234* | (2011.01) |
| *H04N 21/2668* | (2011.01) |
| *H04N 21/482* | (2011.01) |

(52) U.S. Cl.
CPC ... *H04N 21/23424* (2013.01); *H04N 21/2668* (2013.01); *H04N 21/4821* (2013.01)

(58) Field of Classification Search
CPC ........... H04N 21/2407; H04N 21/2665; H04N 21/25891; H04N 21/4316; H04N 21/6125
USPC ........................................................ 725/9–21
See application file for complete search history.

(56) References Cited

U.S. PATENT DOCUMENTS 5,872,588 A 2/1999 Aras et al.
6,286,005 B1 9/2001 Cannon
6,449,350 B1 9/2002 Cox
7,383,243 B2 6/2008 Conkwright et al.
7,490,045 B1 2/2009 Flores et al.
7,509,663 B2 3/2009 Maynard et al.
7,590,993 B1 9/2009 Hendricks et al.
7,614,064 B2 * 11/2009 Zigmond ............... H04H 60/31 725/13
7,729,940 B2 6/2010 Harvey et al.
8,001,561 B2 8/2011 Gibbs et al.
8,214,867 B2 7/2012 Hudspeth
8,280,996 B2 * 10/2012 Lu et al. ....................... 709/223
8,351,645 B2 * 1/2013 Srinivasan .................... 382/100
8,352,984 B2 1/2013 Gogoi et al.
8,365,212 B1 1/2013 Orlowski
8,365,213 B1 1/2013 Orlowski
8,453,173 B1 5/2013 Anderson et al.
8,548,991 B1 * 10/2013 Zamir ............... G06F 17/30867 707/723
8,949,873 B1 2/2015 Bayer et al.
8,959,540 B1 * 2/2015 Gargi ................... H04N 21/251 725/19
2002/0055854 A1 5/2002 Kurauchi et al.
2002/0059576 A1 5/2002 Feininger et al.
2002/0062393 A1 * 5/2002 Borger ................... G06Q 30/02 709/246
2002/0083451 A1 6/2002 Gill et al.
2002/0194196 A1 12/2002 Weinberg et al.
2003/0046696 A1 3/2003 Mizuno et al.
2003/0088715 A1 5/2003 Chaudhuri et al.
2003/0115585 A1 6/2003 Barsness et al.
2003/0172374 A1 9/2003 Vinson et al.
2004/0019899 A1 1/2004 Pelletier
2004/0215698 A1 10/2004 Bertin
2005/0086110 A1 * 4/2005 Haley .................... G06Q 30/02 705/14.52
2005/0229199 A1 10/2005 Yabe
2005/0235307 A1 10/2005 Relan et al.
2005/0286860 A1 * 12/2005 Conklin .......................... 386/46
2006/0015891 A1 1/2006 Lazzaro et al.
2006/0168609 A1 7/2006 Chen
2006/0184961 A1 * 8/2006 Lee et al. ........................ 725/32
2006/0223495 A1 10/2006 Cassett et al.
2007/0067794 A1 3/2007 Russell et al.
2007/0074258 A1 3/2007 Wood et al.
2007/0092204 A1 4/2007 Wagner et al.
2007/0157249 A1 * 7/2007 Cordray ................ G06F 3/0482 725/58
2007/0186228 A1 * 8/2007 Ramaswamy ......... H04H 60/37 725/14
2007/0214483 A1 9/2007 Bou-Abboud
2007/0283409 A1 12/2007 Golden
2007/0288950 A1 12/2007 Downey et al.
2008/0077951 A1 3/2008 Maggio et al.
2008/0127252 A1 5/2008 Eldering et al.
2009/0007171 A1 * 1/2009 Casey .................... G06Q 30/02 725/34
2009/0052864 A1 2/2009 Ohde
2009/0070798 A1 3/2009 Lee et al.
2009/0077577 A1 3/2009 Allegrezza et al.
2009/0077579 A1 3/2009 Li et al.
2009/0094630 A1 4/2009 Brown
2009/0100456 A1 4/2009 Hughes
2009/0133047 A1 5/2009 Lee et al.
2009/0150814 A1 6/2009 Eyer et al.
2009/0183210 A1 7/2009 Andrade
2009/0268905 A1 10/2009 Matsushima et al.
2009/0313232 A1 12/2009 Tinsley et al.
2009/0327208 A1 12/2009 Bittner et al.
2010/0145791 A1 6/2010 Canning et al.
2010/0161492 A1 6/2010 Harvey et al.
2010/0262986 A1 10/2010 Adimatyam et al.
2010/0330954 A1 12/2010 Manning Cassett et al.
2011/0072448 A1 3/2011 Stiers et al.
2011/0110515 A1 5/2011 Tidwell et al.
2011/0145847 A1 6/2011 Barve et al.
2011/0289524 A1 11/2011 Toner et al.
2012/0005527 A1 1/2012 Engel et al.
2012/0079518 A1 3/2012 Wan et al.
2012/0151511 A1 6/2012 Bernard et al.
2012/0191815 A1 7/2012 Tabbal et al.
2012/0222058 A1 8/2012 el Kaliouby et al.
2012/0240143 A1 9/2012 Mathews
2012/0278161 A1 11/2012 Lazzaro
2012/0278828 A1 11/2012 Yazdani et al.
2012/0296909 A1 11/2012 Cao et al.
2012/0304210 A1 11/2012 Zaslavsky et al.
2013/0007789 A1 1/2013 Wang et al.
2013/0024901 A1 1/2013 Sharif-Ahmadi et al.
2013/0124309 A1 * 5/2013 Traasdahl ............... H04L 67/22 705/14.49
2013/0145385 A1 6/2013 Aghajanyan et al.
2013/0283304 A1 10/2013 Wan et al.
2014/0075465 A1 3/2014 Petrovic et al.
2014/0109124 A1 4/2014 Morales et al.
2014/0150005 A1 5/2014 Kalmes et al.
2014/0181019 A1 6/2014 Bajaria et al.
2014/0359649 A1 12/2014 Cronk et al.

FOREIGN PATENT DOCUMENTS

CA 2864621 9/2014
CN 102236867 A 11/2011
EP 1995878 A2 11/2008
WO 2012162693 A1 11/2012
WO 2013033123 A2 3/2013

OTHER PUBLICATIONS

Extended European Search Report—EP 14183827.6—dated Oct. 23, 2014.
EP Office Action—EP App 14182927.5—dated Mar. 31, 2016.
U.S. Appl. No. 13/567,073, filed Aug. 5, 2012.
U.S. Appl. No. 13/740,199, filed Jan. 13, 2013.
U.S. Appl. No. 14/013,031, filed Aug. 29, 2013.
U.S. Appl. No. 14/020,778, filed Sep. 6, 2013.
U.S. Appl. No. 14/037,352, filed Sep. 25, 2013.
U.S. Appl. No. 14/608,929, filed Jan. 29, 2015.
U.S. Appl. No. 14/608,960, filed Jan. 29, 2015.
Response to European Search Report—EP 14183827.6—dated Sep. 10, 2015.
Response to European Search Report—EP Appl. 14182927.5—submitted Sep. 4, 2015.
Response to EP Search Report—EP 14186382.9—dated Sep. 29, 2015.
Konstantin Shvachko et al.: "The Hadoop Distributed File System", Mass Storage Systems and Technologies (MSST), 2010 IEEE 26th

(56) References Cited

OTHER PUBLICATIONS

Symposium on, IEEE, Piscataway, NJ, USA, May 3, 2010 (May 3, 2010), pp. 1-10, XP031698650, ISBN: 978-1-4244-7152-2.
Anonymous: "Apache Hadoop", Sep. 5, 2013 (Sep. 5, 2013), XP055394634, Retrieved from the Internet: URL: https://en.wikipedia.org/w/index.php?title=Apache_Hadoop&oldid=571641303 [retrieved on Jul. 28, 2017].
Aug. 4, 2017—(EP) Office Action—App No. 14183827.6.
Cisco Systems, Inc., "Channel Viewership Analyzer", Web page: http://www.cisco.com/en/US/prod/collateral/video/ps9119/ps9883/7016867.pdf, pp. 1-2 File: CISCO-ChannelViewershipAnalyzer.pdf.
Ineoquest Technologies, Inc., "Switched Digital Video Solutions", http://www.ineoquest.com/switched-digital-video-solutions, Dec. 28, 2010, pp. 1-2 File: IneoQuest-Switched-Digital-Video-Solutions.pdf.
Motorola, Inc., Solutions Paper, "Implementing Switched Digital Video Solutions" http://www.motorola.com/staticfiles/Business/Products/_Documents/_Static%20files/SDV%20Implementation%20Solutions%20paper%20-555998-001-a.pdf?localeId=33, Copyright 2008, p. 6 File: Motorola-SDV_Implementation_Solutions_paper_-555998-001-a.pdf.
Strickland, Jonathan, "How Switched Digital Video Works", Nov. 20, 2007. HowStuffWorks.com. <http://electronics.howstuffworks.com/switched-digital-video.htm>, pp. 1-4 File: HowSwitched-DigitalVideoWorks.pdf.
Rentrak Corporation, Television, TV Essentials, Web source: http://www.rentrak.com/section/media/tv/linear.html, Feb. 1, 2011, p. 1.
Wayne Friedman, Rentrak's 'Stickiness' Mines TV Value On Granular Level , MediaPost, Jan. 27, 2010, p. 1 of attached file Web source: http://www.tvb.org/media/file/TVB_Measurement_Rentraks_Stickiness_Mines_TV_Value_on_Granular_Level_1-27-10.pdf File: Rentraks_Stickiness_Mines_TV_Value_on_Granular_Level_1-27-10.pdf.
Rentrak Corporation, Reaching Your Target Audience Using Viewership Segments, Rentrak Case Studies http://rentrak.com/downloads/Viewership_Segment_Case_Study.pdf, Oct. 18, 2013, p. 1-2 C-1-Rentrak-Viewership_Segment_Case_Study.pdf www.rentrak.com.
Rentrak Corporation, Reaching Your Target Audience Using Commercial Ratings and Pod Analysis Rentrak Case Studies, http://www.rentrak.com/downloads/Commercial_and_Pod_Analysis_Case_Study.pdf Oct. 18, 2013, p. 1-2, C-2-Rentrak-Commercial_and_Pod_Analysis_Case_Study.pdf www.rentrak.com.
Rentrak Corporation, Rentrak Overview: Exact Commercial Ratings® http://www.rentrak.com/downloads/Exact_Commercial_Ratings_Presentation.pdf, Jan. 22, 2013, p. 1-30 File: C-Rentrak-Exact_Commercial_Ratings_Presentation.pdf www.rentrak.com.
Tim Brooks, Stu Gray, Jim Dennison, "The State of Set-Top Box Viewing Data as of Dec. 2009", STB Committee of the Council for Research Excellence. Research Report, Feb. 24, 2010, http://researchexcellence.com/stbstudy.php, pp. 1-9 File: A-STBCommitteeforResearchExcellenceSTBFINALREPORT_3_5_10.pdf.
FourthWall Media, Product information from web page, MassiveDataTM http://www.fourthwallmedia.tv, Oct. 18, 2013, p. 1 File: B-FourthWall-Media-MassiveData.pdf.
Cisco Systems, Inc., "Network Efficiency with Switched Digital", Web page: http://www.cisco.com/en/US/products/ps9258/index.html, accessed Oct. 13, 2014, 2 pages.
Cisco Systems, Inc., "Access Viewership Data, Monitor Performance", Web page: http://www.cisco.com/en/US/products/ps9122/index.html, accessed May 20, 2013, 1 page.
Welch T A: "A Technique for High-Performance Data Compression", Computer. IEEE. US, vol. 17. No. 6. Jun. 1, 1984 (Jun. 1, 1984), XP000673349.
Extended European Search Report, EP Application 14186382.9, dated Feb. 4, 2015.
May 22, 2017—European Office Action—EP 14183827.6.

* cited by examiner

Lead In Analysis Overview

FIG. 14-A

This is the detail of Part #110.

| | 1000 ? | 1002 ? | 1004 ? | 1006 ? |
|---|---|---|---|---|
| | **NAME** | **TYPE** | **SIZE** | **DESCRIPTION** |
| 1010~ | **MARKET** | CHAR | 4 | Identifier of market code in cable company's network hierarchy. |
| 1020~ | **SERVICE-GROUP** | CHAR | 6 | Not presently used:<br>Identifier of service group in cable company's network hierarchy. |
| 1030~ | **HUB** | CHAR | 4 | Not presently used:<br>Identifier of hub in cable company's network hierarchy. |
| 1040~ | **HEADEND** | CHAR | 4 | Not presently used:<br>Identifier of headend in cable company's network hierarchy. |
| 1050~ | **SET-TOP-BOX-ID** | CHAR | 20 | Unique identifier of set-top box.<br>May be provided in encrypted format.<br>Also known as video asset viewing device identifier. |
| 1060~ | **TUNER-INDEX** | CHAR | 1 | Not presently used:<br>Identifies which tuner on the set-top box (device) performed the channel change. Typically:<br>0 = primary tuner; 1 = secondary tuner |
| 1070~ | **CHANNEL-CALL-SIGN** | CHAR | 6 | Channel call sign or short name of the channel. |
| 1080~ | **CHANNEL-SOURCE-ID** | CHAR | 5 | Not presently used:<br>Channel source id which is a numeric identifier of the channel. |
| 1090~ | **TUNE-IN-DATE** | CHAR | 10 | Tune-in date.<br>Format is:<br>YYYY-MM-DD |
| 1100~ | **TUNE-IN-TIME** | CHAR | 8 | Tune-in time. Time when the device tuned to the channel.<br>Format is:<br>HH:MM:SS |
| 1110~ | **TUNE-IN-AM-PM** | CHAR | 2 | Tune-in AM/PM indicator.<br>Format is:<br>AM<br>PM |

FIG. 14-A – Continued

| | | | | |
|---|---|---|---|---|
| 1120~ | TUNE-IN-SECOND-OF-DAY | NUMBER | 5 | Tune-in time in seconds of day since midnight. |
| 1130~ | TUNE-OUT-DATE | CHAR | 10 | Tune-out date.<br>Format is:<br>YYYY-MM-DD |
| 1140~ | TUNE-OUT-TIME | CHAR | 8 | Tune-out time. Time when the device tuned away from the channel.<br>Format is:<br>HH:MM:SS |
| 1150~ | TUNE-OUT-AM-PM | CHAR | 2 | Tune-out AM/PM indicator.<br>Format is:<br>AM<br>PM |
| 1160~ | TUNE-OUT-SECOND-OF-DAY | NUMBER | 5 | Tune-out time in seconds of day since midnight. |
| 1170~ | BIT-RATE | CHAR | 5 | Not presently used:<br>Bit rate identifies the rate in megabits per second required to deliver the channel. Used in capacity calculations. Typical format:<br>3.75 for standard definition<br>15 for high definition |
| 1180~ | SDV-OR-BROADCAST-CODE | CHAR | 3 | Not presently used:<br>Identifies whether the channel being tuned to is a broadcast channel or a switched channel in a switched digital video configuration. |
| 1190~ | HIGH-DEF-OR-STD-DEF | CHAR | 2 | Not presently used:<br>High definition or standard definition code. |
| 1200~ | PROGRAM-ATTRIBUTE-1 | CHAR | 6 | Not presently used:<br>Identifies a first attribute of the program playing during the tuning event. |
| 1210~ | PROGRAM-ATTRIBUTE-2 | CHAR | 6 | Not presently used:<br>Identifies a second attribute of the program playing during the tuning event. |

FIG. 14-A – Continued

| | | | | |
|---|---|---|---|---|
| 1220~ | DEMOGRAPHIC-CODE | CHAR | 6 | Records the demographic codes which describes the operator (user, customer) of the Set top Box (video asset viewing device). Typical values: CHILD, TEEN, ADULT, SENIOR |
| 1230~ | GEOGRAPHIC-CODE | CHAR | 6 | Records the geographic code which describes the geographic location of the Set Top Box (video asset viewing device). This can be a zip code, an Ad Zone, a census tract, etc. |

FIG. 14-B

The sample data in FIG 14-B may not match the sample data in FIG 14-C.

```
1003
DENVSG01   HUB1HE1 MAC-03               1ABC
0010209/01/201012:00:00AM0000009/01/201012:14:59AM0089900375B   SDNEWS
G23456DEMO01GEOG01

1005
DENVSG01   HUB1HE1 MAC-03               2CBS
0010309/01/201012:15:00AM0090009/01/201012:15:59AM0095900375B   SDNEWS
G23456DEMO01GEOG01
```

FIG. 14-C

| | 1000 ? | 1003 ? | 1005 ? |
|---|---|---|---|
| | NAME | Record 1 | Record 2 |
| 1010~ | MARKET | DENV | BOST |
| 1020~ | SERVICE-GROUP | SG-01 | SG-05 |
| 1030~ | HUB | HUB1 | HUB2 |
| 1040~ | HEADEND | HE01 | HE02 |
| 1050~ | SET-TOP-BOX-ID | 00:01:02:03:04:05 | 00:AB:02:CD:04:EF |
| 1060~ | TUNER-INDEX | 0 | 1 |
| 1070~ | CHANNEL-CALL-SIGN | FOX | DISC |
| 1080~ | CHANNEL-SOURCE-ID | 201 | 305 |
| 1090~ | TUNE-IN-DATE | 2010-06-01 | 2010-06-01 |
| 1100~ | TUNE-IN-TIME | 07:02:03 | 05:13:03 |
| 1110~ | TUNE-IN-AM-PM | AM | PM |
| 1120~ | TUNE-IN-SECOND-OF-DAY | 25323 | 18783 |
| 1130~ | TUNE-OUT-DATE | 2010-06-01 | 2010-06-01 |
| 1140~ | TUNE-OUT-TIME | 07:29:44 | 05:25:08 |
| 1150~ | TUNE-OUT-AM-PM | AM | PM |
| 1160~ | TUNE-OUT-SECOND-OF-DAY | 26984 | 19508 |
| 1170~ | BIT-RATE | 3.75 | 15 |
| 1180~ | SDV-OR-BROADCAST-CODE | SDV | B |
| 1190~ | HIGH-DEF-OR-STD-DEF | SD | HD |
| 1200~ | PROGRAM-ATTRIBUTE-1 | | |
| 1210~ | PROGRAM-ATTRIBUTE-2 | | |
| 1220~ | DEMOGRAPHIC-CODE | ADULT | TEEN |
| 1230~ | GEOGRAPHIC-CODE | 80201 | 80301 |

FIG. 15-A

This is the detail of Part #120.

| | 1300 NAME | 1302 TYPE | 1304 SIZE | 1306 DESCRIPTION |
|---|---|---|---|---|
| 1310~ | AGI-ANALYSIS-GROUP-ID | CHAR | 12 | Identifier of the Analysis Group that is used to provide an overall identifier for this study. This groups together the various lead-in periods and result periods. |
| 1320~ | ANALYSIS-GROUP-MARKET | CHAR | 4 | Identifier of market in cable company's network hierarchy. The analysis will typically correspond to a market such as a metropolitan area. |
| 1330~ | ANALYSIS-GROUP-DESC | CHAR | 50 | A textual description of the Analysis Group. |
| 1340~ | POTENTIAL-VIEWING-SECONDS | NUMBER | 5 | Records the total available viewing seconds that one set top box (video asset viewing device) could attain if it was tuned in to all of the lead-in periods defined for this analysis group. Example: If there were 20 lead-in periods representing 20 ads promoting an upcoming program and each was 30 seconds in duration, this would be 20*30 = 600. |
| 1350~ | POTENTIAL-EXPOSURES | NUMBER | 5 | Records the number of different times that a set top box (video asset viewing device) could be exposed to the content in this Analysis Group if it was tuned in to all of the lead-in periods defined for this analysis group. Example: If there were 20 lead-in periods representing 20 ads promoting an upcoming program, this would be 20. |

Record 1:

AG-test-001 |DENV|Description of Analysis Group AG-test-001 |00120|002|

FIG. 15-C

| | 1300 | **1303** |
|---|---|---|
| | **NAME** | **Record 1** |
| 1310~ | **AGI-ANALYSIS-GROUP-ID** | AG-test-001 |
| 1320~ | **ANALYSIS-GROUP-MARKET** | DENV |
| 1330~ | **ANALYSIS-GROUP-DESC** | Description of Analysis Group AG-test-001 |
| 1340~ | **POTENTIAL-VIEWING-SECONDS** | 00120 |
| 1350~ | **POTENTIAL-EXPOSURES** | 002 |

FIG. 16-A

This is the detail of Part #130.

| | 1400 NAME | 1402 TYPE | 1404 SIZE | 1406 DESCRIPTION |
|---|---|---|---|---|
| 1410 | VP-ANALYSIS-GROUP-ID | CHAR | 12 | Identifier of the Analysis Group that is used to provide an overall identifier for this study. This value is used to link this Lead-in Video Play Info back to the Analysis Group Info. |
| 1420 | LEAD-ANALYSIS-PERIOD-ID | CHAR | 20 | Identifier of the Analysis Lead-in period which is used to provide an overall identifier for the data associated with this Lead-in period. This groups together the various lead-in results that record the viewing activity during this Lead-in period. |
| 1430 | LEAD-CHANNEL-CALL-SIGN | CHAR | 6 | Records the Channel on which the Lead-in video Asset played or aired. |
| 1440 | LEAD-VIDEO-PLAY-DATE | DATE | 10 | Records the Date on which the Lead-in video Asset played. |
| 1450 | LEAD-VIDEO-PLAY-BEG-TIME | TIME | 11 | Records the Time when the Lead-in video Asset began to play represented in HH:MI:SS AM format. |
| 1460 | LEAD-VIDEO-PLAY-BEG-SEC-OF-DAY | NUMBER | 5 | Records the Time when the Lead-in video Asset began to play represented as seconds since midnight. |
| 1470 | LEAD-VIDEO-PLAY-END-TIME | TIME | 11 | Records the End Time of when the Lead-in video Asset finished playing represented in HH:MI:SS AM format. |
| 1480 | LEAD-VIDEO-PLAY-END-SEC-OF-DAY | NUMBER | 5 | Records the Time when the Lead-in video Asset finished playing represented as seconds since midnight. |
| 1490 | LEAD-VIDEO-DURATION-SECS | NUMBER | 5 | Records the duration of the Lead-in Video Asset in seconds. |

FIG. 16-A – Continued

| | | | | |
|---|---|---|---|---|
| 1500~ | **LEAD-SECS-FOR-EXPOSURE** | NUMBER | 5 | Records the minimum number of viewing seconds that the set-top box (device) must be tuned for in order to count the lead-in viewing as an exposure. Example: The STB must be tuned for the first 20 seconds or the first 300 seconds. |
| 1510~ | **LEAD-INDUSTRY-PROGRAM-ID** | CHAR | 20 | Records the Industry Program Id that has been assigned to this Lead-in video, if applicable. |
| 1520~ | **LEAD-INDUSTRY-ASSET-ID** | CHAR | 20 | Records the Industry Asset Id that has been assigned to this Lead-in video, if applicable. |
| 1530~ | **LEAD-VIDEO-DESC** | CHAR | 50 | Records a description for this Lead-in video. |

Record 1:

AG-test-001 |Anal Period test-001|ABC |09/01/2010|12:00:00 AM|00000|12:00:59 AM|00059|00060|Ind program id 1|00015|Ind asset id 1|This is a Program description 1|

1405

Record 2:

AG-test-001 |Anal Period test-002|ABC |09/01/2010|12:04:00 AM|00240|12:04:59 AM|00299|00060|Ind program id 2|00020|Ind asset id 2|This is a Program description 2|

FIG. 16-C

| | 1400 NAME | 1403 Record 1 | 1405 Record 2 |
|---|---|---|---|
| 1410~ | VP-ANALYSIS-GROUP-ID | AG-test-001 | AG-test-001 |
| 1420~ | LEAD-ANALYSIS-PERIOD-ID | Anal Period test-001 | Anal Period test-002 |
| 1430~ | LEAD-CHANNEL-CALL-SIGN | ABC | ABC |
| 1440~ | LEAD-VIDEO-PLAY-DATE | 09/01/2010 | 09/01/2010 |
| 1450~ | LEAD-VIDEO-PLAY-BEG-TIME | 12:00:00 AM | 12:04:00 AM |
| 1460~ | LEAD-VIDEO-PLAY-BEG-SEC-OF-DAY | 00000 | 00240 |
| 1470~ | LEAD-VIDEO-PLAY-END-TIME | 12:00:59 AM | 12:04:59 AM |
| 1480~ | LEAD-VIDEO-PLAY-END-SEC-OF-DAY | 00059 | 00299 |
| 1490~ | LEAD-VIDEO-DURATION-SECS | 00060 | 00060 |
| 1500~ | LEAD-IN-SECS-FOR-EXPOSURE | 00015 | 00020 |
| 1510~ | LEAD-INDUSTRY-PROGRAM-ID | Ind program id 1 | Ind program id 2 |
| 1520~ | LEAD-INDUSTRY-ASSET-ID | Ind asset id 1 | Ind asset id 2 |
| 1530~ | LEAD-VIDEO-DESC | This is a Program description 1 | This is a Program description 2 |

FIG. 17-A

This is the detail of Part #140.

| | 1600 | 1602 | 1604 | 1606 |
|---|---|---|---|---|
| | NAME | TYPE | SIZE | DESCRIPTION |
| 1610~ | LEAD-IN-DEMOGRAPHIC-CODE | CHAR | 6 | Identifier of the demographic code used in the grouping. Example: MWC for married with children |
| 1620~ | LEAD-IN-DEMOGRAPHIC-DESC | CHAR | 30 | Description of the demographic code used in the grouping. |
| 1630~ | LEAD-IN-GEOGRAPHIC-CODE | NUMBER | 6 | Identifier of the geographic code used in the grouping. Example: AZ01 for Ad Zone 01 |
| 1640~ | LEAD-IN-GEOGRAPHIC-DESC | CHAR | 30 | Description of the geographic code used in the grouping. |
| 1650~ | LEAD-IN-HISTOGRAM-INDEX | NUMBER | 2 | Identifier of the histogram index used in the grouping. Example:<br>01<br>02<br>03 |
| 1660~ | LEAD-IN-HISTOGRAM-BUCKET-NAME | CHAR | 20 | Name assigned to the histogram bucket. Example: 1-50 percent |
| 1670~ | LEAD-IN-HISTOGRAM-BEG-PCT | NUMBER | 3 | Beginning percent of this histogram bucket. Example:<br>001 for 1 percent. |
| 1680~ | LEAD-IN-HISTOGRAM-END-PCT | NUMBER | 3 | Ending percent of this histogram bucket. Example:<br>050 for 50 percent. |

Record 1:

DEMO01|Demographic Code 01 Lead in |GEOG01|Geographic Code 01 Lead in|01|Histogram 000-015 |001|015|

1605

Record 2:

DEMO01|Demographic Code 01 Lead in x|GEOG01|Geographic Code 01 Lead in|02|Histogram 016-050 x|016|050|

FIG. 17-C

| | 1600 | 1603 | 1605 |
|---|---|---|---|
| | **NAME** | **Record 1** | **Record 2** |
| 1610~ | LEAD-IN-DEMOGRAPHIC-CODE | DEMO01 | DEMO01 |
| 1620~ | LEAD-IN-DEMOGRAPHIC-DESC | Demographic Code 01 Lead in | Demographic Code 01 Lead in |
| 1630~ | LEAD-IN-GEOGRAPHIC-CODE | GEOG01 | GEOG01 |
| 1640~ | LEAD-IN-GEOGRAPHIC-DESC | Geographic Code 01 Lead in | Geographic Code 01 Lead in |
| 1650~ | LEAD-IN-HISTOGRAM-INDEX | 01 | 01 |
| 1660~ | LEAD-IN-HISTOGRAM-BUCKET-NAME | Histogram 000-015 | Histogram 016-050 |
| 1670~ | LEAD-IN-HISTOGRAM-BEG-PCT | 001 | 016 |
| 1680~ | LEAD-IN-HISTOGRAM-END-PCT | 015 | 050 |

FIG. 18-A

This is the detail of Part #150.

| | NAME (1800) | TYPE (1802) | SIZE (1804) | DESCRIPTION (1806) |
|---|---|---|---|---|
| 1810~ | AP-DEF-ANALYSIS-GROUP-ID | CHAR | 12 | Identifier of the Analysis Group that is used to provide an overall identifier for this study. This value is used to link this Analysis Period Info back to the Analysis Group Info. |
| 1820~ | AP-TRG-CHANNEL | CHAR | 6 | Target Channel records the channel on which the target video played. |
| 1830~ | AP-POTENTIAL-VIEWING-SECOND | NUMBER | 5 | Potential Viewing Seconds record the number of viewing seconds that a Set top box (device) could get if it viewed the entire target video. This is the sum of the potential viewing seconds from all of the target segments. |
| 1840~ | AP-POTENTIAL-EXPOSURES | NUMBER | 3 | Potential Exposures records the number of exposures that a set top box (device) could get if it viewed each segment of the target video. The is the number of viewing segments. |
| 1850~ | AP-TARGET-INDUSTRY-VIDEO-PROGRAM-ID | CHAR | 20 | Target Industry Video Program Id records the industry program id assigned to this target video. |
| 1860~ | AP-TARGET-INDUSTRY-VIDEO-ASSET-ID | CHAR | 20 | Target Industry Video Asset Id records the industry asset id assigned to this target video. |
| 1870~ | AP-TRG-AIRING-DATE | DATE | 10 | Target Airing Date records the date when this video asset played. |
| 1880~ | AP-TRG-AIRING-BEG-TIME | TIME | 11 | Target Airing Begin Time Records the Time when the Target Video Asset began to play represented in HH:MI:SS AM format. |
| 1890~ | AP-TRG-AIRNG-BEG-SEC-OF-DAY | NUMBER | 5 | Target Airing Begin Second of Day records the Time when the Target Video Asset began to play represented as seconds since midnight. |

FIG. 18-A – Continued

| | | | | |
|---|---|---|---|---|
| 1900~ | **AP-TRG-AIRING-END-TIME** | TIME | 11 | Target Airing End Time Records the Time when the Target Video Asset finished playing represented in HH:MI:SS AM format. If there are multiple segments defined, this is the end time of the last segment. |
| 1910~ | **AP-TRG-AIRNG-END-SEC-OF-DAY** | NUMBER | 5 | Target Airing End Second of Day records the Time when the Target Video Asset finished playing represented as seconds since midnight. If there are multiple segments defined, this is the end time of the last segment. |
| 1920~ | **AP-TRG-MIN-SECS-VW-AT-START** | NUMBER | 5 | Target Minimum seconds viewed at Start records the minimum number of seconds that the Set top box (device) must be tuned to the video at the start in order for this to be counted as an exposure. |

Record 1:

AG-test-001 |ABC |00600|001|Target Pgm Id 001 x|Target Asset Id 001x|09/01/2010|12:05:00 AM|00300|12:14:59 AM|00899|00015|

FIG. 18-C

| | 1800 NAME | 1803 Record 1 |
|---|---|---|
| 1810~ | AP-DEF-ANALYSIS-GROUP-ID | AG-test-001 |
| 1820~ | AP-TRG-CHANNEL | ABC |
| 1830~ | AP-POTENTIAL-VIEWING-SECOND | 00600 |
| 1840~ | AP-POTENTIAL-EXPOSURES | 001 |
| 1850~ | AP-TARGET-INDUSTRY-VIDEO-PROGRAM-ID | Target Pgm Id 001 |
| 1860~ | AP-TARGET-INDUSTRY-VIDEO-ASSET-ID | Target Asset Id 001 |
| 1870~ | AP-TRG-AIRING-DATE | 09/01/2010 |
| 1880~ | AP-TRG-AIRING-BEG-TIME | 12:05:00 AM |
| 1890~ | AP-TRG-AIRNG-BEG-SEC-OF-DAY | 00300 |
| 1900~ | AP-TRG-AIRING-END-TIME | 12:14:59 AM |
| 1910~ | AP-TRG-AIRNG-END-SEC-OF-DAY | 00899 |
| 1920~ | AP-TRG-MIN-SECS-VW-AT-START | 00015 |

FIG. 19-A

This is the detail of Part #160.

| | 2000 NAME | 2002 TYPE | 2004 SIZE | 2006 DESCRIPTION |
|---|---|---|---|---|
| 2010~ | APD-DEF-ANALYSIS-GROUP-ID | CHAR | 12 | Identifier of the Analysis Group that is used to provide an overall identifier for this study. This value is used to link this Analysis Period Definition Info back to the Analysis Group Info. |
| 2020~ | AP-DEF-DATE | DATE | 10 | Records the Date on which the Target video Asset played. |
| 2030~ | AP-DEF-BEG-TIME-HH-MM-SS | TIME | 11 | Records the beginning Time of an Analysis period in the Target asset with the time represented in HH:MI:SS AM format. |

FIG. 19-A - Continued

| | | | | |
|---|---|---|---|---|
| 2040~ | AP-DEF-BEG-TIME-SEC-OF-DAY | NUMBER | 5 | Records the beginning Time of an Analysis period in the Target asset with the time represented as seconds since midnight. |
| 2050~ | AP-DEF-END-TIME-HH-MM-SS | TIME | 11 | Records the ending Time of an Analysis period in the Target asset with the time represented in HH:MI:SS AM format. |
| 2060~ | AP-DEF-END-TIME-SEC-OF-DAY | NUMBER | 5 | Records the ending Time of an Analysis period in the Target asset with the time represented as seconds since midnight. |

Record 1:

AG-test-001 |09/01/2010|12:05:00 AM|00300|12:14:59 AM|00899|

FIG. 19-C

| | 2000 | 2003 |
|---|---|---|
| | NAME | Record 1 |
| 2010~ | APD-DEF-ANALYSIS-GROUP-ID | AG-test-001 |
| 2020~ | AP-DEF-DATE | 09/01/2010 |
| 2030~ | AP-DEF-BEG-TIME-HH-MM-SS | 12:05:00 AM |
| 2040~ | AP-DEF-BEG-TIME-SEC-OF-DAY | 00300 |
| 2050~ | AP-DEF-END-TIME-HH-MM-SS | 12:14:59 AM |
| 2060~ | AP-DEF-END-TIME-SEC-OF-DAY | 00899 |

FIG. 20-A

This is the detail of Part #170.

| | 2200 NAME | 2202 TYPE | 2204 SIZE | 2206 DESCRIPTION |
|---|---|---|---|---|
| 2210 | RESULT-DEMOGRAPHIC-CODE | CHAR | 6 | Identifier of the demographic code used in the grouping. Example: MWC for married with children. |
| 2220 | RESULT-DEMOGRAPHIC-DESC | CHAR | 30 | Description of the demographic code used in the grouping. |
| 2230 | RESULT-GEOGRAPHIC-CODE | NUMBER | 6 | Identifier of the geographic code used in the grouping. Example: AZ01 for Ad Zone 01 |
| 2240 | RESULT-GEOGRAPHIC-DESC | CHAR | 30 | Description of the geographic code used in the grouping. |
| 2250 | RESULT-HISTOGRAM-INDEX | NUMBER | 2 | Identifier of the histogram index used in the grouping. Example:<br>01<br>02<br>03 |
| 2260 | RESULT-HISTOGRAM-BUCKET-NAME | CHAR | 20 | Name assigned to the histogram bucket. Example: 1-50 percent |
| 2270 | RESULT-HISTOGRAM-BEG-PCT | NUMBER | 3 | Beginning percent of this histogrambucket. Example: 001 for 1 percent. |
| 2280 | RESULT-HISTOGRAM-END-PCT | NUMBER | 3 | Ending percent of this histogrambucket. Example: 050 for 50 percent. |

Record 1:

DEMO01|Demographic Code 01 Result |GEOG01|Geographic Code 01 |01|Histogram 000-100 x|001|025|

2205

Record 2:

DEMO01|Demographic Code 01 Result x|GEOG01|Geographic Code 01 x|02|Histogram 000-100 x|026|050|

FIG. 20-C

| | 2200 | 2203 | 2205 |
|---|---|---|---|
| | **NAME** | **Record 1** | **Record 2** |
| 2210~ | **RESULT-DEMOGRAPHIC-CODE** | DEMO01 | DEMO01 |
| 2220~ | **RESULT-DEMOGRAPHIC-DESC** | Demographic Code 01 Result | Demographic Code 01 Result |
| 2230~ | **RESULT-GEOGRAPHIC-CODE** | GEOG01 | GEOG01 |
| 2240~ | **RESULT-GEOGRAPHIC-DESC** | Geographic Code 01 | Geographic Code 01 |
| 2250~ | **RESULT-HISTOGRAM-INDEX** | 01 | 02 |
| 2260~ | **RESULT-HISTOGRAM-BUCKET-NAME** | Histogram 001-025 | Histogram 026-050 |
| 2270~ | **RESULT-HISTOGRAM-BEG-PCT** | 001 | 026 |
| 2280~ | **RESULT-HISTOGRAM-END-PCT** | 025 | 050 |

FIG. 21-A

This is the detail of Part #180.

| | 2400 NAME | 2402 TYPE | 2404 SIZE | 2406 DESCRIPTION |
|---|---|---|---|---|
| 2410~ | CHANNEL-CALL-SIGN | CHAR | 6 | Channel Call Sign identifies a channel for which the Lead-in Analytics Engine will track viewing during the target period. |
| 2420~ | CHANNEL-CALL-SIGN-NAME | CHAR | 30 | Channel Call Sign Name records the name associated with the Channel Call Sign. |

FIG. 21-B
2403
Record 1:
ABC |Channel ABC |

2405
Record 2:
CBS |Channel CBS |

FIG. 21-C

| | 2400 NAME | 2403 Record 1 | 2405 Record 2 |
|---|---|---|---|
| 2410~ | CHANNEL-CALL-SIGN | ABC | CBS |
| 2420~ | CHANNEL-CALL-SIGN-NAME | Channel ABC | Channel CBS |

FIG. 22-A

This is the detail of Part #190.

| | 2500 | 2502 | 2504 | 2506 |
|---|---|---|---|---|
| | **NAME** | **TYPE** | **SIZE** | **DESCRIPTION** |
| 2510~ | TUNING-DATA-DATE | DATE | 10 | Tuning Data Date identifes one or more dates in the tuning data file for which the Lead-in Analytics Engine will process the channel tuning data. |

FIG. 22-B

2503
Record 1:
09/01/2010

2505
Record 2:
09/02/2010

FIG. 22-C

| | 2500 | 2503 | 2505 |
|---|---|---|---|
| | **NAME** | **Record 1** | **Record 2** |
| 2510~ | TUNING-DATA-DATE | 09/01/2010 | 09/02/2010 |

FIG. 23-A

This is the detail of Part 210.

| | 3000 NAME | 3002 TYPE | 3004 SIZE | 3006 DESCRIPTION |
|---|---|---|---|---|
| 3010~ | ANALYSIS-GROUP-ID | CHAR | 12 | Identifier of the Analysis Group that is used to provide an overall identifier for this study. This groups together the various lead-in periods and result periods. |
| 3020~ | ANALYSIS-GROUP-MARKET | CHAR | 4 | Identifier of market in cable company's network hierarchy. The analysis will typically correspond to a market such as a metropolitan area. |
| 3030~ | ANALYSIS-GROUP-DESC | CHAR | 50 | A textual description of the Analysis Group. |
| 3040~ | POTENTIAL-VIEWING-SECONDS | NUMBER | 5 | Records the total available viewing seconds that one set top box (device) could attain if it was tuned in to all of the lead-in periods defined for this analysis group. Example: If there were 20 lead-in periods representing 20 ads promoting an upcoming program and each was 30 seconds in duration, this would be 20*30 = 600. |
| 3050~ | POTENTIAL-EXPOSURES | NUMBER | 5 | Records the number of different times that a set top box (device) could be exposed to the content in this Analysis Group if it was tuned in to all of the lead-in periods defined for this analysis group. Example: If there were 20 lead-in periods representing 20 ads promoting an upcoming program, this would be 20. |

FIG. 23-A - Continued

| | | | | |
|---|---|---|---|---|
| 3060~ | AGGREGATE-VIEWING-ALL-STB | NUMBER | 12 | Aggregate Viewing All Set Top Boxes is a count of the total viewing seconds from all the set top boxes (devices) during all the Lead-in periods. |
| 3070~ | AGGREGATE-EXPOSURES-ALL-STB | NUMBER | 2 | Aggregate Exposures All Set Top Boxes is a count of the total exposures from all the set top boxes (devices) during all the Lead-in periods. |

FIG. 23-B
3003

```
AG-test-001 |DENV|Description of Analysis Group AG-test-001
120|  2|        150|          3|
```

FIG. 23-C

| | 3000 | 3003 |
|---|---|---|
| | NAME | Record 1 |
| 3010~ | ANALYSIS-GROUP-ID | AG-test-001 |
| 3020~ | ANALYSIS-GROUP-MARKET | DENV |
| 3030~ | ANALYSIS-GROUP-DESC | Description of Analysis Group AG-test-001 |
| 3040~ | POTENTIAL-VIEWING-SECONDS | 00120 |
| 3050~ | POTENTIAL-EXPOSURES | 002 |
| 3060~ | AGGREGATE-VIEWING-ALL-STB | 150 |
| 3070~ | AGGREGATE-EXPOSURESS-ALL-STB | 3 |

FIG. 24-A

This is the detail of Part 220.

| | 3100 NAME | 3102 TYPE | 3104 SIZE | 3106 DESCRIPTION |
|---|---|---|---|---|
| 3105~ | ANALYSIS-GROUP-ID | CHAR | 12 | Identifier of the Analysis Group that is used to provide an overall identifier for this study. This value is used to link this Lead-in Video Play Info back to the Analysis Group Info. |
| 3110~ | ANALYSIS-PERIOD-ID | CHAR | 20 | Identifier of the Analysis Lead-in period which is used to provide an overall identifier for the data associated with this Lead-in period. This groups together the various lead-in results that record the viewing activity during this Lead-in period. |
| 3115~ | CHANNEL-CALL-SIGN | CHAR | 6 | Records the Channel on which the Lead-in video Asset played. |
| 3120~ | VIDEO-PLAY-DATE | DATE | 10 | Records the Date on which the Lead-in video Asset played. |
| 3125~ | VIDEO-PLAY-BEG-TIME | TIME | 11 | Records the Time when the Lead-in video Asset began to play represented in HH:MI:SS AM format. |
| 3130~ | VIDEO-PLAY-BEG-SEC-OF-DAY | NUMBER | 5 | Records the Time when the Lead-in video Asset began to play represented as seconds since midnight. |
| 3135~ | VIDEO-PLAY-END-TIME | TIME | 11 | Records the End Time of when the Lead-in video Asset finished playing represented in HH:MI:SS AM format. |
| 3140~ | VIDEO-PLAY-END-SEC-OF-DAY | NUMBER | 5 | Records the Time when the Lead-in video Asset finished playing represented as seconds since midnight. |
| 3145~ | VIDEO-DURATION-SECS | NUMBER | 5 | Records the duration of the Lead-in Video Asset in seconds. |

FIG. 24-A - Continued

| | | | | |
|---|---|---|---|---|
| 3150~ | LEAD-IN-SECS-FOR-EXPOSURE | NUMBER | 5 | Records the number of viewing seconds that the set-top box (device) must be tuned for in order to count the lead-in viewing as an exposure. Example: The STB must be tuned for the first 20 seconds or the first 300 seconds. |
| 3155~ | INDUSTRY-PROGRAM-ID | CHAR | 20 | Records the Industry Program Id that has been assigned to this Lead-in video, if applicable. |
| 3160~ | INDUSTRY-ASSET-ID | CHAR | 20 | Records the Industry Asset Id that has been assigned to this Lead-in video, if applicable. |
| 3165~ | VIDEO-DESC | CHAR | 50 | Records a description for this Lead-in video. |
| 3170~ | STB-COUNT | NUMBER | 9 | Records the count of all the Set Top boxes (devices) in the study that saw this lead-in video. |
| 3175~ | AGGR-VIEW-SECS | NUMBER | 21 | Records the aggregate viewing seconds from all the set top boxes (devices) in the study that saw this lead-in video. |
| 3180~ | EXPOSURES | NUMBER | 9 | Records the total number of exposures from all the set top boxes (devices) in the study that saw this lead-in video. If the viewing duration is below a threshold, then it is not considered an exposure. |
| 3185~ | STB-TUNED-AT-BEG-OF-LEAD-IN-CNT | NUMBER | 9 | Records the total number of set-top boxes (devices) in the study that were tuned at the beginning of this lead-in period. |
| 3190~ | STB-TUNED-AT-END-OF-LEAD-IN-CNT | NUMBER | 9 | Records the total number of set-top boxes (devices) in the study that were tuned at the end of this lead-in period. |
| 3195~ | STB-TUNE-FOR-ALL-OF-LEAD-IN-CNT | NUMBER | 9 | Records the total number of set-top boxes (devices) in the study that were tuned for every second of this lead-in period. |

```
AG-test-001 |Anal Period test-001|ABC    |09/01/2010|12:00:00 AM|
0|12:00:59 AM|    59|Rovi program id     1|Rovi asset id       1|
60|Program description - this is a 50 char desc     1|         2|
90|        2|2|2|2|
```

3103

```
AG-test-001 |Anal Period test-002|ABC    |09/01/2010|12:04:00 AM|
240|12:04:59 AM|  299|Rovi program id     2|Rovi asset id       2|
60|Program description - this is a 50 char desc     2|         1|
60|        1|1|1|1|
```

FIG. 24-C

| | 3100 | 3101 | 3103 |
|---|---|---|---|
| | NAME | Record 1 | Record 2 |
| 3105~ | ANALYSIS-GROUP-ID | AG-test-001 | AG-test-001 |
| 3110~ | ANALYSIS-PERIOD-ID | Anal Period test-001 | Anal Period test-002 |
| 3115~ | CHANNEL-CALL-SIGN | ABC | ABC |
| 3120~ | VIDEO-PLAY-DATE | 09/01/2010 | 09/01/2010 |
| 3125~ | VIDEO-PLAY-BEG-TIME | 12:00:00 AM | 12:04:00 AM |
| 3130~ | VIDEO-PLAY-BEG-SEC-OF-DAY | 00000 | 00240 |
| 3135~ | VIDEO-PLAY-END-TIME | 12:00:59 AM | 12:04:59 AM |
| 3140~ | VIDEO-PLAY-END-SEC-OF-DAY | 00059 | 00299 |
| 3145~ | VIDEO-DURATION-SECS | 00060 | 00060 |
| 3150~ | LEAD-IN-SECS-FOR-EXPOSURE | 00060 | 00060 |
| 3155~ | INDUSTRY-PROGRAM-ID | 00015 | 00020 |
| 3160~ | INDUSTRY-ASSET-ID | Ind program id 1 | Ind program id 2 |
| 3165~ | VIDEO-DESC | Ind asset id 1 | Ind asset id 2 |
| 3170~ | STB-COUNT | 2 | 1 |
| 3175~ | AGGR-VIEW-SECS | 90 | 60 |
| 3180~ | EXPOSURES | 2 | 1 |
| 3185~ | STB-TUNED-AT-BEG-OF-LEAD-IN-CNT | 2 | 1 |
| 3190~ | STB-TUNED-AT-END-OF-LEAD-IN-CNT | 2 | 1 |
| 3195~ | STB-TUNE-FOR-ALL-OF-LEAD-IN-CNT | 2 | 1 |

FIG. 25-A

This is the detail of Part 230.

| | 3200 NAME | 3202 TYPE | 3204 SIZE | 3206 DESCRIPTION |
|---|---|---|---|---|
| 3205~ | ANALYSIS-GROUP-ID | CHAR | 12 | Identifier of the Analysis Group that is used to provide an overall identifier for this study. This value is used to link this Lead-in Video Play Info back to the Analysis Group Info. |
| 3210~ | ANALYSIS-PERIOD-ID | CHAR | 20 | Identifier of the Analysis Lead-in period which is used to provide an overall identifier for the data associated with this Lead-in period. This groups together the various lead-in results that record the viewing activity during this Lead-in period. |
| 3215~ | CHANNEL-CALL-SIGN | CHAR | 6 | Records the Channel on which the Lead-in video Asset played. |
| 3220~ | VIDEO-PLAY-DATE | DATE | 10 | Records the Date on which the Lead-in video Asset played. |
| 3225~ | VIDEO-PLAY-BEG-TIME | TIME | 11 | Records the Time when the Lead-in video Asset began to play represented in HH:MI:SS AM format. |
| 3230~ | LEAD-IN-DEMOGRAPHIC-CODE | CHAR | 6 | Identifier of the demographic code used in the grouping. Example: MWC for married with children |
| 3235~ | LEAD-IN-GEOGRAPHIC-CODE | NUMBER | 6 | Identifier of the geographic code used in the grouping. Example: AZ01 for Ad Zone 01 |
| 3240~ | LEAD-IN-HISTOGRAM-INDEX | NUMBER | 2 | Identifier of the histogram index used in the grouping. Example: 01 02 03 |

FIG. 25-A - Continued

| | | | | |
|---|---|---|---|---|
| 3245~ | LEAD-IN-HISTOGRAM-BEG-PCT | NUMBER | 3 | Beginning percent of this histogram bucket. Example: 1 for 1 percent. |
| 3250~ | LEAD-IN-HISTOGRAM-END-PCT | NUMBER | 3 | Beginning percent of this histogram bucket. Example: 50 for 50 percent. |
| 3255~ | STB-COUNT | NUMBER | 9 | Records the count of all the set-top boxes (devices) identified by this demographic-geographic-histogram grouping that saw this lead-in video. |
| 3260~ | AGGR-VIEW-SECS | NUMBER | 12 | Records the aggregate viewing seconds from all the set-top boxes (devices) identified by this demographic-geographic-histogram grouping that saw this lead-in video. |
| 3265~ | EXPOSURES | NUMBER | 9 | Records the total number of exposures from all the set-top boxes (devices) identified by this demographic-geographic-histogram grouping that saw this lead-in video. If the viewing duration is below a threshold, then it is not considered an exposure. |
| 3270~ | STB-TUNED-AT-BEG-OF-LEAD-IN-CNT | NUMBER | 9 | Records the total number of set-top boxes (devices) identified by this demographic-geographic-histogram grouping that were tuned at the beginning of the lead-in period. |
| 3275~ | STB-TUNED-AT-END-OF-LEAD-IN-CNT | NUMBER | 9 | Records the total number of set-top boxes (devices) identified by this demographic-geographic-histogram grouping that were tuned at the end of the lead-in period. |
| 3280~ | STB-TUNE-FOR-ALL-OF-LEAD-IN-CNT | NUMBER | 9 | Records the total number of set-top boxes (devices) identified by this demographic-geographic-histogram grouping that were tuned for every second of the lead-in period. |

FIG. 25-B

Note: Sample data is only for illustration.

3201

```
AG-test-001 |Anal Period test-001|ABC   |09/01/2010|12:00:00
AM|DEMO01|GEOG01| 1|  1| 15|        0|            0|        0| 0|0|0|
```

3203

```
AG-test-001 |Anal Period test-001|ABC   |09/01/2010|12:00:00
AM|DEMO01|GEOG01| 2| 16| 50|        1|           30|        1| 1|1|1|
```

FIG. 25-C 3200, 3201, 3203

| | NAME | Record 1 | Record 2 |
|---|---|---|---|
| 3205~ | ANALYSIS-GROUP-ID | AG-test-001 | AG-test-001 |
| 3210~ | ANALYSIS-PERIOD-ID | Anal Period test-001 | Anal Period test-002 |
| 3215~ | CHANNEL-CALL-SIGN | ABC | ABC |
| 3220~ | VIDEO-PLAY-DATE | 09/01/2010 | 09/01/2010 |
| 3225~ | VIDEO-PLAY-BEG-TIME | 12:00:00 AM | 12:04:00 AM |
| 3230~ | LEAD-IN-DEMOGRAPHIC-CODE | DEMO01 | DEMO01 |
| 3235~ | LEAD-IN-GEOGRAPHIC-CODE | GEOG01 | GEOG01 |
| 3240~ | LEAD-IN-HISTOGRAM-INDEX | 01 | 02 |
| 3245~ | LEAD-IN-HISTOGRAM-BEG-PCT | 001 | 016 |
| 3250~ | LEAD-IN-HISTOGRAM-END-PCT | 015 | 050 |
| 3255~ | STB-COUNT | 0 | 1 |
| 3260~ | AGGR-VIEW-SECS | 0 | 30 |
| 3265~ | EXPOSURES | 0 | 1 |
| 3270~ | STB-TUNED-AT-BEG-OF-LEAD-IN-CNT | 0 | 1 |
| 3275~ | STB-TUNED-AT-END-OF-LEAD-IN-CNT | 0 | 1 |
| 3280~ | STB-TUNE-FOR-ALL-OF-LEAD-IN-CNT | 0 | 1 |

FIG. 26-A

This is the detail of Part 240.

| | NAME (3400) | TYPE (3402) | SIZE (3404) | DESCRIPTION (3406) |
|---|---|---|---|---|
| 3405 | ANALYSIS-GROUP-ID | CHAR | 12 | Identifier of the Analysis Group that is used to provide an overall identifier for this study. This value is used to link this Analysis Period Info back to the Analysis Group Info. |
| 3410 | TARGET-CHANNEL | CHAR | 6 | Target Channel records the channel on which the target video played. |
| 3415 | POTENTIAL-VIEWING-SECOND | NUMBER | 5 | Potential Viewing Seconds records the number of viewing seconds that a Set top box (device) could get if it viewed the entire target video. |
| 3420 | POTENTIAL-EXPOSURES | NUMBER | 3 | Potential Exposures records the number of exposures that a set top box (device) could get if it viewed each segment of the target video. |
| 3425 | TARGET-INDUSTRY-VIDEO-PROGRAM-ID | CHAR | 20 | Target Industry Video Program Id records the industry program id assigned to this target video. |
| 3430 | TARGET-INDUSTRY-VIDEO-ASSET-ID | CHAR | 20 | Target Industry Video Asset Id records the industry asset id assigned to this target video. |
| 3435 | TARGET-AIRING-DATE | DATE | 10 | Target Airing Date records the date when this video asset played. |
| 3440 | TARGET-AIRING-BEG-TIME | TIME | 11 | Target Airing Begin Time Records the Time when the Target Video Asset began to play represented in HH:MI:SS AM format. |
| 3445 | TARGET-AIRNG-BEG-SEC-OF-DAY | NUMBER | 5 | Target Airing Begin Second of Day records the Time when the Target Video Asset began to play represented as seconds since midnight. |

FIG. 26-A - Continued

| | | | | |
|---|---|---|---|---|
| 3450~ | TARGET-AIRING-END-TIME | TIME | 11 | Target Airing End Time Records the Time when the Target Video Asset finished playing represented in HH:MI:SS AM format. |
| 3455~ | TARGET-AIRNG-END-SEC-OF-DAY | NUMBER | 5 | Target Airing End Second of Day records the Time when the Target Video Asset finished playing represented as seconds since midnight. |
| 3460~ | TARGET-MIN-SECS-VW-AT-START | NUMBER | 5 | Target Minimum seconds viewed at Start records the minimum number of seconds that the Set top box (device) must be tuned to the video at the start in order for this to be counted as an exposure. |
| 3465~ | AGGR-EXPECT-VIEW-SEC | NUMBER | 9 | Aggregate Expected Viewing Seconds is calculated as the total of the viewing exposures by all the set top boxes (devices) for each segment multiplied by the duration of the segment in seconds. This is the total expected viewing across all the individual video segments. |
| 3470~ | AGGR-ACTUAL-VIEW-SEC | NUMBER | 9 | Aggregate Actual Viewing Seconds is a count of the actual viewing seconds of this target by all the set top boxes. This is the total actual viewing across all the individual video segments. |
| 3475~ | AGGR-ACTUL-EXPOSURES | NUMBER | 9 | Aggregate Actual Exposures is a count of the number of set top boxes (devices) that were tuned to the channel for a duration longer than the minimum duration required to be counted as an exposure as defined for the study. This is the total actual exposures across all the individual video segments. |

FIG. 26-B

Note: Sample data is only for illustration.

3401

```
AG-test-001 |          600|          1|ABC   |Target Pgm Id 001  x|Target
Asset Id 001x|09/01/2010|12:05:00 AM|  300|12:14:59 AM|  899|   15|
0|         0|         0|
```

FIG. 26-C 3400 3401

| | NAME | Record 1 |
|---|---|---|
| 3405 | ANALYSIS-GROUP-ID | AG-test-001 |
| 3410 | TARGET-CHANNEL | ABC |
| 3415 | POTENTIAL-VIEWING-SECOND | 600 |
| 3420 | POTENTIAL-EXPOSURES | 1 |
| 3425 | TARGET-INDUSTRY-VIDEO-PROGRAM-ID | Target Pgm Id 001 |
| 3430 | TARGET-INDUSTRY-VIDEO-ASSET-ID | Target Asset Id 001 |
| 3435 | TARGET-AIRING-DATE | 09/01/2010 |
| 3440 | TARGET-AIRING-BEG-TIME | 12:05:00 AM |
| 3445 | TARGET-AIRNG-BEG-SEC-OF-DAY | 300 |
| 3450 | TARGET-AIRING-END-TIME | 12:14:59 AM |
| 3455 | TARGET-AIRNG-END-SEC-OF-DAY | 899 |
| 3460 | TARGET-MIN-SECS-VW-AT-START | 15 |
| 3465 | AGGR-EXPECT-VIEW-SEC | 0 |
| 3470 | AGGR-ACTUAL-VIEW-SEC | 0 |
| 3475 | AGGR-ACTUL-EXPOSURES | 0 |

FIG. 27-A

This is the detail of Part 250.

| | 3600 NAME | 3602 TYPE | 3604 SIZE | 3606 DESCRIPTION |
|---|---|---|---|---|
| 3610~ | APD-DEF-ANALYSIS-GROUP-ID | CHAR | 12 | Identifier of the Analysis Group that is used to provide an overall identifier for this study. This value is used to link this Analysis Period Definition Info back to the Analysis Group Info. |
| 3615~ | AP-DEF-DATE | DATE | 10 | Records the Date on which the Target Video Asset played. |
| 3620~ | AP-DEF-BEG-TIME-HH-MM-SS | TIME | 11 | Records the beginning Time of an Analysis period in the Target asset with the time represented in HH:MI:SS AM format. |
| 3625~ | AP-DEF-BEG-TIME-SEC-OF-DAY | NUMBER | 5 | Records the beginning Time of an Analysis period in the Target asset with the time represented as seconds since midnight. |
| 3630~ | AP-DEF-END-TIME-HH-MM-SS | TIME | 11 | Records the ending Time of an Analysis period in the Target asset with the time represented in HH:MI:SS AM format. |
| 3635~ | AP-DEF-END-TIME-SEC-OF-DAY | NUMBER | 5 | Records the ending Time of an Analysis period in the Target asset with the time represented as seconds since midnight. |
| 3640~ | AP-DEF-PERIOD-DURATION-SECS | NUMBER | 5 | Records the duration of the analysis period in seconds. |
| 3645~ | AP-DEF-TOT-CHAN-VIEW-SEC | NUMBER | 12 | Records the sum of all the viewing seconds across all the demographic-geographic-histogram groups for all channels during this analysis period. |
| 3650~ | AP-DEF-TOT-CHAN-EXPOSURE | NUMBER | 12 | Records the sum of all the viewing exposures across all the demographic-geographic-histogram groups for all channels during this analysis period. |

FIG. 27-A - Continued

| | | | | |
|---|---|---|---|---|
| 3655~ | AP-DEF-TOT-STB-ANY-VIEW | NUMBER | 12 | Records the count of all the set top boxes (devices) that had any viewing across all the demographic-geographic-histogram groups for all channels during this analysis period. |

FIG. 27-B

Note: Sample data is only for illustration.

3601
AG-test-001 |09/01/2010|12:05:00 AM| 300|12:14:59 AM| 899|600|1|1|

FIG. 27-C

| | 3600 | 3601 |
|---|---|---|
| | NAME | Record 1 |
| 3610~ | APD-DEF-ANALYSIS-GROUP-ID | AG-test-001 |
| 3615~ | AP-DEF-DATE | 09/01/2010 |
| 3620~ | AP-DEF-BEG-TIME-HH-MM-SS | 12:05:00 AM |
| 3625~ | AP-DEF-BEG-TIME-SEC-OF-DAY | 300 |
| 3630~ | AP-DEF-END-TIME-HH-MM-SS | 12:14:59 AM |
| 3635~ | AP-DEF-END-TIME-SEC-OF-DAY | 899 |
| 3640~ | AP-DEF-PERIOD-DURATION-SECS | 600 |
| 3645~ | AP-DEF-TOT-CHAN-VIEW-SEC | 600 |
| 3650~ | AP-DEF-TOT-CHAN-EXPOSURE | 1 |
| 3655~ | AP-DEF-TOT-STB-ANY-VIEW | 1 |

FIG. 28-A

This is the detail of Part 260.

| | 3800 NAME | 3802 TYPE | 3804 SIZE | 3806 DESCRIPTION |
|---|---|---|---|---|
| 3810~ | APD-DEF-ANALYSIS-GROUP-ID | CHAR | 12 | Identifier of the Analysis Group that is used to provide an overall identifier for this study. This value is used to link this Analysis Period Definition Info back to the Analysis Group Info. |
| 3820~ | AP-DEF-DATE | DATE | 10 | Records the Date on which the Target video Asset played. |
| 3830~ | AP-DEF-BEG-TIME-HH-MM-SS | TIME | 11 | Records the beginning Time of an Analysis period in the Target asset with the time represented in HH:MI:SS AM format. |
| 3840~ | RESULT-DEMOGRAPHIC-CODE | CHAR | 6 | Identifier of the demographic code used in the grouping. Example: MWC for married with children |
| 3850~ | RESULT-GEOGRAPHIC-CODE | NUMBER | 6 | Identifier of the geographic code used in the grouping. Example: AZ01 for Ad Zone 01 |
| 3860~ | RESULT-HISTOGRAM-INDEX | NUMBER | 2 | Identifier of the histogram index used in the grouping. Example:<br>01<br>02<br>03 |
| 3870~ | RESULT-HISTOGRAM-BEG-PCT | NUMBER | 3 | Beginning percent of this histogram bucket. Example:<br>1 for 1 percent. |
| 3880~ | RESULT-HISTOGRAM-END-PCT | NUMBER | 3 | Ending percent of this histogram bucket. Example:<br>50 for 50 percent. |
| 3890~ | RESULT-TOT-CHAN-VIEW-SEC | NUMBER | 12 | Records the total channel viewing seconds across all channels during this demographic-geographic-histogram grouping. |

FIG. 28-A - Continued

| | | | | |
|---|---|---|---|---|
| 3900~ | RESULT-TOT-CHAN-EXPOSURE | NUMBER | 12 | Records the total number of exposures across all channels during this demographic-geographic-histogram grouping. |
| 3910~ | RESLT-TOT-STB-ANY-VIEW | NUMBER | 12 | Records the total number of set-top boxes (devices) that had any viewing during this segment for this demographic-geographic-histogram grouping. |

FIG. 28-B

Note: Sample data is only for illustration.

3801

```
AG-test-001 |09/01/2010|12:05:00 AM|DEMO01|GEOG01| 1|  1| 25|200|5|8|
```

3803

```
AG-test-001 |09/01/2010|12:05:00 AM|DEMO01|GEOG01| 2| 26| 50|150|4|6|
```

FIG. 28-C

| | 3800 | 3801 | 3803 |
|---|---|---|---|
| | **NAME** | **Record 1** | **Record 2** |
| 3810~ | APD-DEF-ANALYSIS-GROUP-ID | AG-test-001 | AG-test-001 |
| 3820~ | AP-DEF-DATE | 09/01/2010 | 09/01/2010 |
| 3830~ | AP-DEF-BEG-TIME-HH-MM-SS | 12:05:00 AM | 12:05:00 AM |
| 3840~ | RESULT-DEMOGRAPHIC-CODE | DEMO01 | DEMO01 |
| 3850~ | RESULT-GEOGRAPHIC-CODE | GEOG01 | GEOG01 |
| 3860~ | RESULT-HISTOGRAM-INDEX | 1 | 2 |
| 3870~ | RESULT-HISTOGRAM-BEG-PCT | 1 | 25 |
| 3880~ | RESULT-HISTOGRAM-END-PCT | 26 | 50 |
| 3890~ | RESULT-TOT-CHAN-VIEW-SEC | 200 | 150 |
| 3900~ | RESULT-TOT-CHAN-EXPOSURE | 5 | 4 |
| 3910~ | RESLT-TOT-STB-ANY-VIEW | 8 | 6 |

FIG. 29-A

This is the detail of Part 270.

| | NAME (4000) | TYPE (4002) | SIZE (4004) | DESCRIPTION (4006) |
|---|---|---|---|---|
| 4010~ | APD-DEF-ANALYSIS-GROUP-ID | CHAR | 12 | Identifier of the Analysis Group that is used to provide an overall identifier for this study. This value is used to link this Analysis Period Definition Info back to the Analysis Group Info. |
| 4020~ | AP-DEF-DATE | DATE | 10 | Records the Date on which the Target video Asset played. |
| 4030~ | AP-DEF-BEG-TIME-HH-MM-SS | TIME | 11 | Records the beginning Time of an Analysis period in the Target asset with the time represented in HH:MI:SS AM format. |
| 4040~ | RESULT-DEMOGRAPHIC-CODE | CHAR | 6 | Identifier of the demographic code used in the grouping. Example: MWC for married with children |
| 4050~ | RESULT-GEOGRAPHIC-CODE | NUMBER | 6 | Identifier of the geographic code used in the grouping. Example: AZ01 for Ad Zone 01 |
| 4060~ | RESULT-HISTOGRAM-INDEX | NUMBER | 2 | Identifier of the histogram index used in the grouping. Example:<br>01<br>02<br>03 |
| 4070~ | RESULT-CHANNEL-CALL-SIGN | CHAR | 6 | Result Channel Call Sign identifies the channel that was viewed. |
| 4080~ | RESULT-AGGR-CHAN-VIEW-SECS | NUMBER | 12 | Result Aggregate Channel Viewing Seconds records the aggregate viewing seconds of this channel during this segment by this Demo-Geo-Histg group. |
| 4085~ | RESULT-CHAN-EXPOSURES | NUMBER | 9 | Result Channel Exposures records the number of exposures to this channel during this segment by this Demo-Geo-Histg group. |

FIG. 29-A - Continued

| | | | | |
|---|---|---|---|---|
| 4090~ | RESULT-STB-ANY-VIEWING | NUMBER | 9 | Result Set top box (device) Any Viewing records the number of set top boxes (devices) that had any viewing of this channel during this segment by this Demo-Geo-Histg group. |
| 4100~ | CHAN-PCT-SHARE-OF-VIEWING | NUMBER | 999 | Channel Percent Share of Viewing records the percentage of all the viewing that this channel earned during this segment by this Demo-Geo-Histg group. |

```
AG-test-001 |09/01/2010|12:05:00 AM|DEMO01|GEOG01| 4|ABC    |
539|        1|         1|  52.00|
```

4003

```
AG-test-001 |09/01/2010|12:05:00 AM|DEMO01|GEOG01| 4|CBS    |
61|        1|         1|  12.00|
```

FIG. 29-C

| | 4000 NAME | 4001 Record 1 | 4003 Record 2 |
|---|---|---|---|
| 4010~ | APD-DEF-ANALYSIS-GROUP-ID | AG-test-001 | AG-test-001 |
| 4020~ | AP-DEF-DATE | 09/01/2010 | 09/01/2010 |
| 4030~ | AP-DEF-BEG-TIME-HH-MM-SS | 12:05:00 AM | 12:05:00 AM |
| 4040~ | RESULT-DEMOGRAPHIC-CODE | DEMO01 | DEMO01 |
| 4050~ | RESULT-GEOGRAPHIC-CODE | GEOG01 | GEOG01 |
| 4060~ | RESULT-HISTOGRAM-INDEX | 4 | 4 |
| 4070~ | RESULT-CHANNEL-CALL-SIGN | ABC | CBS |
| 4080~ | RESULT-AGGR-CHAN-VIEW-SECS | 539 | 61 |
| 4085~ | RESULT-CHAN-EXPOSURES | 1 | 1 |
| 4090~ | RESULT-STB-ANY-VIEWING | 1 | 1 |
| 4100~ | CHAN-PCT-SHARE-OF-VIEWING | 52.00 | 12.00 |

FIG. 30-A

| | 4202 NAME | 4204 TYPE | 4206 SIZE | 4208 DESCRIPTION |
|---|---|---|---|---|
| 4200~ | CVIEW-MARKET | CHAR | 4 | Records the market associated with this set-top box (device).<br><br>Claims reference:<br>the identifier of said computer system accessed through said network |
| 4210~ | CVIEW-SET-TOP-BOX-ID | CHAR | 20 | Records the set-top box (device) id of the device that had the channel tuning activity.<br><br>Claims reference: Any of the following can be loaded to this field:<br><br>the identifier of said video asset viewing device<br>OR<br>the identifier of the operator of said video asset viewing device<br>OR<br>the identifier of the household associated with said video asset viewing device |
| 4220~ | CVIEW-DEMOGRAPHIC-CODE | CHAR | 6 | Records a demographic code associated with the owner of the set-top box (device). The Analyst may use any demographic code of their choosing.<br><br>Claims reference:<br>demographic information about said viewer operating said video asset viewing device |

FIG. 30-A - Continued

| | | | | | |
|---|---|---|---|---|---|
| 4230~ | | CVIEW-GEOGRAPHIC-CODE | CHAR | 6 | Records a geographic code associated with the location of the set-top box (device). The Analyst may use any geographic code of their choosing.<br><br>Claims reference:<br>geographic information about the location of said video asset viewing device |
| 4240~ | | CVIEW-HISTOGRAM-INDEX | NUMBER | 2 | Records a histogram index which is used in classifying the aggregate lead-in viewing for this STB. This is then used to correlate with the Analysis Period Result histogram. |
| 4250~ | | CVIEW-HISTOGRAM-DESC | CHAR | 30 | Records the description associated with the Histogram Index. |
| 4260~ | | CVIEW-HISTOGRAM-BEG-PCT | NUMBER | 3 | Records the beginning histogram percentile that identifies the lower bound of the range of aggregate lead-in viewing had by this set-top box (device). |
| 4270~ | | CVIEW-HISTOGRAM-END-PCT | NUMBER | 3 | Records the ending histogram percentile that identifies the upper bound of the range of aggregate lead-in viewing had by this set-top box (device). |
| 4280~ | | CVIEW-1-LEAD-IN-AGGR-VIEW-SECS | NUMBER | 7 | Records the aggregate lead-in viewing seconds for this set-top box (device). |

FIG. 30-A - Continued

| | | | | | |
|---|---|---|---|---|---|
| 4290~ | | CVIEW-1-LEAD-IN-EXPOSURES | NUMBER | 3 | Records the aggregate number of exposures from all the lead-in viewing periods for this set-top box (device). |
| 4300~ | These fields occur 7 times. | CVIEW-VIEWING-DATE | DATE | 10 | Records the date of the channel tuning activity that we are tracking for this set-top box (device). This value is set based on the date in the Tuning Data Dates file. |
| 4310~ | | CVIEW-DATE-LEAD-IN-AGG-VW-SECS | NUMBER | 7 | Records the aggregate lead-in viewing seconds for this set-top box (device) for the date indicated. |
| 4320~ | | CVIEW-DATE-LEAD-IN-EXPOSURES | NUMBER | 3 | Records the aggregate lead-in viewing exposures for this set-top box (device) for the date indicated. |
| 4330~ | | CVIEW-SECONDS-OF-DAY OCCURS 86400 TIMES<br><br>CVIEW-CHANNEL-CALL-SIGN | CHAR | 6 | Seconds of the day occurs 86,400 times, once for each second of the day. For each second of the day, this field then contains the Channel Call Sign that the set top box (device) was tuned to.<br><br>Claims reference: buckets representing individual seconds of time during a window of time of interest for analysis wherein said buckets are correlated with said identifying fields |

FIG. 30-B

| | | 4202 NAME | 4203 TYPE | 4205 SIZE |
|---|---|---|---|---|
| 4200~ | | CVIEW-MARKET | DENV | 4 |
| 4210~ | | CVIEW-SET-TOP-BOX-ID | 00:01:02:03:04:05 | 00:AB:02:CD:04:EF |
| 4220~ | | CVIEW-DEMOGRAPHIC-CODE | DEMO01 | DEMO02 |
| 4230~ | | CVIEW-GEOGRAPHIC-CODE | GEOG01 | GEOG02 |
| 4240~ | | CVIEW-HISTOGRAM-INDEX | 01 | 02 |
| 4250~ | | CVIEW-HISTOGRAM-DESC | Range 001-025 | Range 026-050 |
| 4260~ | | CVIEW-HISTOGRAM-BEG-PCT | 001 | 026 |
| 4270~ | | CVIEW-HISTOGRAM-END-PCT | 025 | 050 |
| 4280~ | | CVIEW-1-LEAD-IN-AGGR-VIEW-SECS | 600 | 1800 |
| 4290~ | | CVIEW-1-LEAD-IN-EXPOSURES | 2 | 5 |
| 4300~ | These fields occur 7 times.See Note 1. | CVIEW-VIEWING-DATE | 09/01/2010 | 09/01/2010 |
| 4310~ | | CVIEW-DATE-LEAD-IN-AGG-VW-SECS | 220 | 341 |
| 4320~ | | CVIEW-DATE-LEAD-IN-EXPOSURES | 1 | 2 |
| 4330~ | | CVIEW-SECONDS-OF-DAY OCCURS 86400 TIMES<br><br>CVIEW-CHANNEL-CALL-SIGN | ABC ABC CBS CBS NBC FOX ...<br>DSC DSC DSC HST HST HST | NBC NBC NBC ABC ABC ABC ...<br>FOX FOX HST HST HST HST |

Note 1: This cell contains 7 buckets for 7 days of tuning data. Within each of the 7 buckets, there are several fields as shown. One of the fields is the seconds of the day which contains 86,400 buckets, one for each second of the day. The second of day buckets are populated with the Channel Call Sign to which the Set-top box (device) was tuned during that second of the day.

FIG. 31

| | 4802 | 4804 | 4806 | 4808 |
|---|---|---|---|---|
| | NAME | TYPE | SIZE | DESCRIPTION |
| 4800~ | LEAD-IN-MARKET | CHAR | 4 | Records identifier of market in service provider's network hierarchy. The analysis will typically correspond to a market such as a metropolitan area. Also the market associated with the video asset viewing device.<br><br>Claims reference:<br>network system computer equipment identifier (for both lead-in and target)<br>OR<br>(geographic area in which the lead-in video asset was aired AND<br>geographic area in which the target video asset was aired) |
| 4810~ | LEAD-IN-ANALYSIS-GROUP-ID | CHAR | 12 | Records the identifier of the lead-in study. |
| 4820~ | LEAD-IN-ANALYSIS-GROUP-DESC | CHAR | 50 | Records the description of the lead-in study. |
| 4830~ | LEAD-IN-POTENTIAL-VIEWING-SECS | NUMBER | 7 | Records the number of viewing seconds a set-top box (device) would get if it was tuned in for all of the lead-in periods in this study, as entered by the user. |
| 4840~ | LEAD-CALCULATED-POT-VIEW-SECS | NUMBER | 7 | Records the number of viewing seconds a set-top box (device) would get if it was tuned in for all of the lead-in periods in this study, as calculated by the Lead-in Analytics Engine **200**. |
| 4850~ | LEAD-IN-POTENTIAL-EXPOSURES | NUMBER | 3 | Records the number of lead-in periods; there is one exposure per lead-in period. |
| 4860~ | LEAD-IN-AGGR-VIEWING-ALL-STB | NUMBER | 12 | Records the total number of viewing seconds from all the set-top boxes (devices) for all of the lead-in periods. |

FIG. 31 – Continued

| | | | | |
|---|---|---|---|---|
| 4870~ | LEAD-IN-AGGR-EXPOSURES-ALL-STB | NUMBER | 12 | Records the total number of viewing exposures from all the set-top boxes (devices) for all of the lead-in periods. Each time a set-top box (device) views a lead-in period for at least the required number of seconds to be counted as an exposure adds 1 to the total. |

The following fields describe each individual Lead-In period. The Lead-In Analytics Engine 200 is presently configured to support up to 100 Lead-In periods. Thus, the following fields occur 100 times.

| | | | | |
|---|---|---|---|---|
| 4880~ | LEAD-ANALYSIS-PERIOD-ID | CHAR | 20 | Records the identifier assigned to the lead-in period. |
| 4890~ | LEAD-CHANNEL-CALL-SIGN | CHAR | 6 | Records the call sign of the channel on which the lead-in ran.<br><br>Claims reference:<br>channel on which the lead-in video asset was aired |
| 4900~ | LEAD-VIDEO-PLAY-DATE | CHAR | 10 | Records the date on which the Lead-in video aired.<br><br>Claims reference:<br>lead-in video asset play begin date and time and lead-in video asset play end date and time |
| 4910~ | LEAD-VIDEO-PLAY-BEG-TIME | TIME | 11 | Records the time at which the Lead-In video began to air in format HH:MI:SS AM/PM<br><br>Claims reference:<br>lead-in video asset play begin date and time |
| 4920~ | LEAD-VIDEO-PLAY-BEG-SEC-OF-DAY | NUMBER | 5 | Records the time at which the Lead-In video began to air in seconds of the day. |

FIG. 31 – Continued

| | | | | |
|---|---|---|---|---|
| 4930~ | LEAD-VIDEO-PLAY-END-TIME | TIME | 11 | Records the time at which the Lead-In video finished airing in format HH:MI:SS AM/PM<br><br>Claims reference:<br>lead-in video asset play end date and time |
| 4940~ | LEAD-VIDEO-PLAY-END-SEC-OF-DAY | NUMBER | 5 | Records the time at which the Lead-In video finished airing in seconds of the day. |
| 4950~ | LEAD-IN-INDUSTRY-PROGRAM-ID | CHAR | 20 | Records the Industry Program Id associated with this Lead-In video asset.<br><br>Claims reference:<br>lead-in video asset identifier |
| 4960~ | LEAD-IN-INDUSTRY-ASSET-ID | CHAR | 20 | Records the Industry Asset Id assigned to this Lead-In video asset.<br><br>Claims reference:<br>lead-in video asset identifier |
| 4970~ | LEAD-IN-VIDEO-DURATION-SECS | NUMBER | 5 | Records the duration of the Lead-In video in seconds.<br><br>Claims reference:<br>lead-in video asset duration |
| 4975~ | LEAD-IN-SECS-FOR-EXPOSURE | NUMBER | 5 | Records the number of viewing seconds that the set-top box (device) must be tuned for in order to count the lead-in viewing as an exposure. Example: The STB must be tuned for the first 20 seconds or the first 300 seconds.<br><br>Claims reference:<br>lead-in amount of time to qualify as an exposure |
| 4980~ | LEAD-VIDEO-DESC | CHAR | 50 | Records a description of the Lead-In video. |
| 4990~ | LEAD-IN-STB-COUNT | NUMBER | 9 | Records the number of set-top boxes (devices) that saw any part of this Lead-in video. |

FIG. 31 – Continued

| | | | | |
|---|---|---|---|---|
| 5000~ | LEAD-IN-AGGR-VIEW-SECS | NUMBER | 12 | Records the aggregate viewing seconds from all of the set-top boxes (devices) that saw all or part of this Lead-In video. |
| 5010~ | LEAD-IN-EXPOSURES | NUMBER | 9 | Records the number of set-top boxes (devices) that saw enough of this Lead-in video to qualify as an exposure. |
| 5020~ | LEAD-IN-STB-COUNT-AT-BEG | NUMBER | 9 | Records the count of the number of set-top boxes (devices) that were tuned at the start (first second) of the lead-in period. |
| 5030~ | LEAD-IN-STB-COUNT-AT-END | NUMBER | 9 | Records the count of the number of set-top boxes (devices) that were tuned at the end (last second) of the lead-in period. |
| 5040~ | LEAD-IN-STB-COUNT-VIEW-ALL | NUMBER | 9 | Records the count of the number of set-top boxes (devices) that viewed the entire lead-in period. |

The following fields records the viewing breakout during each individual Lead-In period. The Lead-In Analytics Engine 200 is presently configured to support up to 200 viewing breakouts during each individual Lead-In period. Thus, the following fields occur 200 times. These values are copied from the array described in FIG 32, so the number of rows in these two arrays must be kept in sync.

| | | | | |
|---|---|---|---|---|
| 5050~ | LEAD-RESLT-DEMOGRAPHIC-CODE | CHAR | 6 | Records a demographic code for which lead-in viewing is being tracked.<br><br>Claims reference:<br>plurality of demographic codes by which to classify said viewers of said lead-in video asset |
| 5060~ | LEAD-RESLT-GEOGRAPHIC-CODE | CHAR | 6 | Records a geographic code for which lead-in viewing is being tracked.<br><br>Claims reference:<br>plurality of geographic codes by which to classify said viewers of said lead-in video asset |

FIG. 31 - Continued

| | | | | |
|---|---|---|---|---|
| 5070~ | LEAD-RESLT-HISTOGRAM-INDEX | NUMBER | 2 | Records a histogram index under which lead-in viewing is being tracked.<br><br>Claims reference:<br>a plurality of histogram buckets by which to classify said viewers of said lead-in video asset |
| 5080~ | LEAD-RESLT-HISTOGRAM-BEG-PCT | NUMBER | 3 | Records the beginning percentage of the range for the histogram.<br><br>Claims reference:<br>a plurality of histogram buckets by which to classify said viewers of said lead-in video asset |
| 5090~ | LEAD-RESLT-HISTOGRAM-END-PCT | NUMBER | 3 | Records the ending percentage of the range for the histogram.<br><br>Claims reference:<br>a plurality of histogram buckets by which to classify said viewers of said lead-in video asset |
| 5100~ | LEAD-RESLT-STB-COUNT | NUMBER | 9 | Records the number of set-top boxes (devices) identified by the demo-geo-hist code that saw any part of this Lead-in video. |
| 5110~ | LEAD-RESLT-AGGR-VIEW-SECS | NUMBER | 12 | Records the aggregate viewing seconds from all of the set-top boxes (devices) identified by the demo-geo-hist code that saw all or part of this Lead-In video. |
| 5120~ | LEAD-RESLT-EXPOSURES | NUMBER | 9 | Records the number of set-top boxes (devices) identified by the demo-geo-hist code that saw enough of this Lead-in video to qualify as an exposure. |
| 5130~ | LEAD-RES-STB-COUNT-AT-BEG | NUMBER | 9 | Records the count of the number of set-top boxes (devices) identified by the demo-geo-hist code that were tuned at the start (first second) of the lead-in period. |

FIG. 31 - Continued

| | | | | |
|---|---|---|---|---|
| 5140~ | LEAD-RES-STB-COUNT-AT-END | NUMBER | 9 | Records the count of the number of set-top boxes (devices) identified by the demo-geo-hist code that were tuned at the end (last second) of the lead-in period. |
| 5150~ | LEAD-RES-STB-COUNT-VIEW-ALL | NUMBER | 9 | This is a count of the number of set-top boxes (devices) identified by the demo-geo-hist code that viewed the entire lead-in period. |

The following fields describe the Analysis Period Target. This is the time period for which the Lead-In Analytics Engine 200 is going to measure viewership of the Target. In one embodiment, the Target is the video that the service provider expects the viewer to watch because the lead-in ads encouraged them to watch it. In another embodiment, the lead-in may be a first program with the target being the subsequent program. The Lead-In Analytics Engine 200 is presently configured to support one Target which can then be divided into multiple segments for tracking. Thus, the following fields occur 1 time.

| | | | | |
|---|---|---|---|---|
| 5160~ | AP-TARGET-CHANNEL | CHAR | 6 | Records the channel on which the Target video aired.<br><br>Claims reference:<br>channel on which the target video asset was aired |
| 5170~ | AP-POTENTIAL-VIEWING-SECONDS | NUMBER | 5 | Records the number of viewing seconds that a set-top box (device) could get if it viewed the entire Target.<br><br>Claims reference:<br>target video asset duration |
| 5180~ | AP-POTENTIAL-EXPOSURES | NUMBER | 3 | Records the number of exposures that a set-top box (device) could get if it viewed the entire Target (this is the same as the number of segments in the Target). Each Segment is considered an Exposure. |

FIG. 31 - Continued

| | | | | |
|---|---|---|---|---|
| 5190~ | AP-TARGET-IND-VIDEO-PGM-ID | CHAR | 20 | Records the Industry Program Id associated with this Target video asset.<br><br>Claims reference:<br>target video asset identifier |
| 5200~ | AP-TARGET-IND-VIDEO-ASSET-ID | CHAR | 20 | Records the Industry Asset Id assigned to this Target video asset.<br><br>Claims reference:<br>target video asset identifier |
| 5210~ | AP-TARGET-AIRING-DATE | CHAR | 10 | Records the date on which the Target video aired.<br><br>Claims reference:<br>target video asset play begin date and time<br>AND<br>target video asset play end date and time |
| 5220~ | AP-TARGET-AIRING-BEG-TIME | TIME | 11 | Records the time at which the Target video began to air in format HH:MI:SS AM/PM<br><br>Claims reference:<br>target video asset play begin date and time |
| 5230~ | AP-TARGET-AIRING-END-TIME | TIME | 11 | Records the time at which the Target video finished airing in format HH:MI:SS AM/PM<br><br>Claims reference:<br>target video asset play end date and time |
| 5240~ | AP-TARGET-AIRNG-BEG-SEC-OF-DAY | NUMBER | 5 | Records the time at which the Target video began to air in seconds of the day. |
| 5250~ | AP-TARGET-AIRNG-END-SEC-OF-DAY | NUMBER | 5 | Records the time at which the Target video finished airing in seconds of the day. |

FIG. 31 - Continued

| | | | | |
|---|---|---|---|---|
| 5260~ | **AP-TARGET-MIN-SECS-VW-AT-START** | NUMBER | 5 | Records the minimum number of seconds that the Target must be viewed at the start of play to be considered an Exposure.<br><br>Claims reference:<br>target amount of time to qualify as an exposure |
| 5270~ | **AP-TARGET-AGGR-EXPECT-VIEW-SEC** | NUMBER | 12 | Records the aggregated expected viewing seconds of this target. This is calculated as Exposures * Duration in seconds. |
| 5280~ | **AP-TARGET-AGGR-ACTUAL-VIEW-SEC** | NUMBER | 12 | Records the aggregate number of actual viewing seconds by all the set-top boxes (devices) that were tuned to this Target. |
| 5290~ | **AP-TARGET-AGGR-ACTUL-EXPOSURES** | NUMBER | 12 | Records the aggregate number of exposures by all the set-top boxes (devices) that were tuned to this Target. |

The following fields record the viewing segments during the Target period. The Lead-In Analytics Engine 200 is presently configured to support up to 60 viewing segments during the Target period. Thus, the following fields occur 60 times.

| | | | | |
|---|---|---|---|---|
| 5300~ | **AP-DEF-DATE** | CHAR | 10 | Records the date on which the Target video aired.<br><br>Claims reference:<br>target video asset segment play begin date and time AND<br>target video asset segment play end date and time |
| 5310~ | **AP-DEF-BEG-TIME-HH-MM-SS-PM** | TIME | 11 | Records the time at which this Segment of the Target video began to air in format HH:MI:SS AM/PM.<br><br>Claims reference:<br>target video asset segment play begin date and time |

FIG. 31 - Continued

| | | | | |
|---|---|---|---|---|
| 5320~ | AP-DEF-BEG-TIME-SEC-OF-DAY | NUMBER | 5 | Records the time at which this Segment of the Target video began to air in seconds of the day. |
| 5330~ | AP-DEF-END-TIME-HH-MM-SS-PM | TIME | 11 | Records the time at which this Segment of the Target video finished airing in format HH:MI:SS AM/PM.<br><br>Claims reference:<br>target video asset segment play end date and time |
| 5340~ | AP-DEF-END-TIME-SEC-OF-DAY | NUMBER | 5 | Records the time at which this Segment of the Target video finished airing in seconds of the day. |
| 5350~ | AP-DEF-PERIOD-DURATION-SECS | NUMBER | 5 | Record the duration of this Segment in seconds.<br><br>Claims reference:<br>target video asset segment duration |
| 5360~ | AP-DEF-TOT-CHAN-VIEW-SEC | NUMBER | 12 | Records the total channel viewing seconds of this Segment of the Target from all the Set-top boxes. |
| 5370~ | AP-DEF-TOT-CHAN-EXPOSURE | NUMBER | 12 | Records the aggregate number of exposures by all the set-top boxes (devices) that were tuned to this Segment of the Target. |
| 5380~ | AP-DEF-TOT-STB-ANY-VIEW | NUMBER | 12 | Records the total channel Set-top boxes (devices) that had any viewing seconds for this Segment of the Target. |

FIG. 31 - Continued

The following fields record the viewing breakout during each individual Segment of the Target. The Lead-In Analytics Engine 200 is presently configured to support up to 200 viewing breakouts during each individual Target Segment. Thus, the following fields occur 200 times. These values are copied from the array described in FIG 33, so the number of rows in these two arrays must be kept in sync.

| | | | | |
|---|---|---|---|---|
| 5390~ | **ANALYS-RESLT-DEMOGRAPHIC-CODE** | CHAR | 6 | Records a demographic code for which Target Segment viewing is being tracked.<br><br>Claims reference:<br>a plurality of demographic codes by which to classify said viewers of said target video asset segment |
| 5400~ | **ANALYS-RESLT-GEOGRAPHIC-CODE** | CHAR | 6 | Records a geographic code for which Target Segment viewing is being tracked.<br><br>Claims reference:<br>a plurality of geographic codes by which to classify said viewers of said target video asset segment |
| 5410~ | **ANALYS-RESLT-HISTOGRAM-INDEX** | NUMBER | 2 | Records a histogram index under which Target Segment viewing is being tracked.<br><br>Claims reference:<br>a plurality of histogram buckets by which to classify said viewers of said target video asset segment |
| 5420~ | **ANALYS-RESLT-HISTOGRAM-BEG-PCT** | NUMBER | 3 | Records the beginning percentage of the range for the histogram.<br><br>Claims reference:<br>a plurality of histogram buckets by which to classify said viewers of said target video asset segment |

FIG. 31 - Continued

| | | | | |
|---|---|---|---|---|
| 5430 | **ANALYS-RESLT-HISTOGRAM-END-PCT** | NUMBER | 3 | Records the ending percentage of the range for the histogram.<br><br>Claims reference:<br>a plurality of histogram buckets by which to classify said viewers of said target video asset segment |
| 5440 | **ANALYS-RESLT-TOT-CHAN-VIEW-SEC** | NUMBER | 12 | Records the total channel viewing seconds for this Target Segment from those set-top boxes (devices) which have the identified demo-geo-histg code. |
| 5450 | **ANALYS-RESLT-TOT-CHAN-EXPOSURE** | NUMBER | 12 | Records the total channel exposures for this Target Segment from those set-top boxes (devices) which have the identified demo-geo-histg code. |
| 5460 | **ANALYS-RESLT-TOT-STB-ANY-VIEW** | NUMBER | 12 | Records the total count of set-top boxes (devices) which have the identified demo-geo-histg code that had any channel viewing seconds for this Target Segment. |

FIG. 31 - Continued

The following fields record the individual channels that were viewed by the set-top boxes identified by these Demographic-Geographic-Histogram identifiers for the individual Segment of the Target. The Lead-In Analytics Engine 200 is presently configured to support up to 300 channels viewed for each individual Demographic-Geographic-Histogram combination. Thus, the following fields occur 300 times. These values are copied from the array described in FIG 34, so the number of rows in these two arrays must be kept in sync.

| | | | | |
|---|---|---|---|---|
| 5500~ | **ANALYS-RES-CHANNEL-CALL-SIGN** | CHAR | 6 | Records the channel for which viewing information is being collected during this Segment.<br><br>Claims reference:<br>fields for tracking **target** video asset segment viewing by channel within said demographic geographic histogram groupings |
| 5510~ | **ANALYS-RES-AGGR-CHAN-VIEW-SECS** | NUMBER | 12 | Records the aggregate channel viewing seconds from all the set-top boxes (devices) that tuned to this channel during the Segment and identified by the indicated Demo-Geo-Histg identifiers. |
| 5520~ | **ANALYS-RES-CHAN-EXPOSURES** | NUMBER | 9 | Records the channel exposures by all the set-top boxes (devices) that tuned to this channel during the Segment and identified by the indicated Demo-Geo-Histg identifiers. |
| 5530~ | **ANALYS-RES-STB-ANY-VIEWING** | NUMBER | 9 | Records the count of set-top boxes (devices) that had any viewing seconds of this channel during the Segment and identified by the indicated Demo-Geo-Histg identifiers. |
| 5540~ | **CHAN-PCT-SHARE-OF-VIEWING** | NUMBER | 999V 9999 | Records the percentage of viewing that this channel earned compared to all the other channels during the Segment and identified by the indicated Demo-Geo-Histg identifiers. |

FIG. 32

| | 5800 NAME | 5802 TYPE | 5804 SIZE | 5806 DESCRIPTION |
|---|---|---|---|---|
| 5810~ | LI-DEMOGRAPHIC-CODE | CHAR | 6 | See corresponding field in FIG 17-A. |
| 5820~ | LI-DEMOGRAPHIC-DESC | CHAR | 30 | See corresponding field in FIG 17-A. |
| 5830~ | LI-GEOGRAPHIC-CODE | CHAR | 6 | See corresponding field in FIG 17-A. |
| 5840~ | LI-GEOGRAPHIC-DESC | CHAR | 30 | See corresponding field in FIG 17-A. |
| 5850~ | LI-HISTOGRAM-INDEX | NUMBER | 2 | See corresponding field in FIG 17-A. |
| 5860~ | LI-HISTOGRAM-BUCKET-NAME | CHAR | 20 | See corresponding field in FIG 17-A. |
| 5870~ | LI-HISTOGRAM-BEG-PCT | NUMBER | 3 | See corresponding field in FIG 17-A. |
| 5880~ | LI-HISTOGRAM-END-PCT | NUMBER | 3 | See corresponding field in FIG 17-A. |

FIG. 33

| | 5900 NAME | 5902 TYPE | 5904 SIZE | 5906 DESCRIPTION |
|---|---|---|---|---|
| 5910~ | RE-DEMOGRAPHIC-CODE | CHAR | 6 | See corresponding field in FIG 20-A. |
| 5920~ | RE-DEMOGRAPHIC-DESC | CHAR | 30 | See corresponding field in FIG 20-A. |
| 5930~ | RE-GEOGRAPHIC-CODE | CHAR | 6 | See corresponding field in FIG 20-A. |
| 5940~ | RE-GEOGRAPHIC-DESC | CHAR | 30 | See corresponding field in FIG 20-A. |
| 5950~ | RE-HISTOGRAM-INDEX | NUMBER | 2 | See corresponding field in FIG 20-A. |
| 5960~ | RE-HISTOGRAM-BUCKET-NAME | CHAR | 20 | See corresponding field in FIG 20-A. |
| 5970~ | RE-HISTOGRAM-BEG-PCT | NUMBER | 3 | See corresponding field in FIG 20-A. |
| 5980~ | RE-HISTOGRAM-END-PCT | NUMBER | 3 | See corresponding field in FIG 20-A. |

FIG. 34

| | 6000 NAME | 6002 TYPE | 6004 SIZE | 6006 DESCRIPTION |
|---|---|---|---|---|
| 6010~ | CHAN-TO-ANALYZE-CALL-SIGN | CHAR | 6 | See corresponding field in FIG 21-A. |
| 6020~ | CHAN-TO-ANALYZE-CALL-SIGN-NAME | CHAR | 30 | See corresponding field in FIG 21-A. |

MEASURING VIDEO ASSET VIEWING

CROSS-REFERENCE TO RELATED APPLICATIONS

This application is a continuation-in-part of U.S. application Ser. No. 12/981,301 filed on Dec. 29, 2010 entitled “SYSTEM AND METHOD FOR ANALYZING HUMAN INTERACTION WITH ELECTRONIC DEVICES THAT ACCESS A COMPUTER SYSTEM THROUGH A NETWORK” by the present inventor which is incorporated by reference in its entirety but is not admitted to be prior art.

This application is also related to the co-pending application U.S. application Ser. No. 13/052,026 filed on Mar. 18, 2011 entitled “SYSTEM AND METHOD FOR MEASURING TELEVISION ADVERTISING AND PROGRAM VIEWING ATA SECOND-BY-SECOND LEVEL AND FOR MEASURING EFFECTIVENESS OF TARGETED ADVERTISING” by the present inventor which is incorporated by reference in its entirety but is not admitted to be prior art.

PROGRAM LISTING

This patent submission contains one (1) program listing as shown in the table below. The following program listing is incorporated in this Specification by reference.

| | Name of the ASCII Text file | Date of Creation | Size in bytes |
|---|---|---|---|
| 1. | 200-Analytics-Engine-Lead-In-Analysis.txt | Jan. 28, 2012 | 224,134 |

Note: Variable names used in program correspond to specification, but may not match exactly.

BACKGROUND

Prior Art

The following is a tabulation of some prior art that presently appears relevant:

U.S. Patents

| Patent Number | Class | Issue Date | Patentee |
|---|---|---|---|
| 7,383,243 | 725/2 | Jun. 3, 2008 | Conkwright, et al. |
| 7,590,993 | 725/35 | Sep. 15, 2009 | Hendricks, et al. |

U.S. Patent Application Publications

| Publication Number | Kind Code | Class | Publication Date | Applicant |
|---|---|---|---|---|
| 20070074258 | A1 | 725/105 | Mar. 29, 2007 | Wood; Catherine Alexandra |
| 2010/0145791 | A1 | 705/14.41 | Jun. 10, 2010 | Canning; Brian P. |
| 20060168609 | A1 | 725/9 | Jul. 27, 2006 | Chen; Michael A. |

BACKGROUND INFORMATION

General Statement of Problem

With the ever increasing number of consumer choices for television viewing, it is important for advertisers, content producers, and service providers such as cable television and satellite television and internet protocol television companies to be able to accurately measure longitudinal audience viewership at various levels including device, viewer (device operator), household associated with the device, demographic group, geographic group, and computer system providing service. Traditional methods of measuring television viewership do not provide one-second level viewing information across these metrics even though this could be extremely helpful to advertisers, content producers, and content providers.

Advertising Industry Problem

Producing television ads and purchasing ad time to run those ads is expensive. Ideally, the advertising purchased with those dollars can be correlated with ad impressions. Unfortunately, measuring ad impressions or ad viewership is very difficult, especially when there are hundreds of channels and many of them are lightly viewed. The problem is magnified by channel-surfing and by multi-screen activity wherein one person may use personal viewing devices, traditional cable or satellite television, and perhaps computer based viewing. While traditional survey techniques provide audience measures for popular channels, they are inadequate for lightly-viewed channels, which can be up to 80% of the channels. In today’s competitive media environment, television advertisers need accurate and detailed viewing information for ALL channels across devices so that they can measure the effectiveness of their advertising.

Advertising effectiveness can be measured by observing viewer response to a series of ads aired over a period of time. Such longitudinal measurement can be used to measure the correlation between exposure to an ad promoting an upcoming program with viewership of that program. Such measurement will allow advertisers to measure the effectiveness of ads that promote upcoming programs. Advertisers and programming networks spend enormous sums promoting upcoming programming. Enabling them to measure the effectiveness of such advertising would be extremely valuable. Some inventors teach how to correlate retail purchases with advertising exposure. I have not found any patents or patent applications that teach how to use set top box data to analyze the effectiveness of advertisements promoting upcoming shows.

Television Network Problem

Television networks need to create an appealing programming schedule with content that the viewers are interested in viewing. It is difficult for television networks to get accurate audience feedback, particularly for lightly viewed networks. They need to be able to measure how many viewers stay tuned to their network both during a show and when transitioning from one show to another. They also need to understand viewership across viewing platforms or viewing devices; to understand viewership in a multi-screen world. Television networks also need to understand the channels that viewers tune to when they leave the original channel. The diversity of the viewing audience makes this more difficult to measure. Traditional measurement tools do not provide the detailed information needed to help television networks understand how viewers are responding to the content. The result is that television networks may develop programming schedules that do not appeal to the audience.

This is wasteful.

Content Producers Problem

Producing television content is often expensive. It is difficult for the content producers to get accurate audience feedback. Additionally, there is not one audience, but many audiences, because of the wide variety of viewer interests. Furthermore, any person may view content on multiple devices. The content producers need to tailor the content to the audience. With the increasing number of viewing choices it is all the more important to be able to accurately measure viewership on diverse platforms in order to be able to justify advertising fees. Traditional measurement tools do not provide the detailed information needed to help producers and writers to understand how viewers are responding to the content. The result is that producers may develop content that lacks interest to the audience. This is wasteful.

Cable Television Industry Problem

In the cable television industry, content providers offer consumers hundreds of channels. Cable television companies pay very large amounts of money for content. It is imperative for the cable television companies to be able to accurately measure audience viewership in order to understand what value the various programs bring to their customers. They must understand viewership across viewing platforms or viewing devices; they must understand viewership in a multi-screen world. Also, by understanding the time of day when various programs are viewed, the cable television companies can create more attractive viewing schedules for their customers. Additionally, as cable television companies are able to accurately measure audience viewership, they will be able to better negotiate with the program providers on the price to be paid for programming content and with advertisers on the price to charge for airing advertising.

Satellite Television Industry Problem

The satellite television industry faces the same problems as the cable television industry in regard to understanding what programming the viewers are watching and at what time of day and on what device. In general they have the same need to understand viewer behavior as do the cable television companies.

Internet Protocol Television Industry Problem

The Internet Protocol television (IP TV) industry faces the same problems as the cable television industry in regard to understanding what programming the viewers are watching and at what time of day and on what device. In general they have the same need to understand viewer behavior as do the cable television companies.

Need for Information about the Customer

In addition to these issues, cable television companies, satellite television companies, IP TV providers, television content providers, television advertisers, and other interested parties are continually desiring to know more about the customers they serve, the patterns of customer interactions, the content customers find interesting or that keeps their attention, the ads they view, the time of day when various program are viewed, how programs compare with one another in keeping viewer interest, and numerous other measures. With the advent of portable video viewing devices, the need to understand viewer behavior is even more important.

Fortunately, currently available technology enables the collection of raw data that, with proper analysis, can begin to answer many of these questions, and even do so with great specificity. We will now look at some sources of raw data in the television industry.

Channel Change Data Sources

Switched Digital Video as a Data Source

In my prior U.S. patent application having application Ser. No. 12/981,301 filed on Dec. 29, 2010, I reviewed switched digital video systems as a data source. In that application I noted that switched digital video channel change data is readily available under current technology. I provided information about two vendors that supply switched digital video systems, namely Motorola and CISCO.

A benefit of SDV systems is that individual set-top box channel change data is collected on the SDV servers as part of normal system operation without any additional actions on the part of the viewer.

One vendor produces channel change data containing fields similar to this (hereinafter SDV Vendor 1 Format):

a. Set-top box identifier (optionally scrambled to protect viewer identity)
b. Tuner index (to identifier the tuner in the STB)
c. Market identifier
d. Headend identifier
e. Hub identifier
f. Service Group identifier
g. Tune-in date and time to the second
h. Tune-out date and time to the second
i. Channel name
j. Channel call sign (acronym for the channel)
k. Channel source id (numeric identifier of the channel)
l. Bit rate (the megabits per second required to deliver the channel)
m. Program type (SDV or Broadcast)
n. High definition or standard definition flag Note 1: The data file is typically created daily. Business rules are applied if the tune-in and tune-out events occur on different days.

The other SDV vendor produces channel change data containing fields similar to this (hereinafter SDV Vendor 2 Format):

a. Market
b. Service Group
c. Set-top box identifier (optionally scrambled to protect viewer identity)
d. Tuner index
e. Date
f. Time to the second
g. Event code (tune-in or tune-out)
h. Channel source id—the number of the channel as known to the SDV system.

Note: The data file is typically created daily. Business rules are applied if the tune-in and tune-out events occur on different days.

Those with ordinary skill in the art will recognize that SDV Vendor 2 Format can be transformed into a format similar to SDV Vendor 1 Format by combining the tune-in record and the tune-out record into a single record containing both tune-in date-time and tune-out date-time. This is done by sorting the file in order by Market, Service Group, Set-top box identifier, Tuner index, Date, and Time and then matching each tune-out record to the previous tune-in record using Event code to identify tune-in and tune-out actions. They will also recognize that by adding a lookup table to the process they can enhance the Market+Service group information to also include Hub and Headend. They will also recognize that by adding a second lookup table to the process they can enhance the channel information to also include Channel Name, Channel Call Sign, Bit Rate, Program Type, and High definition or standard definition flag.

Enhancing the tuning data with these additional fields allows us to produce valuable analytics regarding audience viewing behavior.

The vendor may generate a tune-out event in the data file when the user turns off the power.

Note: For both file formats, even with some variations in the file format, this data can still be used to achieve the objective of measuring viewership.

Set-Top Box Data as a Data Source

As a third alternative, the channel change data can be captured by the set-top box itself or by software that is running on the set-top box. There are various set-top box software vendors that provide software that collects channel tuning data. In addition, there are Enhanced TV Binary Interchange Format (EBIF) software applications which run on the set-top box and can collect channel tuning data. The company Fourth Wall Media provides such as application. See their web site at http://www.fourthwallmedia.tv/Products/.

Set-top box tuning information is widely available for measuring audience viewing habits. I reviewed this in more detail in my prior US. patent application having application Ser. No. 12/981,301 filed on Dec. 29, 2010.

In the case of set-top box data capture, the cable operators have ready access to this data as it is captured on the set-top box by the STB software, whether traditional set-top box software or EBIF applications. The data can then be transferred to central systems at the cable company for analysis. Similarly, satellite broadcasters have access to such data.

A set-top box software application may produce channel change data containing fields similar to this:

a. Set-top box identifier (optionally scrambled to protect viewer identity)
b. Tuner index (to identifier the tuner in the STB)
c. Time in seconds since some historic date
d. Channel call sign
e. Channel source id Those with ordinary skill in the art will recognize that this file format can be transformed into a format similar to SDV Vendor 1 Format by combining data from consecutive channel tune records into a single record containing both tune-in date-time and tune-out date-time. This is done by sorting the file in order by Set-top box identifier, Tuner index, and Time and then using the Time from the next record (minus 1 second) as the tune-out time of the current record. The result is that the tune-in time comes from the current record and the tune-out time comes from the next record. They will also recognize that it is a simple task to convert the time represented in seconds since some historic date to the current date and time in YYYY-MM-DD HH:MM:SS AM/PM format. They will also recognize that by adding a lookup table to the process they can use the Set-top box identifier to look up the values for Market, Headend, Hub, and Service Group. They will also recognize that by adding a second lookup table to the process they can enhance the channel information to also include Channel Name, High Definition or Standard Definition, Bit Rate, and Program Type.

The vendor may generate a tune-out event in the data file when the user turns off the power.

The vendor may also provide the tune-out time in the data file.

Note that current data collection methods support granularity of tuning data down to the second level.

Note: Even with some variation in the file format, this data can still be used to achieve the objective of measuring viewership.

IPTV Data as a Data Source

In the case of internet protocol television (IPTV) or portable (handheld) video viewing devices, content viewing activity can be captured at the device level and transmitted to the IPTV provider. Such data may include a device identifier, a web site or internet protocol address, an IP TV Channel, information about the video content, a video asset identifier, viewing start time, and viewing end time. Using these fields, a data file can be created in a format which allows detailed analysis of viewing activity.

Summary on Channel Tuning Data Sources

For channel change data or channel tuning data, SDV systems capture channel change data in order to support the basic function of providing Switched Digital Video. SDV channel change data is particularly useful because it includes all channel changes, both of broadcast channels and of switched channels.

As an alternative, the channel change data can be captured by the set-top box itself or by an EBIF application on the set-top box.

For both cases, the STB activity (both SDV and non-SDV) is collected without the viewer needing to take any special action. This avoids problems of non-response bias and respondent fatigue. STB data provides very large measurement samples or full census. STB data provides the ability to gather data from many geographic areas. STB data can be augmented with user data, household data, demographic data, geographic data, computer network data, and other fields. Once the channel tune data is processed into a standardized format, the Lead In Analytics Engine 200 can produce viewing metrics using the data—it does not matter whether the data is from an SDV system or from a STB application.

Similarly, for internet protocol television (IPTV) and portable video viewing devices, viewing activity can be readily captured for analysis. This data can also be enriched with various additional fields such as user data, household data, demographic data, geographic data, computer network data, and other fields. It also can be fed into the Lead In Analytics Engine 200 to produce viewing metrics.

Video Asset Schedule Data Sources

Cable television providers, satellite television providers, and IP TV providers all keep accurate scheduling information in order to support their business operations. These systems track the time when programs and advertisements are aired. Programs and advertisements can be labeled with the more general term of video asset. These systems track numerous details about the video assets. Such details typically include:

a. The geographic area in which the video asset aired
b. The channel on which the video asset aired
c. The date and time when the video asset aired
d. The duration of the video asset
e. Various attributes about the video asset such as the video asset identifier, the product type, the video asset name, the producer name, the agency name, the script writer, the featured actor, the actor celebrity status, the featured voice, the product category, the language, the informational content code, the delivery format, the audio track code, the audience suitability rating, and perhaps an episode identifier.

For purposes of this application, it is sufficient to know that the cable television provider or the satellite television provider or the IP TV provider all have program schedule information available to them. Such information can be used to identify lead-in videos to be analyzed along with result (target) videos to be analyzed including the date and time of when the asset was aired along with how it was delivered—on a certain channel or from a certain web site or via an IP address. Additionally, such scheduling systems know all the channels on which content is being delivered, thus providing a list of channels to be analyzed in addition to the target channel on which the asset aired.

In this specification the functionality that is revealed for tracking viewership of a lead-in video asset is the same whether the asset is a 30 second commercial or a 60 minute program. The analyst who is defining the lead-in video has the ability to specify any start and stop time and thus duration as needed.

Similarly, for tracking viewing of the Analysis Period (Target), the functionality described herein provides the analyst with the ability to define any start and stop time as needed. Furthermore, as will be shown in this specification, the analyst can then subdivide that overall Target period window of time into many individual segments as needed.

For both the Lead-in video assets and the Analysis Period (Target) video assets, the video asset scheduling system provides information as to what was playing on each channel at each point in the day so that the analyst is able to construct the input data for both Lead-in and Target that is used by this process.

File Transfer to Receive the Data

In the case of channel tuning data, those with ordinary skill in the art would know how to capture channel change files or tuning data from various source systems and make them available to an analysis engine by reading them any of several data capture systems and transferring them to the data analysis computer using tools such as secure file transfer protocol. Other methods for receiving channel change data may be used such as Extensible Markup Language (XML) messages or any other computer readable format.

Encryption may be applied for data security purposes. Compression may be applied to reduce data transfer volumes.

Additionally, once the data is enriched, key identifiers can be hashed or encrypted to protect the identity of the viewer.

In the case of video asset schedule data, those with ordinary skill in the art would know how to capture such data and make it available to the analyst for use in constructing the Lead-in and Analysis Period files used by this process.

Existing Tools for Data Analysis

We have seen by way of background that channel change data and program schedule data is readily available. Regarding tools for using this data to analyze detailed viewing patterns, I am not aware of any vendor solutions that load second-by-second channel tuning data or video asset viewing device usage data into arrays in the memory of a computer to identify second-by-second channel viewing activity showing the channel to which the video asset viewing device was tuned during each second of a period of interest (examples: a day-part, or a day, or multiple days) and then correlating that channel viewing activity with video asset schedule data and then using the correlated data to produce viewing metrics.

Additionally, I am not aware of any patents that load second-by-second channel tuning data or video asset viewing device usage data into arrays in the memory of a computer to identify second-by-second channel viewing activity showing the channel to which the video asset viewing device was tuned during each second of a period of interest (examples: a day-part, or a day, or multiple days) and then correlating that channel viewing activity with video asset schedule data and then using the correlated data to produce viewing metrics.

Relevant Patents

The patents and patent applications identified below are only mildly relevant. I include them here to acknowledge that others have taught about using set-top box data, but none have used it as I teach in this application and none have been able to produce the detailed metrics that I have identified herein. Examples include:

Conkwright, et al. in U.S. Pat. No. 7,383,243 issued Jun. 3, 2008 teaches about collecting set-top box data for the purpose of predicting what consumers will do, not for the purpose of understanding actual viewer behavior. It appears that he does not teach the loading of a data structure containing buckets representing individual units of time during a window of time of interest for analysis.

Hendricks, et al. in U.S. Pat. No. 7,590,993 Method and apparatus for gathering programs watched data issued Sep. 15, 2009 teaches about collecting tuning data from the set-top box and combining that with other data in a data base to determine the types of programming the STB tunes to. It appears that he does not teach the loading of a data structure containing buckets representing individual units of time during a window of time of interest for analysis or of using such a data structure to determine the duration of program watching.

Relevant Patent Applications

Wood; Catherine Alexandra in U.S. Patent Application 20070074258 dated Mar. 29, 2007 teaches about collecting subscriber activity data, such as channel changes generated by the subscriber while watching video or TV in an IPTV system. It appears that she does not teach the loading of a data structure containing buckets representing individual units of time during a window of time of interest for analysis. It appears instead that she teaches loading the channel tuning data to a relational data base and then performing various SQL based queries against that data base.

Eldering; Charles A.; et al. in U.S. Patent Application 20080127252 dated May 29, 2008 teaches about targeted advertising. He notes that SDV systems have the ability to provide viewership counts. It appears that he does not teach the loading of a data structure containing buckets representing individual units of time during a window of time of interest for analysis.

Allegrezza; Fred J.; et al. in U.S. Patent Application 20090077577 dated Mar. 19, 2009 teaches about aggregating information obtained from the messages to generate channel viewership information identifying a number of subscribers tuned to each broadcast channel over a period of time, but it appears to be based simply on tune-in activity. It appears that he does not teach the loading of a data structure containing buckets representing individual units of time during a window of time of interest for analysis.

Bou-Abboud; Claude H. in U.S. Patent Application 20070214483 dated Sep. 13, 2007 teach about a tool for predicting capacity demands on an electronic system. It appears that they do not teach the loading of a data structure containing buckets representing individual units of time during a window of time of interest for analysis.

Canning; Brian P.; et al. in U.S. Patent Application 20100145791 dated Jun. 10, 2010 teach about storing data in multiple shards and supporting queries against the data. It appears that he does not teach the loading of a data structure containing buckets representing individual units of time during a window of time of interest for analysis.

Summary of Short-Comings in Data Analysis Tools

In general, a short-coming of these methods is that the foundation is a non-procedural language (SQL) used in conjunction with a relational data base which together do not have the detailed processing capability required to perform complex analytics. In such an environment, in order to capture the richness of certain aspects of the channel tuning data, one would have to explode the data out into individual rows with one row for each second of viewer activity. In such an environment, this is extremely expensive because adding a primary key to each data record simply to record the second (time) multiplies the volume of data many times over because the size of the primary key requires much more storage space than the data being recorded. Thus we see that using a non-procedural language (SQL) in conjunction with a relational data base is very inefficient and requires extremely powerful data base servers to analyze this data. In contrast I am able to produce these complex analytics on a simple personal computer.

Another short-coming is that none of the tools allows longitudinal analysis. They do not track viewer activity of a viewer over a period of time to determine how exposure to content in an earlier time period influences viewing of other content in a subsequent time period.

Also as a result of not being able to perform the detailed analytics required, the behavioral and device usage information contained in the data remains hidden from other interested parties.

SUMMARY

In accordance with one embodiment, I disclose a computer-implemented method of using channel tuning data from a video asset viewing device connected to a network to measure video asset viewing at a second-by-second level during one or more user defined lead-in periods, and then correlating that with video asset viewing during a user defined target period, for the purpose of analyzing how viewing activity during the lead-in period(s) correlates with viewing activity during the target period, thus producing longitudinal viewing metrics; all while maintaining viewer anonymity. Additionally, viewing metrics can be categorized based on user defined demographic, geographic, and histogram groupings representing the percentage of video asset viewing with the result that the analyst is able to gain detailed insight into customer viewing behavior. The lead-in video asset may be any video asset or assets. The target may be any subsequent video asset. The metrics produced are useful to service providers, advertisers, and content producers.

As nonlimiting examples, the lead-in video asset may be (1) an ad or ads promoting an upcoming show with the target being that show; (2) a first period in the day with the target being a subsequent period; (3) a weekly series with the target being a subsequent episode.

Advantages

By correlating multiple data sets including (a) Second-by-second channel tuning data provided by a channel tuning data collector, (b) Video Asset Schedule data for Lead-in and Target video assets, (c) Demographic data, and (d) Geographic data and then using this correlated data to produce metrics regarding the interactions of the viewers with video asset viewing devices, I have been able to provide detailed viewing metrics that could not be produced previously. Existing analysis techniques simply do not allow the creation of the detailed viewing metrics which I have been able to produce.

In my co-pending U.S. patent application having application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK", which is incorporated in its entirety but is not admitted to be prior art, and in my co-pending U.S. patent application having application Ser. No. 13/052,026 filed on Mar. 18, 2011 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING", which is incorporated in its entirety but is not admitted to be prior art, I taught populating a Data Structure with identifying information and device usage information such as channel tuning data to create a foundation upon which a comprehensive set of metrics can be produced. In those applications I also taught loading the tuning data on a second-by-second basis into buckets in a data structure for analytics.

In this application I use that concept to populate a User Activity Data Structure containing the details of channel tuning activity over a period of days, along with fields to identify the demographic and geographic identifiers related to the set-top box. In my previous application, in one embodiment I taught populating the buckets with a 1 to indicate viewing of the channel during that second. In this application, in one embodiment, I teach populating the bucket with an identifier for the channel to indicate viewing of that channel during that second. The reader will recognize that in each of these several embodiments I teach loading values that identify second-by-second channel viewing activity to selected buckets in a viewing detail data structure based on the tune-in date and time and the tune-out date and time of each channel tuning event, thus identifying second-by-second channel viewing activity showing whether or not the video asset viewing device was tuned to the channel during each second of a period of interest.

Additionally, in this embodiment I introduce the Lead-in viewing analysis data structure and the Target viewing analysis data structure (combined into one data structure with two parts in the source code: Lead-In and Target Info Data Structure) which I use to record detailed information about lead-in video asset viewing and analysis period result (target) video asset viewing.

By combining the teaching of my co-pending patent applications with the teachings of this application on correlating the Lead In Viewing with the Target Viewing, I am able to produce detailed longitudinal viewing metrics based on a one-second level of granularity.

After populating both the User Activity Data Structure and various fields in the Lead-in viewing analysis and Target viewing analysis data structures, I can then run complex analytics against them to produce a very comprehensive set of metrics on video asset viewing. The metrics can then be output as (i) a data file that can be read by a computer program, (ii) a data base table, (iii) an electronic message, or (iv) a spreadsheet.

A person skilled in the art will readily see the benefits of loading the resulting metrics to a relational data base where additional queries and analytics can be run using standard SQL. Additionally, the resulting files may be loaded to other statistical analysis tools or data base structures. As a nonlimiting example, metrics calculated by the Lead In Analytics Engine 200 can be loaded to a data base in support of longer term analysis.

The Lead In Analytics Engine 200 presented in this embodiment provides the ability to produce metrics with a level of detail not possible previously. A sampling of the metrics produced by the Lead In Analytics Engine 200 is presented next:

Lead-in Viewing Metrics

Counts of video asset viewing devices and aggregate viewing seconds for those video asset viewing devices that tuned to a Lead-in video asset, aggregated into categories based on the analyst's choice of demographic category and/or geographic category, and then aggregated into histogram buckets representing percent of viewing of the lead-in video asset.

Target Viewing Metrics

Counts of video asset viewing devices and aggregate viewing seconds for those video asset viewing devices that tuned during a Target window to identify viewing of the Target video asset or viewing of other video assets (channels) competing with the Target video asset. The Target viewing window may be broken into viewing segments for finer granularity of analysis. The Segment viewing is separated into categories based on the analyst's choice of demographic category and/or geographic category and/or histogram bucket where the histogram bucket allows the analyst to group target viewing based on the aggregate of all the Lead-in viewing. Additionally, during the target viewing window, counts of viewing for each channel are tabulated along with percentage of viewing for each channel. The result is that for each target analysis period, the system calculates total viewing seconds and percentage of total viewing for every channel that was viewed during the target window at the level of demographic-geographic-histogram grouping.

Longitudinal Viewing Analysis

Longitudinal analysis is provided in that the system calculates viewing of one or more Lead-in video assets along with aggregate viewing of all the Lead-in video assets by the video asset viewing device during the study period. The result is that for each study, the system identifies the total viewing at a video asset viewing device level of all the Lead-in viewing, and groups that into a Result Histogram Bucket. The system then uses that Result Histogram Bucket to categorize viewing by that same video asset viewing device during a target period. The result is that the system is aggregating video asset viewing device viewing during a lead-in period and then tracking the viewing by the same video asset viewing device during a result (target) period. All of this is done at a second-by-second level.

Alternative Identifiers

The reader will note that in the above descriptions, I specified a video asset viewing device identifier. This is merely one embodiment. In another embodiment, the Lead In Analytics Engine 200 may be presented with an identifier of a computer system that is accessed to deliver the video; or of an identifier, perhaps encrypted, of the viewer (operator) of the video asset viewing device; or of an identifier, perhaps encrypted, of the household associated with the video asset viewing device; or of a demographic grouping associated with the viewer (operator) of the video asset viewing device; or of a geographic location associated with the video asset viewing device.

As a non-limiting example, by using the identifier of the viewer instead of the device, the Lead In Analytics Engine 200 may be used to track lead-in and target viewing activity across numerous devices all associated with that viewer. Business rules could be added to determine how to count concurrent viewing activity on two devices, perhaps by allocating a percentage credit to each device.

As a non-limiting example, by using the identifier of the household instead of the device, the Lead In Analytics Engine 200 may be used to track lead-in and target viewing activity across numerous devices all associated with that household. Business rules could be added to determine how to count concurrent viewing activity on two or more devices.

Summary of Metrics Produced

The metrics listed above are only some of the metrics which are produced by the Lead-In Analytics Engine 200 in one embodiment. Additional metrics could be produced once the data is loaded to the Data Structures. It is the extensive processing done by the Lead-In Analytics Engine 200 which turns the correlated data sets into valuable information.

The metrics shown above all provide information useful for understanding viewer behavior; understanding how viewers interact with video programming on traditional television and internet protocol television; and understanding ad and program viewing habits. Such metrics will provide valuable information for advertisers, service providers (cable television companies, satellite television companies, and/or internet protocol television providers), advertising agencies, and other interested parties.

These and other advantages of one or more aspects will become apparent from a consideration of the ensuing description and accompanying drawings.

Data Encryption

To protect the privacy of the viewer and/or to comply with various laws and/or regulations, service providers (cable television companies, satellite television companies, and/or internet protocol television providers) may anonymize and/or encrypt any data that could identify a specific customer or viewer.

Within the various embodiments presented herein, applying consistent encryption algorithms to the video asset viewing device identifiers (Set-top box id's) in the Channel Tune File 110 allows the Lead-In Analytics Engine 200 to produce the metrics identified herein while protecting viewer privacy.

In like manner, if the encryption algorithms are consistently applied over an extended period of time, this allows longitudinal analysis of the data while protecting the privacy of the viewer. In this case, the systems would need to apply consistent encryption algorithms to the video asset viewing device identifiers (Set-top box id's) in the Channel Tune File 110 to allow the Lead-In Analytics Engine 200 to correlate the data. For example, applying a consistent encryption algorithm to the video asset viewing device identifier in the Channel tuning file allows the Lead-In Analytics Engine 200 to perform longitudinal studies using the channel tuning data over a period of time.

DEFINITIONS

The following are definitions that will aid in understanding one or more of the embodiments presented herein:

Asset identifier means any character or number or series of characters or numbers that allows a video asset to be uniquely identified. Nonlimiting examples include:

(i) industry program id,
(ii) industry asset id,
(iii) asset description
(iv) asset title.

Buckets means individual cells in a Data Structure. Nonlimiting examples include:
(i) addressable fields in a table in a COBOL program,
(ii) addressable fields in an array or similar structure in a 'C' program or a C++ program,
(iii) cells in a spreadsheet.

Channel tuning activity means information derived from the channel tuning data which shows on a second-by-second basis for each second during a period of interest the channel to which the video asset viewing device was tuned. As a nonlimiting example, this would typically identify whether or not the video asset viewing device was tuned to the channel on which the lead-in video asset was aired during each second of time that the lead-in video asset aired. As a second nonlimiting example, this would typically identify whether or not the video asset viewing device was tuned to the channel on which the target video asset was aired during each second of time that the target video asset aired.

Channel tuning data means any data that captures any aspect of viewer interaction with a video asset viewing device being used to view and/or record video assets, along with supporting information. One of the uses of channel tuning data is to identify content viewed and the times the content was viewed by the set-top box. Nonlimiting examples of viewer interactions captured as channel tuning data include:
(i) tuning activity on a set-top box,
(ii) recording video content,
(iii) playing back recorded video content,
(iv) using trick plays such as fast forward, rewind, pause, etc.
(v) invoking a menu, choosing a menu option,
(vi) any response to a screen prompt,
(vii) power on/power off.

Supporting information includes but is not limited to video asset viewing device information, set-top box information, channel information, geographic area, and information about the computer or cable television system that serves the set-top box.

Channel tuning events means any identifiable activity that a set-top box operator may do in regard to a set-top box and where such activity can be captured by the set-top box. Nonlimiting examples include:
(i) power on/power off,
(ii) channel up/channel down/channel selection,
(iii) volume up/volume down/mute/unmute,
(iv) any trick play such as fast forward, rewind,
(v) recording video content,
(vi) playing back recorded video content,
(vii) invoking a menu, choosing a menu option,
(viii) any response to a screen prompt.

COBOL is the acronym of a business oriented computing language.

Computer readable format means any method of presenting data to a data analysis computer system. Nonlimiting examples include:
(i) formatted text files,
(ii) pipe delimited text files,
(iii) data base tables,
(iv) Extensible Markup Language (XML) messages.

Computer system accessed through a network means any computer system, any individual piece of computer equipment or electronic gear, or any combination of computer equipment or electronic gear which enables or facilitates the viewer interaction with the video asset viewing device. Nonlimiting examples include:
(i) cable television system,
(ii) cable television switched digital video system,
(iii) cellular phone network,
(iv) satellite television system,
(v) web server,
(vi) any individual piece of computer equipment or electronic gear,
(vii) any combination of computer equipment or electronic gear.

Data analysis computer system means a combination of one or more computers on which a Data Analysis Program or Programs can be executed.

Data analysis computer of known type means any commonly available computer system running a commonly known operating system. Nonlimiting examples include:
(i) a standard personal computer running WINDOWS® XP operating system from MICROSOFT® Corporation,
(ii) a computer running the UNIX operating system,
(iii) a computer running the Linux operating system,
(iv) a computer in a cloud computing environment,
(v) a set-top box with its operating system,
(vi) A mainframe computer with its operating system,
(vii) a standard personal computer running WINDOWS 7 Professional operating system from MICROSOFT® Corporation.

Data analysis program means a computer program or programs that are able to execute on a Data analysis computer of known type.

Data base table means any relational data base table structure or comparable data base object.

Demo-geo-histg code is an abbreviation for Demographic-Geographic-Histogram code.

Demographic data/information means any data item that can describe a characteristic of the viewer who is operating the video asset viewing device. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level. The Demographic identifier is populated with Demographic data.

Directly or indirectly is used to define the immediacy of an event. Directly refers to an event occurring in relation to a viewer interaction with an video asset viewing device where the event occurs immediately as a result of the viewer action, a nonlimiting example would be a channel change which occurs when the user presses the keys on the remote; indirectly refers to an action which occurs at a later point in time as a result of a previous viewer action, a nonlimiting example would be the video asset viewing device tuning to a channel and recording a movie because the video asset viewing device was programmed by the viewer to do so.

DVR means Digital Video Recorder.

Electronic message means any computer readable output that can be used as input to another computer or read by a human. Nonlimiting examples include:
(i) data output in Extensible Markup Language format,
(ii) data output in Hypertext Markup Language format, etc.

Equipment identifier means any combination of letters, numbers or symbols that can identify a piece of computer hardware.

Geographic area/information means any service area or any network hierarchy designation or marketing area or other designated area used by a cable television company or a satellite television company or IP Television delivery company or video asset delivery system. The boundary or description of a geographic area is defined based on the needs of the service provider. Nonlimiting examples include a Market in a cable company network, a Headend in a cable company network, a Hub in a cable company network, a census tract, a cell tower identifier, a service area for satellite TV, advertising zone, a zip code, or some other geographic identifier. The Geographic identifier is populated with Geographic data.

Headend means a location in a network where incoming signals are received, prepared, and then transmitted downstream to other parts of the network. Nonlimiting examples include: In a cable television network the signals are received at the headend, prepared and amplified, and then transmitted to downstream hubs for further distribution. A headend typically serves multiple hubs.

HFC Network means hybrid fiber coax network.

High definition means television channels having high resolution and thus they are delivered using a data transfer rate of approximately 15 megabits per second.

Hub means a location in a network where incoming signals are received, and then transmitted downstream to other parts of the network. Nonlimiting examples include: In a cable television network the signals are received at the hub and then transmitted to downstream service groups or nodes for further distribution. A hub typically serves multiple service groups.

Identifier of computer system accessed through a network see Computer system accessed through a network.

Identifier of operator of video asset viewing device see Viewer identifier.

Identifier of household associated with video asset viewing device see Viewer household identifier.

Identifier of Video asset viewing device see Video asset viewing device identifier.

Individual units of time means any period of time that may be of interest in relation to measuring viewer interaction with video asset viewing devices accessed through a network. Nonlimiting examples include:

(i) seconds in a day,
(ii) minutes in a day,
(iii) commercial periods during a television program,
(iv) quarter hours of a day,
(v) hours of a day,
(vi) four hour blocks in a day,
(vii) days,
(viii) time period when a certain program is running,
(ix) user defined day parts,
(x) user defined time periods.

Market means a geographic area within a service providers' network.

Network means any computer network. Nonlimiting examples include:

(i) a cable television network,
(ii) a cellular telephony network,
(iii) hybrid fiber coax system,
(iv) a satellite television network,
(v) a wi-fi network,
(vi) any means that supports communication among video asset viewing devices or electronic devices or computers or computer systems.

Node means a component in a cellular network or a cable television network.

Pipe delimited text files means data files where the fields are separated by the "I" character.

Period of interest means a period of time with a defined starting point and a defined ending point.

Service group means a location in a network where incoming signals are received and then transmitted to set-top boxes. Nonlimiting examples include:

In a cable television network the signals are received at the service group and then transmitted to downstream nodes or to set-top boxes. A service group typically serves 250 to 1000 homes. In some cable television networks a service group may equate to a Node.

Set-top box means a video asset viewing device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel. A set-top box may also play back previously recorded video content.

Set-top box identifier means any combination of letters, numbers or symbols that can identify a set-top box. Nonlimiting examples include:

(i) Set-top box Media Access Control address (MAC address),
(ii) Set-top box serial number, etc.
(iii) Encrypted versions of these values,
(iv) A generic identifier assigned to a multiple set-top boxes having a similar demographic profile or viewing profile or usage profile.

Spreadsheet means any commonly known electronic worksheet format. Nonlimiting examples include:

(i) MICROSOFT® EXCEL® files.

Standard definition means television channels having standard resolution and thus they are delivered using a data transfer rate of approximately 3.75 megabits per second.

STB means Set-top box.

Tune-in date and time means the date and time when the set-top box or video asset viewing device initiates viewing on the channel. This can be represented in any format that can be used to identify the point in time when the set-top box initiates viewing on the channel. Nonlimiting examples include:

(i) YYYY-MM-DD HH:MM:SS AM/PM,
(ii) YYYY-MM-DD 24HH:MM:SS,
(iii) seconds since some historic date,
(iv) HH:MM:SS AM/PM when the date is recorded in a separate field but readily available.

Tune-out date and time means the date and time when the set-top box or video asset viewing device ended viewing on the channel. This can be represented in any format that can be used to identify the point in time when the set-top box ended viewing on the channel. Nonlimiting examples include:

(i) YYYY-MM-DD HH:MM:SS AM/PM,
(ii) YYYY-MM-DD 24HH:MM:SS,
(iii) seconds since some historic date,
(iv) HH:MM:SS AM/PM when the date is recorded in a separate field but readily available.

Tuner means a tuner in a Set-top box.

Tuner index means an identifier of a tuner in a Set-top box.

Useful format means any flat file, spreadsheet, data base table, xml message, etc. that can convey information or that can be used to transmit data for further analysis.

Video asset means any programming content that may be viewed and/or heard. A video asset may be a lead-in video asset or a target video asset. Nonlimiting examples include:
(i) advertisements or commercials,
(ii) movies,
(iii) sports programs,
(iv) news casts,
(v) music.

Video asset identifier means a field or combination of fields that can uniquely identify both (a) a video asset, and (b) the unique airing of a video asset which is typically based on geography, date, time and channel. A Nonlimiting example is provided to illustrate: A video asset such as an automobile ad is assigned unique identifier; then each time the ad airs requires another level of tracking; together these form the video asset identifier.

Video asset viewing device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Video asset viewing device identifier means any combination of letters, numbers or symbols that can identify a video asset viewing device. Nonlimiting examples include:
(i) set-top box Media Access Control address (MAC address),
(ii) cell phone Electronic Serial Number (ESN), Mobile Identification Number (MIN), System Identification Code (SIC), phone number,
(iii) computer internet protocol address, etc.
(iv) encrypted versions of these values,
(v) a generic identifier assigned to a multiple electronic devices having a similar demographic profile or viewing profile or usage profile.

Video asset viewing device usage data means any data that captures any aspect of a human interaction with an Video asset viewing device being used to view and/or record video assets, along with supporting information. One of the uses of Video asset viewing device usage data is to identify content viewed and the times the content was viewed by the device. Nonlimiting examples include:
(i) tuning activity on a set-top box,
(ii) tuning activity on a Video asset viewing device,
(iii) tuning activity on an internet protocol television,
(iv) starting and stopping a video stream,
(v) recording video content,
(vi) playing back recorded video content, (vii) using trick plays such as fast forward, rewind, pause, etc.
(viii) invoking a menu, choosing a menu option,
(ix) any response to a screen prompt,
(x) power on/power off.

Supporting information includes but is not limited to Video asset viewing device information, set-top box information, channel information, geographic area, information about the computer that serves the video asset viewing device.

The Channel Tune File 110 (see FIG. 14-A-B-C for details) provided by the Channel Tuning Data Collector 100 is a nonlimiting example of Video asset viewing device usage data.

Video asset viewing device usage pattern means any data that captures any aspect of a viewer interaction with a Video asset viewing device.

Viewer means the human being causing a Viewer interaction; the user of a Set-top box or a Video asset viewing device.

Viewer household identifier means means any combination of letters, numbers or symbols that can identify the household with which the viewer using a video asset viewing device is linked. The value can be in plain text or encrypted. It can be a name or an account number or an address or a property tax id or any other suitable value. It may be used to group viewing from multiple video asset viewing devices that all belong to the same household or to members of the same household. As a non-limiting example, by grouping viewing across all of the video asset viewing devices the system could determine whether any device in the household was tuned to a lead-in video asset when it aired.

Viewer identifier means means any combination of letters, numbers or symbols that can identify the operator or viewer using a video asset viewing device. The value can be in plain text or encrypted. It can be a name or an account number or any other suitable value. It may be used to identify the same human being using multiple video asset viewing devices.

Viewer interactions means any identifiable activity that a Video asset viewing device operator may do in regard to a Video asset viewing device and where such activity can be captured by the video asset viewing device or by the computer system, accessed through the network, that supports the device. Nonlimiting examples include:
(i) power on/power off, open web page, close web page,
(ii) channel up/channel down/channel selection, play video content on web browser,
(iii) volume up/volume down/mute/unmute,
(iv) any trick play such as fast forward, rewind, pause
(v) recording video content,
(vi) playing back recorded video content,
(vii) invoking a menu, choosing a menu option,
(viii) any response to a screen prompt.

Viewing habits means any information that provides insight into how a video asset viewer interacts with the content provided to them.

Viewing metrics means any value calculated by a Data Analysis Program.

Viewing Detail data structure means a place in a computer program or computer system where data can be stored in tabular form with identifying fields for things of interest for analysis and buckets associated with those identifying fields in such a manner that formula and algorithms can be run against the data to produce meaningful metrics. Nonlimiting examples include:

(i) table in a COBOL program, (ii) array or similar structure in a 'C' program or a C++ program, (iii) spreadsheet;

such structures may be stored in the memory of the computer, but they could also be stored on electronic disk or other computer hardware.

Window of time of interest for analysis means any period of time during which it is desired to measure the viewer interaction with a video asset viewing device accessed through a network. Nonlimiting examples include:

(i) minutes in a day, (ii) commercial periods during a television program, (iii) quarter hours of a day, (iv) hours of a day, (v) four hour blocks in a day, (vi) days, (vii) any period of time useful for analysis, (viii) any period of time that can be defined by a starting date and time and an ending date and time Etc.

BRIEF DESCRIPTION OF THE DRAWINGS

In the drawings, closely related figures have the same number but different alphabetic suffixes.

FIGS. 14-A-B-C illustrate an exemplary record layout for the Channel Tune File formatted for use as input to the Lead In Analytics Engine 200 with FIG. 14-A illustrating the file format, and FIG. 14-B illustrating sample data as it appears in the input file, and FIG. 14-C illustrating sample data formatted for human readability, according to one embodiment. This relates to part 110.

FIGS. 15-A-B-C illustrate an exemplary record layout for the Analysis Group Info File formatted for use as input to the Lead In Analytics Engine 200 with FIG. 15-A illustrating the file format, and FIG. 15-B illustrating sample data as it appears in the input file, and FIG. 15-C illustrating sample data formatted for human readability, according to one embodiment. This relates to part 120.

FIGS. 16-A-B-C illustrate an exemplary record layout for the Lead In Video Play Info File formatted for use as input to the Lead In Analytics Engine 200 with FIG. 16-A illustrating the file format, and FIG. 16-B illustrating sample data as it appears in the input file, and FIG. 16-C illustrating sample data formatted for human readability, according to one embodiment. This relates to part 130.

FIGS. 17-A-B-C illustrate an exemplary record layout for the Lead In Demographic Geographic Histogram Definition File formatted for use as input to the Lead In Analytics Engine 200 with FIG. 17-A illustrating the file format, and FIG. 17-B illustrating sample data as it appears in the input file, and FIG. 17-C illustrating sample data formatted for human readability, according to one embodiment. This relates to part 140.

FIGS. 18-A-B-C illustrate an exemplary record layout for the Analysis Period Target File formatted for use as input to the Lead In Analytics Engine 200 with FIG. 18-A illustrating the file format, and FIG. 18-B illustrating sample data as it appears in the input file, and FIG. 18-C illustrating sample data formatted for human readability, according to one embodiment. This relates to part 150.

FIGS. 19-A-B-C illustrate an exemplary record layout for the Analysis Period Definition File formatted for use as input to the Lead In Analytics Engine 200 with FIG. 19-A illustrating the file format, and FIG. 19-B illustrating sample data as it appears in the input file, and FIG. 19-C illustrating sample data formatted for human readability, according to one embodiment. This relates to part 160.

FIGS. 20-A-B-C illustrate an exemplary record layout for the Result Demographic Geographic Histogram Definition File formatted for use as input to the Lead In Analytics Engine 200 with FIG. 20-A illustrating the file format, and FIG. 20-B illustrating sample data as it appears in the input file, and FIG. 20-C illustrating sample data formatted for human readability, according to one embodiment. This relates to part 170.

FIGS. 21-A-B-C illustrate an exemplary record layout for the Channels To Analyze File formatted for use as input to the Lead In Analytics Engine 200 with FIG. 21-A illustrating the file format, and FIG. 21-B illustrating sample data as it appears in the input file, and FIG. 21-C illustrating sample data formatted for human readability, according to one embodiment. This relates to part 180.

FIGS. 22-A-B-C illustrate an exemplary record layout for the Tuning Data Dates File formatted for use as input to the Lead In Analytics Engine 200 with FIG. 22-A illustrating the file format, and FIG. 22-B illustrating sample data as it appears in the input file, and FIG. 22-C illustrating sample data formatted for human readability, according to one embodiment. This relates to part 190.

FIGS. 23-A-B-C illustrate an exemplary record layout for the Analysis Group File created as output from the Lead In Analytics Engine 200 with FIG. 23-A illustrating the file format, and FIG. 23-B illustrating sample data as it appears in the output file, and FIG. 23-C illustrating sample data formatted for human readability, according to one embodiment. This relates to part 210.

FIGS. 24-A-B-C illustrate an exemplary record layout for the Analysis Lead In Period File created as output from the Lead In Analytics Engine 200 with FIG. 24-A illustrating the file format, and FIG. 24-B illustrating sample data as it appears in the output file, and FIG. 24-C illustrating sample data formatted for human readability, according to one embodiment. This relates to part 220.

FIGS. 25-A-B-C illustrate an exemplary record layout for the Lead In Viewing Result File created as output from the Lead In Analytics Engine 200 with FIG. 25-A illustrating the file format, and FIG. 25-B illustrating sample data as it appears in the output file, and FIG. 25-C illustrating sample data formatted for human readability, according to one embodiment. This relates to part 230.

FIGS. 26-A-B-C illustrate an exemplary record layout for the Analysis Period Result Header File created as output from the Lead In Analytics Engine 200 with FIG. 26-A illustrating the file format, and FIG. 26-B illustrating sample data as it appears in the output file, and FIG. 26-C illustrating sample data formatted for human readability, according to one embodiment. This relates to part 240.

FIGS. 27-A-B-C illustrate an exemplary record layout for the Analysis Period Result Detail File created as output from the Lead In Analytics Engine 200 with FIG. 27-A illustrating the file format, and FIG. 27-B illustrating sample data as it appears in the output file, and FIG. 27-C illustrating sample data formatted for human readability, according to one embodiment. This relates to part 250.

FIGS. 28-A-B-C illustrate an exemplary record layout for the Analysis Period Result Demographic Geographic Histogram Detail File created as output from the Lead In Analytics Engine 200 with FIG. 28-A illustrating the file format, and FIG. 28-B illustrating sample data as it appears in the output file, and FIG. 28-C illustrating sample data formatted for human readability, according to one embodiment. This relates to part 260.

FIGS. 29-A-B-C illustrate an exemplary record layout for the Analysis Period Result Channel Viewing Detail File created as output from the Lead In Analytics Engine 200 with FIG. 29-A illustrating the file format, and FIG. 29-B illustrating sample data as it appears in the output file, and FIG. 29-C illustrating sample data formatted for human readability, according to one embodiment. This relates to part 270.

FIGS. 30-A-B illustrate an exemplary data structure for storing channel tuning data from the Channel Tune File 110 in the memory of a computer in preparation for analyzing channel tuning activity with FIG. 30-A illustrating the data structure with its fields and FIG. 30-B Illustrating sample data as it would appear in this data structure. In the accompanying program, this array is named CHAN-VIEWING-DETAIL.

FIG. 31 illustrates an exemplary data structure for storing the various data fields used by the Lead In Analytics Engine 200 to track lead-in and result viewing.

FIG. 32 illustrates an exemplary data structure for the Lead-In Demographic Geographic Histogram Array which is used to store the demographic-geographic-histogram definitions used by the Lead In Analytics Engine 200 for categorizing lead-in viewing.

FIG. 33 illustrates an exemplary data structure for the Result Demographic Geographic Histogram Array which is used to store the demographic-geographic-histogram definitions used by the Lead In Analytics Engine 200 for categorizing result viewing.

FIG. 34 illustrates an exemplary data structure for the Channels to Analyze Array which is used to store the channels which will be analyzed by the Lead In Analytics Engine 200 as part of this study.

DETAILED DESCRIPTION OF THE DRAWINGS

Figure 1:
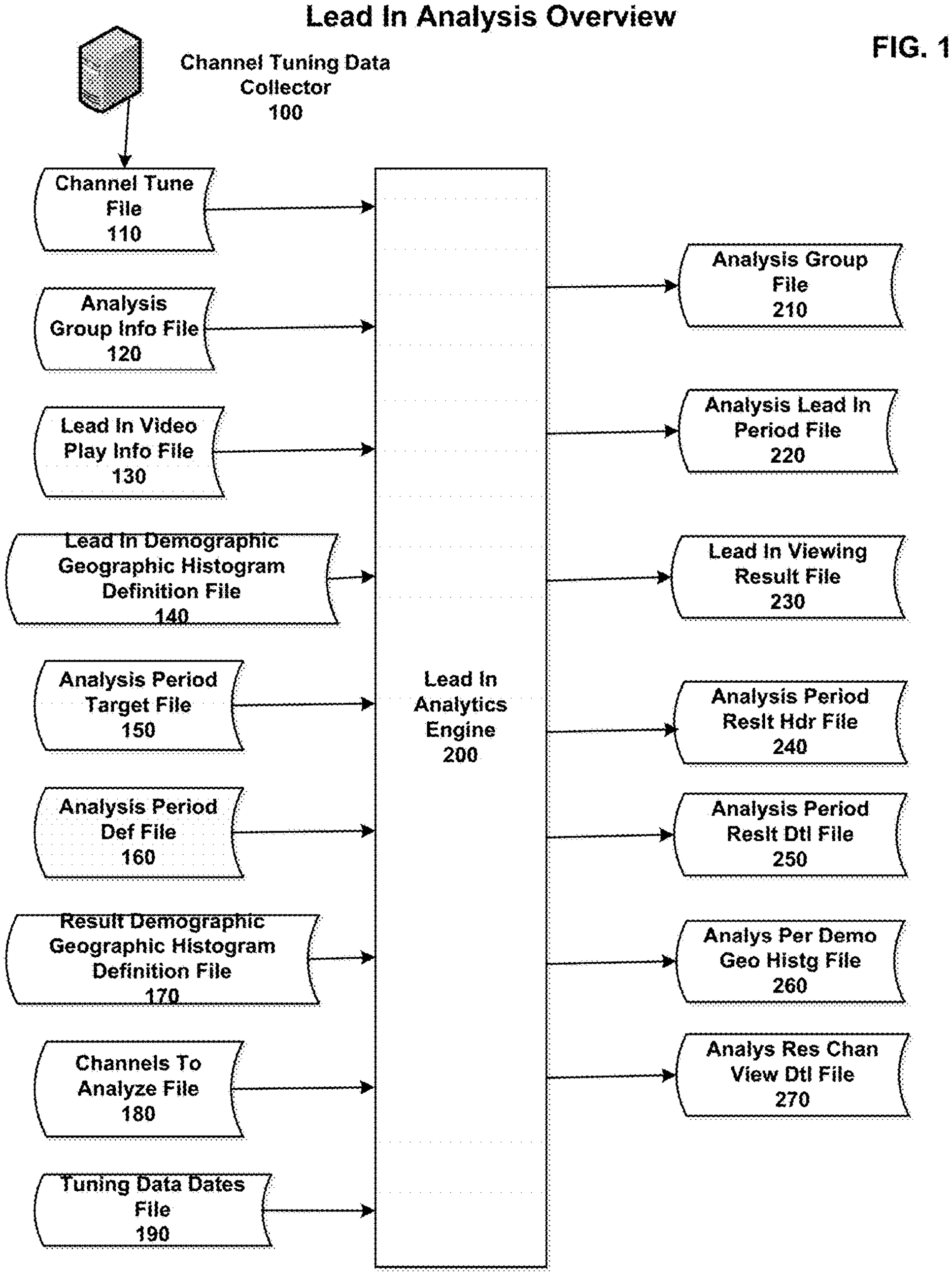
FIG. 1 is a flowchart illustrating an overview of an exemplary process for receiving and processing (a) channel tuning data from a data collector, (b) lead in schedule data with supporting files, and then using a computer to analyze these data sources to produce set-top box channel tuning metrics, according to one embodiment.

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

Note on Claims reference in drawings—because of the large number of data fields and new concepts taught in this specification, and because a description in the drawings may not use the exact same words or spelling as the corresponding concept in the claims, the reader will note that in limited cases I have added text preceded by the words "Claims reference" to assist the reader in correlating information in the drawings or detailed description of the drawings with the corresponding information in the claims.

For many of the metrics shown below, I have suggested what the metric indicates. This is not to limit the purpose of the metric to that one usage, but simply to indicate one of potentially many valuable uses for the metric.

Note that the specification and drawings use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device.

Thus any discussion below that refers to a set-top box should be read to also include any kind of a video asset viewing device.

In one embodiment the Lead-In Analytics Engine 200 can be implemented on processors provided by the INTEL® Corporation under the trademark Core™ i3-2120 using single or multiple processor configurations. The operating system offered by MICROSOFT® Corporation under the trademark WINDOWS 7 Professional can be used as the computer operating system. The Lead-In Analytics Engine 200 can be implemented in a number of programming languages, including but not limited to, COBOL, C and C++.

I have implemented the Lead-In Analytics Engine 200 and supporting code in FUJITSU® NetCOBOL® for WINDOWS® version 10.1 developed by Fujitsu® and distributed by Alchemy Solutions Inc. This product is available at http://www.alchemysolutions.com or http://www.netcobol-.com. The Lead-In Analytics Engine 200 and all of the supporting processes have been developed and run on a DELL® Vostro 260 with INTEL® Core™ 13-2120 CPU 3.30 GHz with 4.00 GB of RAM running MICROSOFT® WINDOWS 7 Professional Service Pack 1. The computer was purchased from Dell Computer Corporation. The operating system is from Microsoft.

Although the embodiments described herein enable one of ordinary skill in the art to implement (i.e. build) the Lead-In Analytics Engine 200 and supporting software, it in no way restricts the method of implementation, the Lead-In Analytics Engine 200 and supporting software being capable of being implemented on a variety of hardware/software platforms using a variety of development languages, databases, communication protocols and frameworks as will be evident to those of ordinary skill in the art.

FIG. 1 is a flowchart illustrating an overview of an exemplary process for receiving and processing (a) channel tune data from a channel tuning data collector, (b) lead-in schedule data, (c) target analysis period data, (d) channels to analyze, (e) tuning data dates and then using these data sources to produce viewing metrics, according to one embodiment.

As I described in my prior U.S. patent application having application Ser. No. 12/981,301 filed on Dec. 29, 2010, a cable television company may operate a Switched Digital Video system from a vendor which provides such a system. That system collects channel tuning data as part of its normal operation. Such data can be preprocessed using a computer program which reformats the SDV vendor's channel tuning data into a common format, performs data enrichments, and applies business rules as data quality checks all in preparation for creating an unsorted channel tune file in a common or standardized format.

I also described in that prior application how a cable television company or satellite television broadcasting company provides Set-top box application software for its customers to use to operate their set-top box. Such software may be developed in-house or by a third party. The STB software collects channel tuning data as part of the normal operation of said Set-top box application software system. STB Channel tuning data is then preprocessed using a computer program which reformats the STB Channel tuning data into a common format, performs data enrichments, and applies business rules as data quality checks all in preparation for creating an unsorted channel tune file in a common or standardized format.

In addition to those methods for collecting channel tuning data, there are now set-top box applications available that are able to collect channel tuning data and other set-top box interactions. The company FourthWall Media provides such as application. See their web site at http://www.fourthwall-media.tv/Products/.

In the context of hand-held personal communication devices which play audio and video, the devices are able to capture video viewing information and make that information available to an analytics engine.

Data from any of these sources and other potential sources are represented by the Channel Tuning Data Collector 100 which takes the raw channel tuning data from various sources, reformats it into a common format, performs data enrichments, and applies business rules as data quality checks, all in preparation for creating an unsorted channel tune file in a common or standardized format. Said Channel Tuning Data Collector 100 then sorts the unsorted channel tuning data to produce Channel Tune File 110 (see FIG. 14-A-B-C for details). Again, this processing is fully described in my prior application, so it is reviewed here only at a summary level.

In FIG. 14-A I note that the Lead-In Analytics Engine does not presently use all of the fields that may be available. Because they are part of the process described in my prior patent application I have included them here with notations as to which are not presently used. Finally, note that the last two fields in the record layout have been renamed to DEMOGRAPHIC-CODE 1220 and GEOGRAPHIC-CODE 1230. These Demographic and Geographic codes will be used to group the video asset viewng devices into various categories as explained later in this Specification.

In addition to providing the Channel Tuning Data as a file, this information could also be provided as the result set of a data base query or as XML messages.

In a similar manner, an internet protocol television system can track the viewing activity related to each video asset and make that viewing activity available to the Lead-In Analytics Engine 200.

Proceeding with the review of FIG. 1, an Analysis Group Info File 120 is provided as input to the Lead-In Analytics Engine 200. The Analysis Group Information File 120 records overall information about the Analysis study that is being done. Each study will have one Analysis Group Info record with fields similar to those described in FIG. 15-A. The data in this file may be entered to a data base using a graphical user interface and then queried from there to provide the file, or it may be entered to a web application and provided as an XML file, or it may be keyed into a flat file directly. Additionally, this data may be sourced from a video Asset Schedule data system. Those with ordinary skill in the art will have no difficulty using common software development tools to develop a process which provides a file or a database table like the one shown as input to the Lead-In Analytics Engine 200.

Proceeding with the review of FIG. 1, a Lead In Video Play Info File 130 is provided as input to the Lead-In Analytics Engine 200. The Lead In Video Play Info File 130 records information about each of the Lead In video viewing periods. The analyst is allowed to define whatever Lead-In periods he wants to analyze. The Lead In Video Play Info File 130 and its use by the Lead-In Analytics Engine 200 is setup to provide the Analyst with a great deal of flexibility in defining the lead-in periods to be analyze as part of the study. As non-limiting examples, I provide the following:

1. In the case of an ad or a series of ads promoting an upcoming program, this file is used to define the ads that are presented to the viewer to encourage them to view the target program (video asset).
2. In the case where the analyst is seeking to explore viewership of a particular program, the analyst may use this file to define segments of that program such as twelve (12) five (5) minute segments for a one hour program.
3. In the case of an episodic program, the analyst may use this file to define each weekly episode for the last 7 weeks.
4. In the case of the nightly news, the analyst may use this file to define daily news casts for the last week.
5. In the case of a series of ads where the the advertiser is trying to measure audience fatigue as shown by increased channel surfing during the ad, the analyst may use this file to define each of the instances of an ad that ran during the last day or several days.
6. In the case of prime time viewing, the analyst may use this file to define the first hour of broadcasting which is then followed by a target hour.

Each study will have a Lead In Video Play Info File 130 with each record having fields similar to those described in FIG. 16-A. The analyst is allowed to define whatever Lead-In periods he wants to analyze. The Analyst will define as many records as needed to define the lead-in periods of interest. The Lead In Analytics Engine 200 presently supports up to 100 Lead In periods, but this may be changed as needed.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Proceeding with the review of FIG. 1, a Lead In Demographic Geographic Histogram Definition File 140 is provided as input to the Lead-In Analytics Engine 200. The Lead In Demographic Geographic Histogram Definition File 140 is used to create a user defined Histogram of Demographic identifier, Geographic identifier, and Histogram Percentages by which to categorize Lead In viewing. This process provides the Analyst with flexibility to define Lead-in period viewing in three dimensions: Demographic, Geographic, and Histogram viewing percentage based on viewing during the individual lead-in period. By defining the break-outs for the individual lead-in period, the Analyst can gain deep insight into which Demographic and Geographic Groups actually view the lead-in video and in what amount.

As non-limiting examples, I provide the following examples of how the Lead In Demographic Geographic Histogram may be configured:

1. The Analyst may define one Demographic Group and one Geographic Group with a variety of Histogram viewing buckets.
2. The Analyst may define Several Demographic Groups and one Geographic Group with a variety of Histogram viewing buckets.
3. The Analyst may define one Demographic Group and several Geographic Groups with one Histogram viewing bucket.
4. The Histogram viewing buckets may be defined from 1% to 100% with any number of breakdowns or only one bucket for the entire range if the intent is to focus only on demographic and/or geographic attributes of the viewers.
5. A Histogram viewing bucket may be defined as 0 to 0 which enables analysis based on set-top boxes which were not tuned during the lead-in video viewing periods.

Each study will have a Lead In Demographic Geographic Histogram Definition File 140 with each record having fields similar to those described in FIG. 17-A. The analyst is allowed to define whatever Lead In Demographic Geographic Histogram Definition he wants to analyze. The Lead In Demographic Geographic Histogram Definition File 140 and its use by the Lead-In Analytics Engine 200 is setup to provide the Analyst with a great deal of flexibility in defining how to segment the viewers that viewed the various the lead-in periods that are being analyzed as part of the study.

The Lead In Analytic Engine presently supports up to 200 combinations of Demographic, Geographic, and Histogram categories, but this may be changed as needed.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Note: The histogram aspect of this file is similar to the histogram for Result viewing but it has its own definition because the purpose is very different. This histogram is applicable only to analyzing Lead In viewing during the individual lead-in periods.

Proceeding with the review of FIG. 1, an Analysis Period Target File 150 is provided as input to the Lead-In Analytics Engine 200. The Analysis Period Target File 150 records information about the Target video asset for which the system is tracking viewership to understand how effective the lead in video assets were in encouraging viewership of the Target. The Lead-In Analytics Engine 200 presently supports one Analysis Period Target. The Target can then be broken into segments as defined in FIG. 19-A.

Each study will have one Analysis Period Target File record with fields similar to those described in FIG. 18-A. The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Proceeding with the review of FIG. 1, an Analysis Period Definition File 160 is provided as input to the Lead-In Analytics Engine 200. The Analysis Period Definition File 160 records information about each of the viewing segments that the analyst has defined for the Target video. The analyst is allowed to define whatever viewing segments he wants to analyze. The Analysis Period Definition File 160 and its use by the Lead-In Analytics Engine 200 is designed to provide the analyst with a great deal of flexibility in defining the Target viewing segments to be analyzed as part of the study. As non-limiting examples, I provide the following:

1. In the case of a football game, the Target (the entire game) can be divided into 4 segments, one for each quarter, allowing the analyst to track viewing by quarter.
2. Also, in the case of a football game, the Target (the entire game) can be divided into 6 segments consisting of pre-game show, 2 quarters, half-time, and final 2 quarters, allowing the analyst to track viewing by quarter and pre-game and half-time.
3. In the case of a baseball game, the Target (the entire game) can be divided into 9 segments, one for each inning, allowing the analyst to track viewing by inning.
4. In the case of a competitive event such as a singing competition, the Target (the entire competition) can be divided into segments based on performer, one for each performer, allowing the analyst to track viewing by performer.
5. In the case of a movie, the Target (the entire movie) can be divided into segments based on scene, one for each scene, allowing the analyst to track viewing by scene.
6. In the case of a newscast, the Target (the entire newscast) can be divided into segments based on the various parts of the newscast (national news, local news, weather, sports), one for each part, allowing the analyst to track viewing by part.
7. In the case of an evening of prime time television viewing, the 6 pm to 9 pm prime time can be divided into segments based on the various programs being aired with perhaps hourly or half-hourly breaks, allowing the analyst to track viewing during each prime time segment.
8. In any of the above, the Target can also include breakouts by commercial segments or by each individual commercial, allowing the analyst to track viewing of each commercial.

Each study may have an Analysis Period Definition File 160 with each record having fields similar to those described in FIG. 19-A. The analyst is allowed to define whatever Target viewing segments he wants to analyze. The analyst will define as many records as needed to define the Target viewing segments of interest. The Lead In Analytics Engine 200 presently supports up to 60 Target viewing segments, but this may be changed as needed.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Proceeding with the review of FIG. 1, a Result Demographic Geographic Histogram Definition File 170 is provided as input to the Lead-In Analytics Engine 200. The Result Demographic Geographic Histogram Definition File 170 is used to create a user defined Histogram of Demographic identifier, Geographic identifier, and Histogram Percentages by which to categorize Result (Target period) viewing. This process provides the analyst with flexibility to define Target period viewing in three dimensions: Demographic, Geographic, and Histogram viewing percentage based on aggregate viewing during the lead-in period.

This Result Histogram information is used by the Lead-In Analytics Engine 200 as follows: For each set-top box, all of the lead-in viewing from all of the lead-in periods together is aggregated. That number is converted to a percentage of the total lead-in viewing that the set-top box was tuned to. That percentage is then compared to the Histogram percentages in the Result Demographic Geographic Histogram Definition File 170 in order to categorize the viewing of this set-top box with the viewing of set-top boxes that had a similar amount of aggregate lead-in viewing so that those similarly situated set-top boxes can then be tracked as to viewing during the Target period. This allows the Lead-In Analytics Engine 200 to compare Target viewing based on the amount of aggregate Lead-in viewing to determine whether the lead-in viewing had any impact on the Target viewing. As an example, the Analyst can compare Target viewing by those set-top boxes which viewed 1-10% of the lead-in video with those that viewed 80-100% of the lead-in video to measure what impact exposure to the lead-in viewing had on viewing of the Target.

As non-limiting examples, I provide the following examples of how the Result Demographic Geographic Histogram may be configured:

1. The Analyst may define one Demographic Group and one Geographic Group with a variety of Histogram viewing buckets.
2. The Analyst may define Several Demographic Groups and one Geographic Group with a variety of Histogram viewing buckets.
3. The Analyst may define one Demographic Group and several Geographic Groups with one Histogram viewing bucket.
4. The Histogram viewing buckets may be defined from 1% to 100% with any number of breakdowns or only one bucket for the entire range if the intent is to focus only on demographic and/or geographic attributes of the viewers.
5. A Histogram viewing bucket may be defined as 0 to 0 which enables analysis based on set-top boxes which were not tuned during any of the lead-in video viewing periods.

Each study will have a Result Demographic Geographic Histogram Definition File 170 with each record having fields similar to those described in FIG. 20-A. The analyst is allowed to define whatever Result Demographic Geographic Histogram Definition he wants to use in the analysis. The Result Demographic Geographic Histogram Definition File 170 and its use by the Lead-In Analytics Engine 200 is setup to provide the analyst with a great deal of flexibility in defining how to segment the viewers based on aggregate viewing during the various the lead-in periods that are being analyzed as part of the study.

The Lead In Analytic Engine presently supports up to 200 combinations of Demographic, Geographic, and Histogram categories, but this may be changed as needed.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Note: The histogram aspect of this file similar to the histogram for Lead-in viewing but it has its own definition because the purpose is very different. We are using this file to group viewers for Target period analysis based on the aggregate amount of viewing during the Lead-in period.

Proceeding with the review of FIG. 1, a Channels To Analyze File 180 is provided as input to the Lead-In Analytics Engine 200. The Channels To Analyze File 180 records the individual channels for which the Lead-In Analytics Engine 200 will track viewing during the Target period. Recall that the Lead-in can be used to promote viewing of a particular video asset. The analyst wants to understand what the viewer chose to view during the Target period. The viewer may watch the 'desired' target or some other channel or nothing at all. All of this information is helpful to the analyst in understanding whether or not the Lead-in was effective; whether or not viewing of the Lead-in had any impact on viewing of the Target. By specifying the Channels to Analyze, the analyst is able to focus on viewing of the Target only or on viewing of any other channel. The analyst will use the Channels To Analyze File 180 to specify the list of all the channels for which he wants to gather Target period viewing information. If he is only interested in viewing for the top 10 channels, he can specify those. If he is interested in Target period viewing for all channels in the system, he can specify a large list with all those channels. The Channels To Analyze File 180 is described in FIG. 21-A.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Proceeding with the review of FIG. 1, a Tuning Data Dates File 190 is provided as input to the Lead-In Analytics Engine 200. The Tuning Data Dates File 190 records the date or dates in the tuning data file for which the Lead In Analytics Engine 200 will process the channel tuning data. Only channel tuning data that matches the dates in this file will be processed as part of the analysis study. If the Channel Tuning Data file contains multiple days of data, this allows the analyst to choose the days of interest for the study.

Recall that the Lead-in video can be used to promote viewing of a particular video asset and that this lead-in video asset may have aired on various dates. One non-limiting example of this may be a series of commercials that aired on various dates to promote an upcoming Target show. A second non-limiting example of this may be an episodic program where the Lead-In Analytics Engine 200 is tracking data for the last 7 weeks with the Target being the next episode. In either case, the Channel Tune File 110 may contain channel tuning activity that is not of interest for the study the analyst is doing. This file provides the analyst with a method to skip those Channel tuning records that he is not interested in and to focus on those tuning records that are likely to contain relevant channel tuning activity.

The Tuning Data Dates File 190 is described in FIG. 22-A.

The data in this file may be entered to a data base using a graphical user interface and then queried from there to provide the file, or it may be entered to a web application and provided as an XML file, or it may be keyed into a flat file directly. Those with ordinary skill in the art will have no difficulty using common software development tools to develop a process which provides a file or a database table like the one shown as input to the Lead-In Analytics Engine 200.

Proceeding with the review of FIG. 1, an Analysis Group File 210 is created by the Lead-In Analytics Engine 200. The Analysis Group File 210 records overall information about the Analysis study that is being done.

An exemplary record layout for the Analysis Group File 210 which is created by the Lead-In Analytics Engine 200 is described in FIGS. 23-A-B-C with FIG. 23-A illustrating the file format, and FIG. 23-B illustrating sample data as it appears in the output file, and FIG. 23-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 23-A.

Proceeding with the review of FIG. 1, an Analysis Lead In Period File 220 is created by the Lead-In Analytics Engine 200. The Analysis Lead In Period File 220 records information about each Lead-in video asset along with the aggregate viewing information for all of the Demographic Geographic Histogram groupings that viewed this Lead In video asset.

An exemplary record layout for the Analysis Lead In Period File 220 which is created by the Lead-In Analytics Engine 200 is described in FIGS. 24-A-B-C with FIG. 24-A illustrating the file format, and FIG. 24-B illustrating sample data as it appears in the output file, and FIG. 24-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 24-A.

Proceeding with the review of FIG. 1, a Lead In Viewing Result File 230 is created by the Lead-In Analytics Engine 200. The Lead In Viewing Result File 230 records statistics about the lead-in viewing broken out by the audience segments defined in the Demographic Geographic Histogram Definition File. Viewing during each Lead-in viewing period is broken out based on the criteria which the analyst defined in the Lead-In Demographic Geographic Histogram Definition File 140. Thus it is evident that the analyst has opportunity to define segmentation criteria that will reveal to him details about which demographic groups viewed each lead-in video, or which geographic groups viewed each lead-in video, or to categorize the viewers by the amount of lead-in viewing by using the histogram groups. Additionally, the analyst can combine any of these criteria to gain still greater insight to the viewers.

An exemplary record layout for the Lead In Viewing Result File 230 which is created by the Lead-In Analytics Engine 200 is described in FIGS. 25-A-B-C with FIG. 25-A illustrating the file format, and FIG. 25-B illustrating sample data as it appears in the output file, and FIG. 25-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 25-A.

To recap the output files that are created related to Lead-in viewing, the Lead-In Analytics Engine 200 has created a summary Analysis Group File 210 which records overall information about the Analysis study that is being done. Then the Analysis Lead In Period File 220 records information about each Lead-in video asset along with the aggregate viewing information for all of the Demographic Geographic Histogram groupings that viewed this Lead In video asset. Finally the Lead In Viewing Result File 230 records statistics about the lead in viewing broken out by the audience segments defined in the Demographic Geographic Histogram Definition File. The end result is that the analyst has very detailed information regarding viewing activity for each lead-in video asset.

A non-limiting example will help to illustrate: If the Lead-in was a series of commercials promoting a baseball game, the Analysis Group File 210 records information about the study such as that it is tracking lead-in viewing for a series of ads promoting a baseball game including potential viewing seconds if a set-top box tuned to all the ads, the number of possible exposures that a set-top box may have, and then actual viewing results measured in aggregate viewing seconds and aggregate exposures. Then the Analysis Lead In Period File 220 records the various details about the individual lead-in segments or commercials that were aired promoting the game including the channel each video played on and the date and time. It also records the aggregate viewing in seconds of that lead-in video across all of the demographic-geographic-histogram groupings. Finally, the Lead In Viewing Result File 230 records each of the viewership demographic and geographic breakouts along with the histogram buckets which break-out viewing by how much of that particular lead-in video the set-top box was tuned to.

The end result for the lead-in viewing is that the analyst is able to get a very detailed breakdown of actual viewership for each lead-in segment. He can determine demographic coding of the viewers and their geographic location. He can determine whether or not the people he was targeting with the ad actually were tuned in when it aired and how much of it they viewed. He can see longitudinal activity across a series of ads that aired on the same day or on multiple days. He has new tools that were never available previously to measure the effectiveness of his ads.

Proceeding with the review of FIG. 1, an Analysis Period Result Header File 240 is created by the Lead-In Analytics Engine 200. The Analysis Period Result Header File 240 records overall information about the Analysis Period, summary information for the Analysis Results, and a method to link together the various Analysis Result detail records. It also records viewing statistics for the analysis period as a whole.

An exemplary record layout for the Analysis Period Result Header File 240 which is created by the Lead-In Analytics Engine 200 is described in FIGS. 26-A-B-C with FIG. 26-A illustrating the file format, and FIG. 26-B illustrating sample data as it appears in the output file, and FIG. 26-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 26-A.

Proceeding with the review of FIG. 1, an Analysis Period Result Detail File 250 is created by the Lead-In Analytics Engine 200. The Analysis Period Result Detail File 250 records the start and end time of each video segment that was analyzed along with viewing statistics for the individual segment. It also has fields to link to the parent Analysis Period Result Header.

An exemplary record layout for the Analysis Period Result Detail File 250 which is created by the Lead-In Analytics Engine 200 is described in FIGS. 27-A-B-C with FIG. 27-A illustrating the file format, and FIG. 27-B illustrating sample data as it appears in the output file, and FIG. 27-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 27-A.

Proceeding with the review of FIG. 1, an Analysis Period Result Demographic Geographic Histogram File 260 is created by the Lead-In Analytics Engine 200. The Analysis Period Result Demographic Geographic Histogram File 260 records for each start and end time of each video segment that was analyzed, the demographic grouping, the geographic grouping, and the histogram definitions along with viewing statistics for that combination within the Analysis Period Result Detail. It also has fields to link to the parent Analysis Period Result Detail.

An exemplary record layout for the Analysis Period Result Demographic Geographic Histogram File 260 which is created by the Lead-In Analytics Engine 200 is described in FIGS. 28-A-B-C with FIG. 28-A illustrating the file format, and FIG. 28-B illustrating sample data as it appears in the output file, and FIG. 28-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 28-A.

Proceeding with the review of FIG. 1, an Analysis Period Result Channel Viewing Detail File 270 is created by the Lead-In Analytics Engine 200. The Analysis Period Result Channel Viewing Detail File 270 records for each of the start and end times of each video segment that was analyzed with its histogram definitions, each Channel Call Sign that was viewed and the related viewing statistics. It also has fields to link to the parent Analysis Period Result Demographic Geographic Histogram.

An exemplary record layout for the Analysis Period Result Channel Viewing Detail File 270 which is created by the Lead-In Analytics Engine 200 is described in FIGS. 29-A-B-C with FIG. 29-A illustrating the file format, and FIG. 29-B illustrating sample data as it appears in the output file, and FIG. 29-C illustrating sample data formatted for human readability, according to one embodiment.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 29-A.

To recap the output files related to Target viewing, the Lead-In Analytics Engine 200 has created a summary file for the Target (defined in Analysis Period Result Header File 240) which provided information on the Target as a whole along with a way to group together all of the detail data for the Target. It then created a individual segments (defined in Analysis Period Result Detail File 250) which allowed the analyst to break the Target down into one or more periods of interest for analysis. Each of these analysis period segments was then further broken down by various Demographic, Geographic, and Histogram characteristics (defined in Analysis Period Result Demographic Geographic Histogram File 260) so that the analyst could gain insight into the viewership of the Target segment. Finally, viewing at this fine level of granularity was captured for each channel through the list of channels viewed (defined in Analysis Period Result Channel Viewing Detail File 270).

A non-limiting example will help to illustrate: The Lead-in was a series of commercials promoting a baseball game. The Target that the analyst wants to understand is viewing of the baseball game. The individual segments are the innings. The various Demographic, Geographic, and Histogram characteristics are the breakdowns of the viewing audience. The Demographic identifier of the viewer is identified in the channel tuning data. The Geographic location of the viewer is identified in the channel tuning data. The Histogram index (viewing percentage) is set based on the aggregate viewing of the lead-in commercials by this set-top box. The channel viewing result measures how much of the game the set-top box was tuned to, broken down by inning and by demographic-geographic-histogram. Finally, channel viewing result also tracks what the set-top box tuned to during each segment instead of the game, if anything.

The end result is that the analyst now has a level of understanding of audience viewership never before possible. Nonlimiting examples include: he can compare viewing based on exposure to the lead-in to see if his lead-in had any effect on viewership; he can determine what the viewers watched instead of his Target; he can measure actual viewership of his Target.

Figure 2:
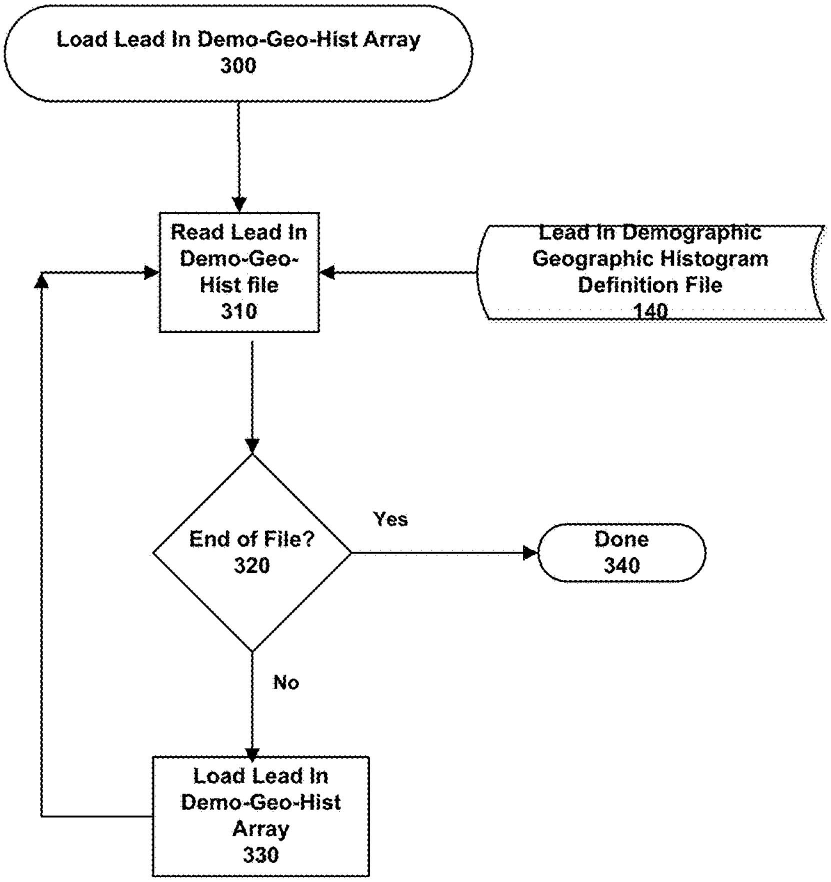
FIG. 2 illustrates an exemplary flowchart for loading Demographic, Geographic, and Histogram lead-in data to an array in the memory of a computer in preparation for analyzing video asset viewing device channel tuning activity during a lead-in period, according to one embodiment.

FIG. 2 is a flowchart which illustrates an exemplary process for loading the Lead In Demographic Geographic Histogram Definition File 140 into an array in the memory of a computer that is running the the Lead-In Analytics Engine 200, so that this data can be used by Lead-In Analytics Engine 200 in grouping Lead-in viewing by the Demographic-Geographic-Histogram Definitions defined in the file, according to one embodiment.

The process begins with Load Lead In Demo-Geo-Hist Array 300. The process then executes Read Lead In Demo-Geo-Hist file 310 which reads file Lead In Demographic Geographic Histogram Definition File 140 as input. The process checks for End of File 320. If it is the end of file, the process is Done 340. If End of File 320 does not detect an end of file condition, then the record that was read is loaded to the array using Load Lead In Demo-Geo-Hist Array 330.

The end result of this process is that the Lead-In Analytics Engine 200 has loaded the Lead-in Demographic Geographic Histogram Definition data into an array in the memory of the computer running the engine.

Additional detail on step Load Lead In Demo-Geo-Hist Array 330 follows:

The Lead-In Analytics Engine 200 populates each of the fields as follows:

LI-DEMOGRAPHIC-CODE 5810 is populated from LEAD-IN-DEMOGRAPHIC-CODE 1610 in input file 140.

LI-DEMOGRAPHIC-DESC 5820 is populated from LEAD-IN-DEMOGRAPHIC-DESC 1620 in input file 140.

LI-GEOGRAPHIC-CODE 5830 is populated from LEAD-IN-GEOGRAPHIC-CODE 1630 in input file 140.

LI-GEOGRAPHIC-DESC 5840 is populated from LEAD-IN-GEOGRAPHIC-DESC 1640 in input file 140.

LI-HISTOGRAM-INDEX 5850 is populated from LEAD-IN-HISTOGRAM-INDEX 1650 in input file 140.

LI-HISTOGRAM-BUCKET-NAME 5860 is populated from LEAD-IN-HISTOGRAM-BUCKET-NAME 1660 in input file 140.

LI-HISTOGRAM-BEG-PCT 5870 is populated from LEAD-IN-HISTOGRAM-BEG-PCT 1670 in input file 140.

LI-HISTOGRAM-END-PCT 5880 is populated from LEAD-IN-HISTOGRAM-END-PCT 1680 in input file 140.

The source code for this routine can be found in the accompanying source code file as routines C110-LOAD-LI-DEMO-GEO-HISTG-AR and C112-LOAD-DEMO-GEO-HISTG-DEF which is included herein by reference.

Figure 3:
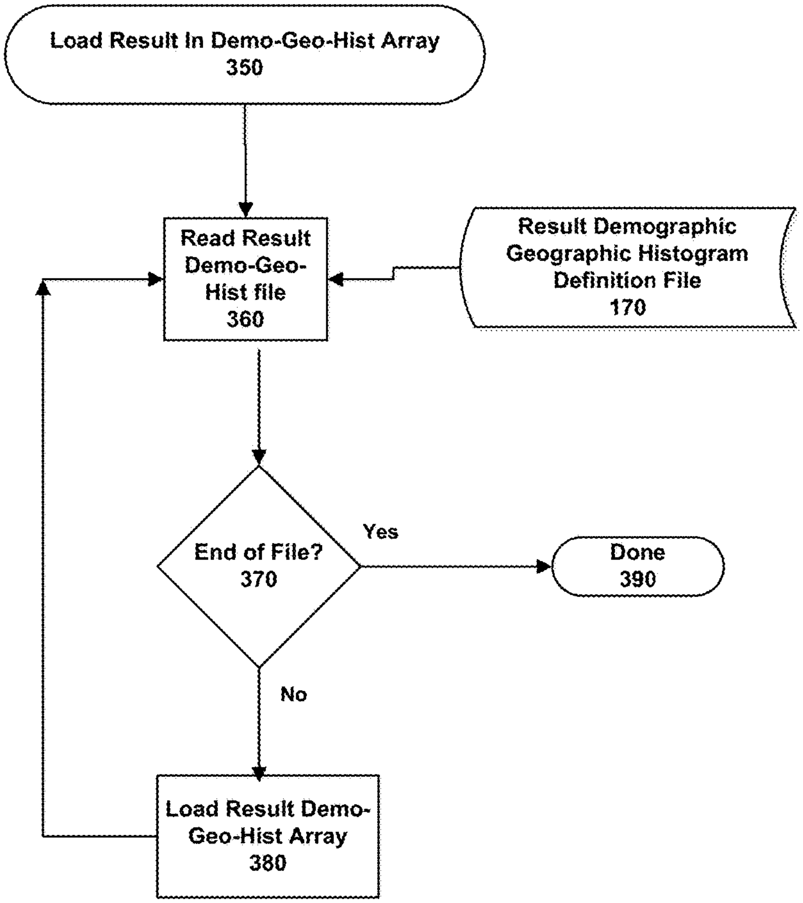
FIG. 3 illustrates an exemplary flowchart for loading Demographic, Geographic, and Histogram result data to an array in the memory of a computer in preparation for analyzing video asset viewing device channel tuning activity during a target period, according to one embodiment.

FIG. 3 is a flowchart which illustrates an exemplary process for loading the Result Demographic Geographic Histogram Definition File 170 into an array in the memory of a computer that is running the the Lead-In Analytics Engine 200, so that this data can be used by Lead-In Analytics Engine 200 in grouping aggregate Lead-in result viewing by the Demographic-Geographic-Histogram Definitions defined in the file, according to one embodiment.

The process begins with Load Result in Demo-Geo-Hist Array 350. The process then executes Read Result Demo-Geo-Hist file 360 which reads file Result Demographic Geographic Histogram Definition File 170 as input. The process checks for End of File 370. If it is the end of file, the process is Done 390. If End of File 370 does not detect an end of file condition, then the record that was read is loaded to the array using Load Result Demo-Geo-Hist Array 380.

The end result of this process is that the Lead-In Analytics Engine 200 has loaded the Result Demographic Geographic Histogram Definition data into an array in the memory of the computer running the engine.

Additional detail on step Load Result Demo-Geo-Hist Array 380 follows:

The Lead-In Analytics Engine 200 populates each of the fields as follows:

RE-DEMOGRAPHIC-CODE 5910 is populated from RESULT-DEMOGRAPHIC-CODE 2210 in input file 170.

RE-DEMOGRAPHIC-DESC 5920 is populated from RESULT-DEMOGRAPHIC-DESC 2220 in input file 170.

RE-GEOGRAPHIC-CODE 5930 is populated from RESULT-GEOGRAPHIC-CODE 2230 in input file 170.

RE-GEOGRAPHIC-DESC 5940 is populated from RESULT-GEOGRAPHIC-DESC 2240 in input file 170.

RE-HISTOGRAM-INDEX 5950 is populated from RESULT-HISTOGRAM-INDEX 2250 in input file 170.

RE-HISTOGRAM-BUCKET-NAME 5960 is populated from RESULT-HISTOGRAM-BUCKET-NAME 2260 in input file 170.

RE-HISTOGRAM-BEG-PCT 5970 is populated from RESULT-HISTOGRAM-BEG-PCT 2270 in input file 170.

RE-HISTOGRAM-END-PCT 5980 is populated from RESULT-HISTOGRAM-END-PCT 2280 in input file 170.

The source code for this routine can be found in the accompanying source code file as routines C115-LOAD-RE-DEMO-GEO-HISTG-AR and C117-LOAD-DEMO-GEO-HISTG-DEF which is included herein by reference.

Figure 4:
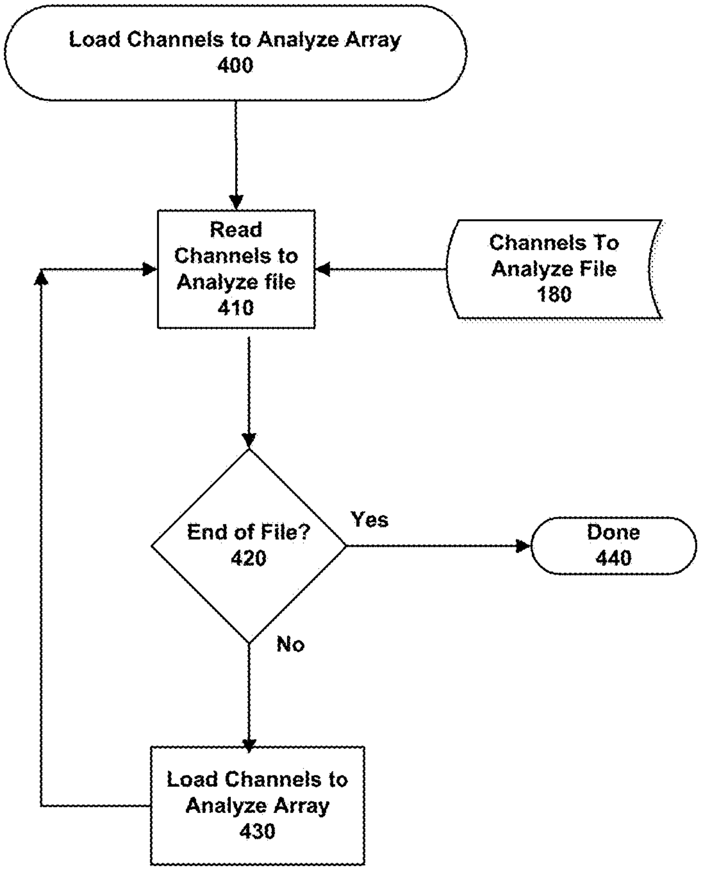
FIG. 4 illustrates an exemplary flowchart for loading Channels to Analyze data to an array in the memory of a computer in preparation for analyzing video asset viewing device channel tuning activity during a target period, according to one embodiment.

FIG. 4 is a flowchart which illustrates an exemplary process for loading the channels to be analyzed into an an array in the memory of a computer that is running the the Lead-In Analytics Engine 200, so that this data can be used by Lead-In Analytics Engine 200 as it tracks viewership of these channels during the Target period. The process begins with Load Channels to Analyze Array 400. The process then executes Read Channels to Analyze file 410 which reads file Channels To Analyze File 180 as input. The process checks for End of File 420. If it is the end of file, the process is Done 440. If End of File 420 does not detect an end of file condition, then the record that was read is loaded to the array using Load Channels to Analyze Array 430.

The end result of this process is that the Lead-In Analytics Engine 200 has loaded the Channels to Analyze data into an array in the memory of the computer running the engine.

Additional detail on step Load Channels to Analyze Array 430 follows:

The Lead-In Analytics Engine 200 populates each of the fields as follows:

CHAN-TO-ANALYZE-CALL-SIGN 6010 is populated from CHANNEL-CALL-SIGN 2410 in input file 180.

CHAN-TO-ANALYZE-CALL-SIGN-NAME 6020 is populated from CHANNEL-CALL-SIGN-NAME 2420 in input file 180.

The source code for this routine can be found in the accompanying source code file as routines C120-CHANNELS-TO-ANALYZE and C122-CHANNELS-TO-ANALYZE which is included herein by reference.

Figure 5:
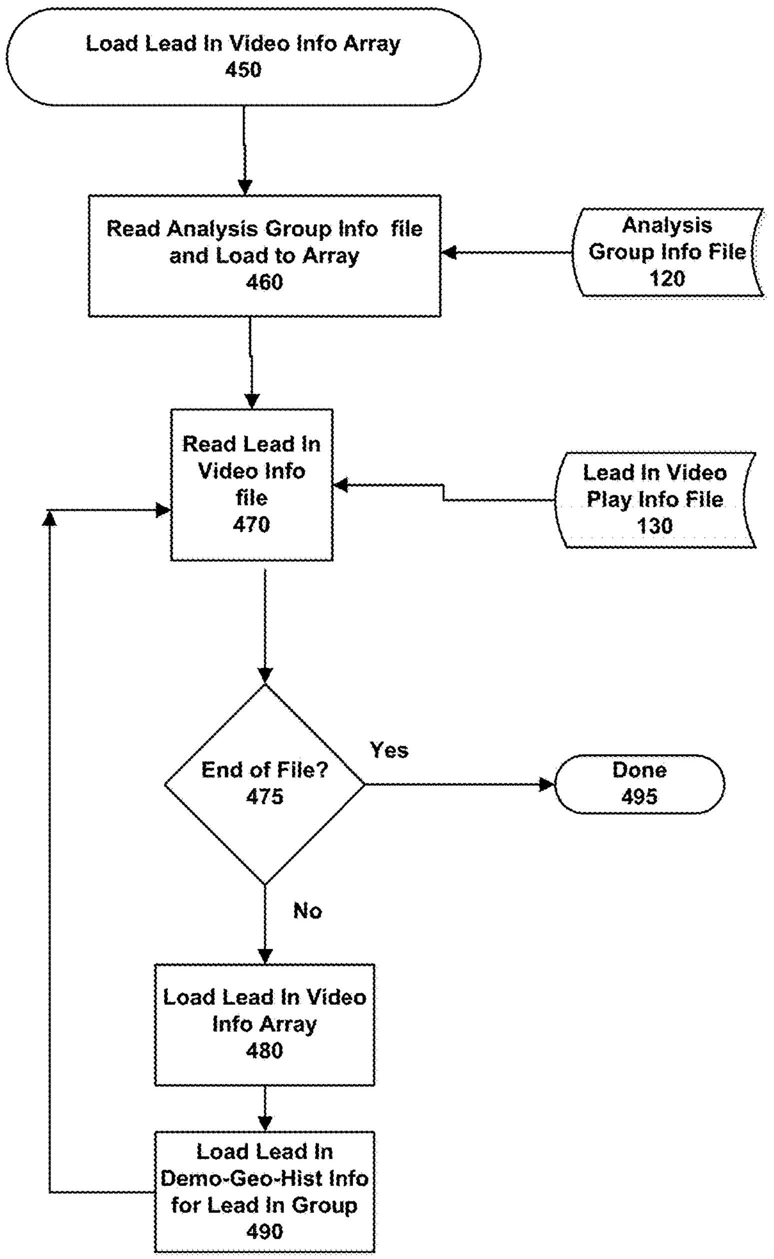
FIG. 5 illustrates an exemplary flowchart for loading Analysis Group Information and Lead In Video Information to an array in the memory of a computer in preparation for analyzing video asset viewing device channel tuning activity during a lead-in period, according to one embodiment.

FIG. 5 is a flowchart which illustrates an exemplary process for loading the Analysis Group Info File 120 and the Lead In Video Play Info File 130 into an array (LEAD-IN-AND-TARGET-INFO array) in the memory of a computer that is running the the Lead-In Analytics Engine 200, so that this data can be used by Lead-In Analytics Engine 200 in analyzing viewing for the Analysis Group which identifies the overall study and related parameters and for the individual Lead-in periods within that overall study, according to one embodiment.

The process begins with Load Lead In Video Info Array 450. The process then executes Read Analysis Group Info file and Load to Array 460 which reads file Analysis Group Info File 120 as input and loads the Analysis Group record to the array. Note that there is only one record in this file.

The process then proceeds to Read Lead In Video Info file 470 where it reads file Lead In Video Play Info File 130 as input. The process checks for End of File 475. If it is the end of file, the process is Done 495. If End of File 475 does not detect an end of file condition, then the record that was read is loaded to the array using Load Lead In Video Info Array 480. While still working with this Lead-in Period definition record, the process then executes Load Lead In Demo-Geo-Hist Info for Lead In Group 490 which copies the set of Lead-in Demographic-Geographic-Histogram definitions, that was loaded previously (reference FIG. 2 for details), to this Lead-in Period definition.

The result is that each Lead-in Period definition ends up with the entire set of Lead-in Demographic-Geographic-Histogram definitions. Those Lead-in Demographic-Geographic-Histogram definitions will then be used later in the process by the Lead-In Analytics Engine 200 as it collects viewing data for each Lead-in period and groups it into the buckets defined by the Lead-in Demographic-Geographic-Histogram definitions. This allows the Lead-In Analytics Engine 200 to categorize the lead-in viewing based on the Demographic-Geographic characteristics of of the viewer. Additionally, the Histogram feature allows the Lead-In Analytics Engine 200 to categorize the lead-in viewing related to each Demographic-Geographic grouping based on the percentage of the individual Lead-in video that the set-top box was tuned to.

Additional detail on step Read Analysis Group Info file and Load to Array 460 follows:

The Lead-In Analytics Engine 200 populates each of the fields as follows:

LEAD-IN-ANALYSIS-GROUP-ID 4810 is populated from AGI-ANALYSIS-GROUP-ID 1310 in input file 120.

LEAD-IN-MARKET 4800 is populated from ANALYSIS-GROUP-MARKET 1320 in input file 120.

LEAD-IN-ANALYSIS-GROUP-DESC 4820 is populated from ANALYSIS-GROUP-DESC 1330 in input file 120.

LEAD-IN-POTENTIAL-VIEWING-SECS 4830 is populated from POTENTIAL-VIEWING-SECONDS 1340 in input file 120.

LEAD-IN-POTENTIAL-EXPOSURES 4850 is populated from POTENTIAL-EXPOSURES 1350 in input file 120.

Additional detail on step Load Lead In Video Info Array 480 follows:

The Lead-In Analytics Engine 200 populates each of the fields as follows:

LEAD-ANALYSIS-PERIOD-ID 4880 is populated from LEAD-ANALYSIS-PERIOD-ID 1420 in input file 130.

LEAD-CHANNEL-CALL-SIGN 4890 is populated from LEAD-CHANNEL-CALL-SIGN 1430 in input file 130.

LEAD-VIDEO-PLAY-DATE 4900 is populated from LEAD-VIDEO-PLAY-DATE 1440 in input file 130.

LEAD-VIDEO-PLAY-BEG-TIME 4910 is populated from LEAD-VIDEO-PLAY-BEG-TIME 1450 in input file 130.

LEAD-VIDEO-PLAY-BEG-SEC-OF-DAY 4920 is populated from LEAD-VIDEO-PLAY-BEG-SEC-OF-DAY 1460 in input file 130.

LEAD-VIDEO-PLAY-END-TIME 4930 is populated from LEAD-VIDEO-PLAY-END-TIME 1470 in input file 130.

LEAD-VIDEO-PLAY-END-SEC-OF-DAY 4940 is populated from LEAD-VIDEO-PLAY-END-SEC-OF-DAY 1480 in input file 130.

LEAD-IN-INDUSTRY-PROGRAM-ID 4950 is populated from LEAD-INDUSTRY-PROGRAM-ID 1510 in input file 130.

LEAD-IN-INDUSTRY-ASSET-ID 4960 is populated from LEAD-INDUSTRY-ASSET-ID 1520 in input file 130.

LEAD-IN-VIDEO-DURATION-SECS 4970 is populated from LEAD-VIDEO-DURATION-SECS 1490 in input file 130.

LEAD-IN-SECS-FOR-EXPOSURE 4975 is populated from LEAD-SECS-FOR-EXPOSURE 1500 in input file 130.

LEAD-VIDEO-DESC 4980 is populated from LEAD-VIDEO-DESC 1530 in input file 130.

Additional detail on step Load Lead In Demo-Geo-Hist Info for Lead In Group 490 follows: The Lead-In Analytics Engine 200 populates each of the fields as follows:

LEAD-RESLT-DEMOGRAPHIC-CODE 5050 is populated from LI-DEMOGRAPHIC-CODE 5810 in array in FIG. 32.

LEAD-RESLT-GEOGRAPHIC-CODE 5060 is populated from LI-GEOGRAPHIC-CODE 5830 in array in FIG. 32.

LEAD-RESLT-HISTOGRAM-INDEX 5070 is populated from LI-HISTOGRAM-INDEX 5850 in array in FIG. 32.

LEAD-RESLT-HISTOGRAM-BEG-PCT 5080 is populated from LI-HISTOGRAM-BEG-PCT 5870 in array in FIG. 32.

LEAD-RESLT-HISTOGRAM-END-PCT 5090 is populated from LI-HISTOGRAM-END-PCT 5880 in array in FIG. 32.

The source code for this routine can be found in the accompanying source code file as routines C130-LEAD-IN-VIDEO-PLAY-INFO and C132-LOAD-LEAD-IN-VIDEO-INFO and C136-LOAD-DEMO-GEO-HISTG which is included herein by reference.

Figure 6:
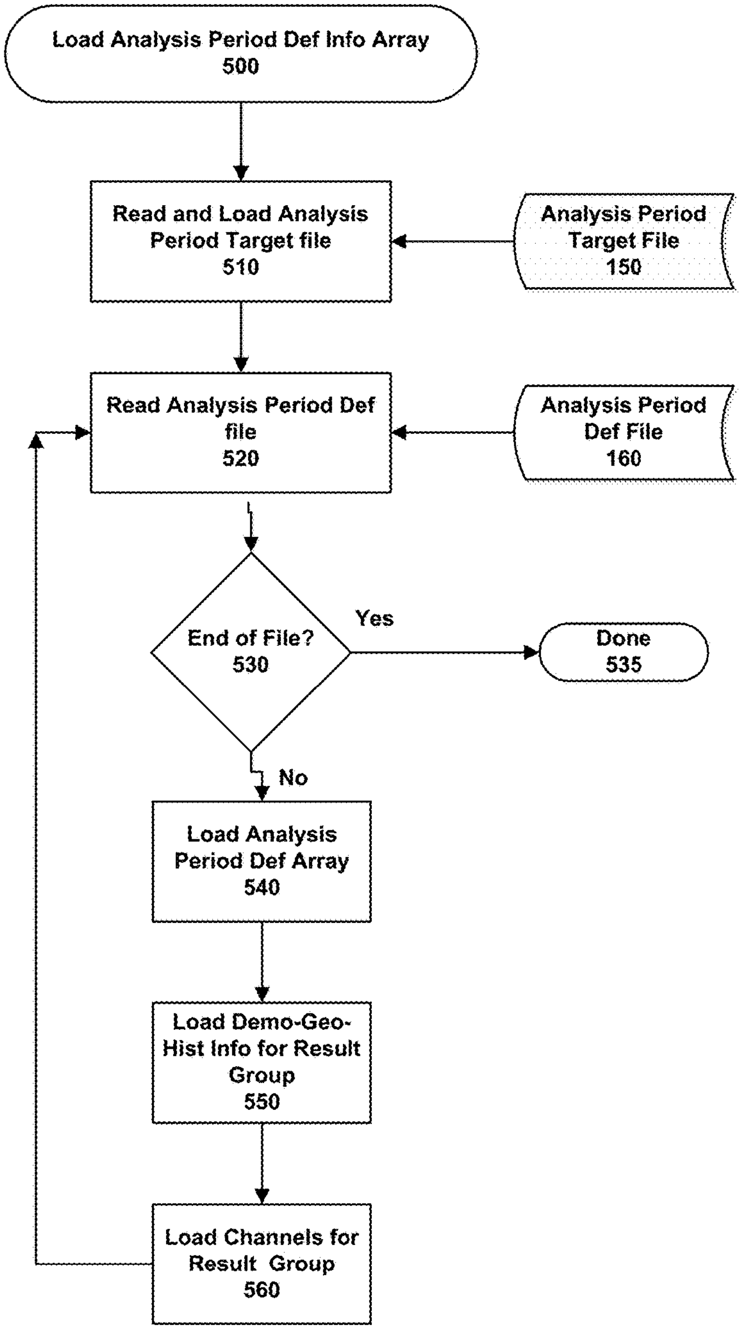
FIG. 6 illustrates an exemplary flowchart for loading Analysis Period Target, Analysis Period Definition, Analysis Period Demographic, Geographic and Histogram, and Channels to Analyze to an array in the memory of a computer in preparation for analyzing video asset viewing device channel tuning activity during a target period, according to one embodiment.

FIG. 6 is a flowchart which illustrates an exemplary process for loading the Analysis Period Target File 150 and the Analysis Period Def File 160 into an array in the memory of a computer that is running the the Lead-In Analytics Engine 200, so that this data can be used by Lead-In Analytics Engine 200 in analyzing viewing during for the Target Period of the overall study and for the individual Analysis Periods within that Target period, with viewing being captured down to the Channel within the Result Demographic-Geographic-Histogram group, according to one embodiment.

The process begins with Load Analysis Period Def Info Array 500. The process then executes Read and Load Analysis Period Target file 510 which reads file Analysis Period Target File 150 as input and loads the Analysis Period Target record to the array. Note that there is only one record in this file.

The process then proceeds to Read Analysis Period Def file 520 where it reads file Analysis Period Def File 160 as input. The process checks for End of File 530. If it is the end of file, the process is Done 535. If End of File 530 does not detect an end of file condition, then the record that was read is loaded to the array using Load Analysis Period Def Array 540. While still working with this Analysis Period Definition record, the process then executes Load Demo-Geo-Hist Info for Result Group 550 which copies the set of Result Demographic-Geographic-Histogram definitions, that was loaded previously (reference FIG. 3 for details), to this Analysis Period Definition. In addition to loading the Result Demographic-Geographic-Histogram definitions, the process then executes Load Channels for Result Group 560 which copies the set of Channels to Analyze, that was loaded previously (reference FIG. 4 for details), to this Result Demographic-Geographic-Histogram definition.

The result is that each Analysis Period Definition ends up with the entire set of Result Demographic-Geographic-Histogram definitions and each such definition then ends up with the entire set of Channels to Analyze. Those Result Demographic-Geographic-Histogram definitions and the accompanying Channels to Analyze definitions will then be used later in the process by the Lead-In Analytics Engine 200 as it collects viewing data for each Analysis Period and groups it into the buckets defined by the Result Demographic-Geographic-Histogram definitions and then further groups that viewing into the channels viewed. This allows the Lead-In Analytics Engine 200 to categorize the Analysis Period viewing based on the Demographic-Geographic characteristics of the viewer and the Histogram breakouts and then to add another level of detail by collecting channel viewing information for that combination of Demographic-Geographic-Histogram.

As a non-limiting example, if the Target is a baseball game and the Analysis Periods are the innings, and the analyst is tracking viewership by various demographic groups in ad zone XYZ across multiple channels, then the Lead-In Analytics Engine 200 has now populated the arrays in preparation for collecting this viewership information.

Additional detail on step Read and Load Analysis Period Target file 510 follows:

The Lead-In Analytics Engine 200 populates each of the fields as follows:

AP-TARGET-CHANNEL 5160 is populated from AP-TRG-CHANNEL 1820 in input file 150.

AP-POTENTIAL-VIEWING-SECONDS 5170 is populated from AP-POTENTIAL-VIEWING-SECOND 1830 in input file 150.

AP-POTENTIAL-EXPOSURES 5180 is populated from AP-POTENTIAL-EXPOSURES 1840 in input file 150.

AP-TARGET-IND-VIDEO-PGM-ID 5190 is populated from AP-TARGET-INDUSTRY-VIDEO-PROGRAM-ID 1850 in input file 150.

AP-TARGET-IND-VIDEO-ASSET-ID 5200 is populated from AP-TARGET-INDUSTRY-VIDEO-ASSET-ID 1860 in input file 150.

AP-TARGET-AIRING-DATE 5210 is populated from AP-TRG-AIRING-DATE 1870 in input file 150.

AP-TARGET-AIRING-BEG-TIME 5220 is populated from AP-TRG-AIRING-BEG-TIME 1880 in input file 150.

AP-TARGET-AIRING-END-TIME 5230 is populated from AP-TRG-AIRING-END-TIME 1900 in input file 150.

AP-TARGET-AIRNG-BEG-SEC-OF-DAY 5240 is populated from AP-TRG-AIRNG-BEG-SEC-OF-DAY 1890 in input file 150.

AP-TARGET-AIRNG-END-SEC-OF-DAY 5250 is populated from AP-TRG-AIRNG-END-SEC-OF-DAY 1910 in input file 150.

AP-TARGET-MIN-SECS-VW-AT-START 5260 is populated from AP-TRG-MIN-SECS-VW-AT-START 1920 in input file 150.

Additional detail on step Load Analysis Period Def Array 540 follows:

The Lead-In Analytics Engine 200 populates each of the fields as follows:

AP-DEF-DATE 5300 is populated from AP-DEF-DATE 2020 in input file 160.

AP-DEF-BEG-TIME-HH-MM-SS-PM 5310 is populated from AP-DEF-BEG-TIME-HH-MM-SS 2030 in input file 160.

AP-DEF-BEG-TIME-SEC-OF-DAY 5320 is populated from AP-DEF-BEG-TIME-SEC-OF-DAY 2040 in input file 160.

AP-DEF-END-TIME-HH-MM-SS-PM 5330 is populated from AP-DEF-END-TIME-HH-MM-SS 2050 in input file 160.

AP-DEF-END-TIME-SEC-OF-DAY 5340 is populated from AP-DEF-END-TIME-SEC-OF-DAY 2060 in input file 160.

AP-DEF-PERIOD-DURATION-SECS 5350 is calculated for each analysis period as AP-DEF-END-TIME-SEC-OF-DAY 2060− AP-DEF-BEG-TIME-SEC-OF-DAY 2040+1.

Additional detail on step Load Demo-Geo-Hist Info for Result Group 550 follows:

The Lead-In Analytics Engine 200 populates each of the fields as follows copying them from the one array to the other array:

ANALYS-RESLT-DEMOGRAPHIC-CODE 5390 is populated from RE-DEMOGRAPHIC-CODE 5910 in array in FIG. 33.

ANALYS-RESLT-GEOGRAPHIC-CODE 5400 is populated from RE-GEOGRAPHIC-CODE 5930 in array in FIG. 33.

ANALYS-RESLT-HISTOGRAM-INDEX 5410 is populated from RE-HISTOGRAM-INDEX 5950 in array in FIG. 33.

ANALYS-RESLT-HISTOGRAM-BEG-PCT 5420 is populated from RE-HISTOGRAM-BEG-PCT 5970 in array in FIG. 33.

ANALYS-RESLT-HISTOGRAM-END-PCT 5430 is populated from RE-HISTOGRAM-END-PCT 5980 in array in FIG. 33.

Additional detail on step Load Channels for Result Group 560 follows:

The Lead-In Analytics Engine 200 populates this field as follows copying it from the one array to the other array:

ANALYS-RES-CHANNEL-CALL-SIGN 5500 is populated from CHAN-TO-ANALYZE-CALL-SIGN 6010 in array in FIG. 34.

The source code for this routine can be found in the accompanying source code file as routines C140-INIT-ANALYSIS-PERIOD-DEF and C142-INIT-ANALYSIS-PERIOD-DEF and C146-LOAD-DEMO-GEO-HISTG and C148-LOAD-CHANNELS which is included herein by reference.

Figure 7:
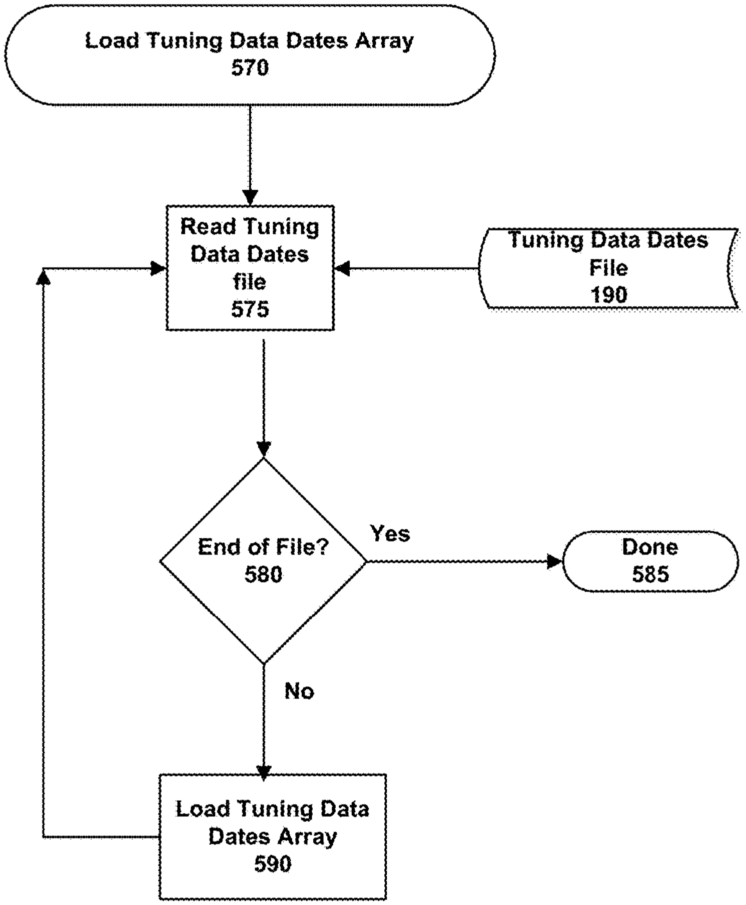
FIG. 7 illustrates an exemplary flowchart for loading Tuning Data Dates data to an array in the memory of a computer in preparation for analyzing video asset viewing device channel tuning activity during both a Lead-In period and a Target Period, according to one embodiment.

FIG. 7 is a flowchart which illustrates an exemplary process for loading the tuning data dates to be analyzed into an an array in the memory of a computer that is running the the Lead-In Analytics Engine 200, so that this data can be used by Lead-In Analytics Engine 200 as it tracks viewership by the set-top boxes for this study. The process begins with Load Tuning Data Dates Array 570. The process then executes Read Tuning Data Dates file 575 which reads file Tuning Data Dates File 190 as input. The process checks for End of File 580. If it is the end of file, the process is Done 585. If End of File 580 does not detect an end of file condition, then the record that was read is loaded to the array using Load Tuning Data Dates Array 590.

The end result of this process is that the Lead-In Analytics Engine 200 has loaded the Tuning Data Dates data into an array in the memory of the computer running the engine. The analyst uses the Tuning Data Dates file 190 to tell the Lead-In Analytics Engine 200 which tuning records in the Channel Tuning File have data that is of interest to the study. In the case where the Channel Tuning Data file has channel tune data from multiple dates, this allows the analyst to restrict the analysis to the data which the analyst deems significant.

Additional detail on step Load Tuning Data Dates Array 590 follows: The Lead-In Analytics Engine 200 populates each of the fields as follows:

CVIEW-VIEWING-DATE 4300 is populated from TUNING-DATA-DATE 2510 in file Tuning Data Dates File 190.

The source code for this routine can be found in the accompanying source code file as routines C170-TUNING-DATA-DATES and C172-TUNING-DATA-DATES which is included herein by reference.

Figure 8:
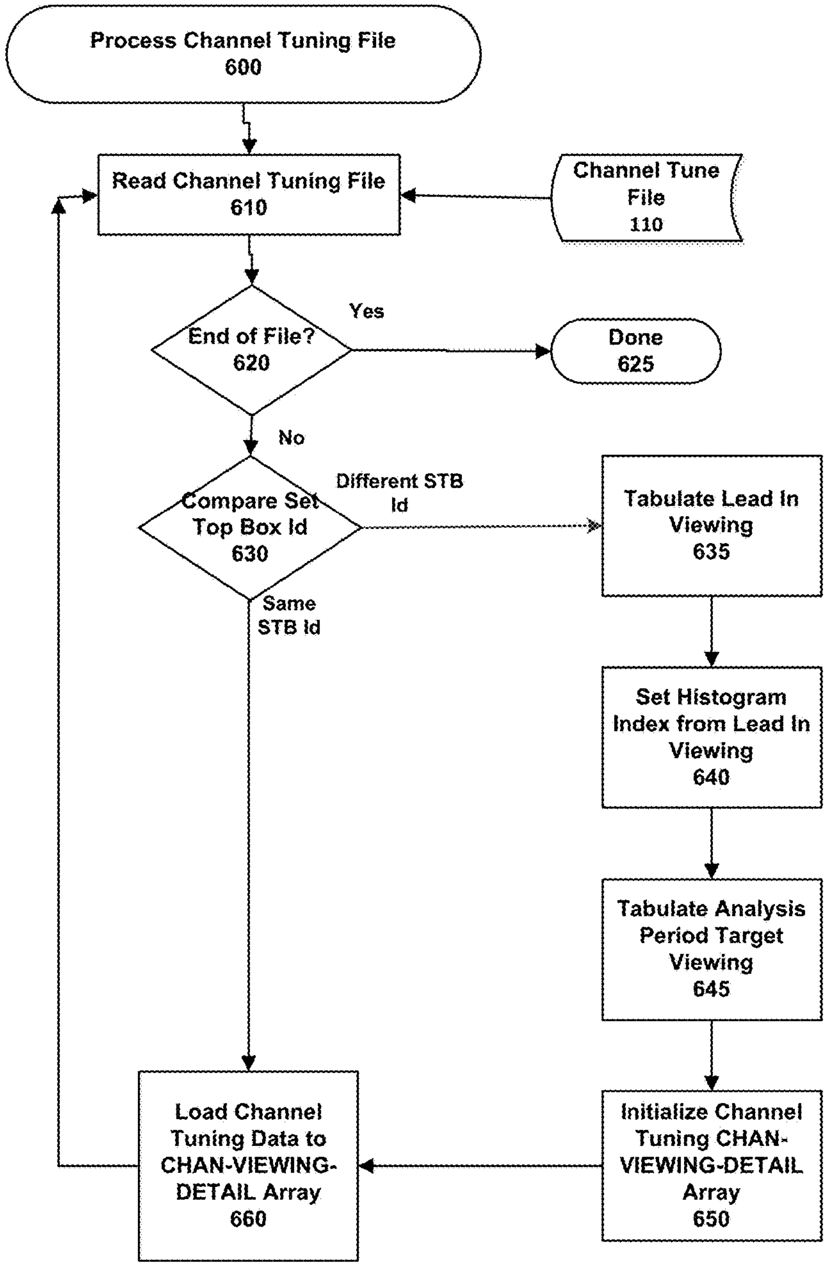
FIG. 8 illustrates an exemplary flowchart providing an overview of a process using a computer to analyze Channel Tuning Activity during both a Lead-In period and a Target Period, according to one embodiment.

FIG. 8 is a flowchart which illustrates an exemplary process for processing set-top box channel tuning data to an array in the memory of a computer that is running the the Lead-In Analytics Engine 200 and then running various analytics against that data to tabulate lead-in viewing and to tabulate analysis period result (target) viewing.

The process begins with Process Channel Tuning File 600. The process then executes Read Channel Tuning File 610 which reads file Channel Tune File 110 as input. The process checks for End of File 620. If it is the end of file, the process is Done 625. If End of File 620 does not detect an end of file condition, then the Lead-In Analytics Engine 200 compares the set-top box id 630 to the id of the previous record to determine if the set-top box id has changed. When the set-top box id is the same, the Lead-In Analytics Engine 200 loads the channel tuning information represented in that record to an array in the memory of the computer as defined in Load Channel Tuning Data to Chan-Viewing-Detail Array 660. See FIG. 9 for details of this process.

The Lead-In Analytics Engine 200 then proceeds to read the next record in the file repeating the process. The result of this interim step is that all of the channel tuning data for this set-top box has been loaded to an array in the memory of the computer. See FIG. 9 for details of this process. That array contains the channel that was viewed by the set-top box for every second of the day for all of the days defined in the study. In addition to the channel tuning data, Demographic and Geographic identifiers related to the viewer are loaded to this array. This array is described in FIGS. 30-A-B.

When the Lead-In Analytics Engine 200 detects that a different set-top box has been read (based on a change in the set-top box identifier), it begins the tabulation process. The Lead-In Analytics Engine 200 first executes step Tabulate Lead In Viewing 635 which tabulates all of the viewing by this set-top box for each of the lead-in periods that were defined for this Study. See FIG. 10 for details of this process.

After tabulating the Lead-in viewing, the Lead-In Analytics Engine 200 then sets the histogram index which categorizes this set-top box into a histogram bucket based on the aggregate viewing during all of the Lead-in periods combined. This is done by executing Set Histogram Index from Lead In Viewing 640. The purpose for this is to group Analysis Period viewing based on similar amounts of overall lead-in viewing.

After identifying the proper histogram bucket, the Lead-In Analytics Engine 200 then tabulates the analysis period viewing by executing Tabulate Analysis Period Target Viewing 645. See FIG. 11 for details of this process.

At this point the Lead-In Analytics Engine 200 has completed tabulating all of the viewing for this set-top box. The next step is to initialize the channel tuning array in preparation for processing the data for the next set-top box (the one with the new id). This is done by executing Initialize Channel Tuning Array 650. Once the channel tuning array is initialized, the Lead-In Analytics Engine 200 can load the Channel Tuning Data for the new set-top box into the array, thus resuming the process.

Figure 9:
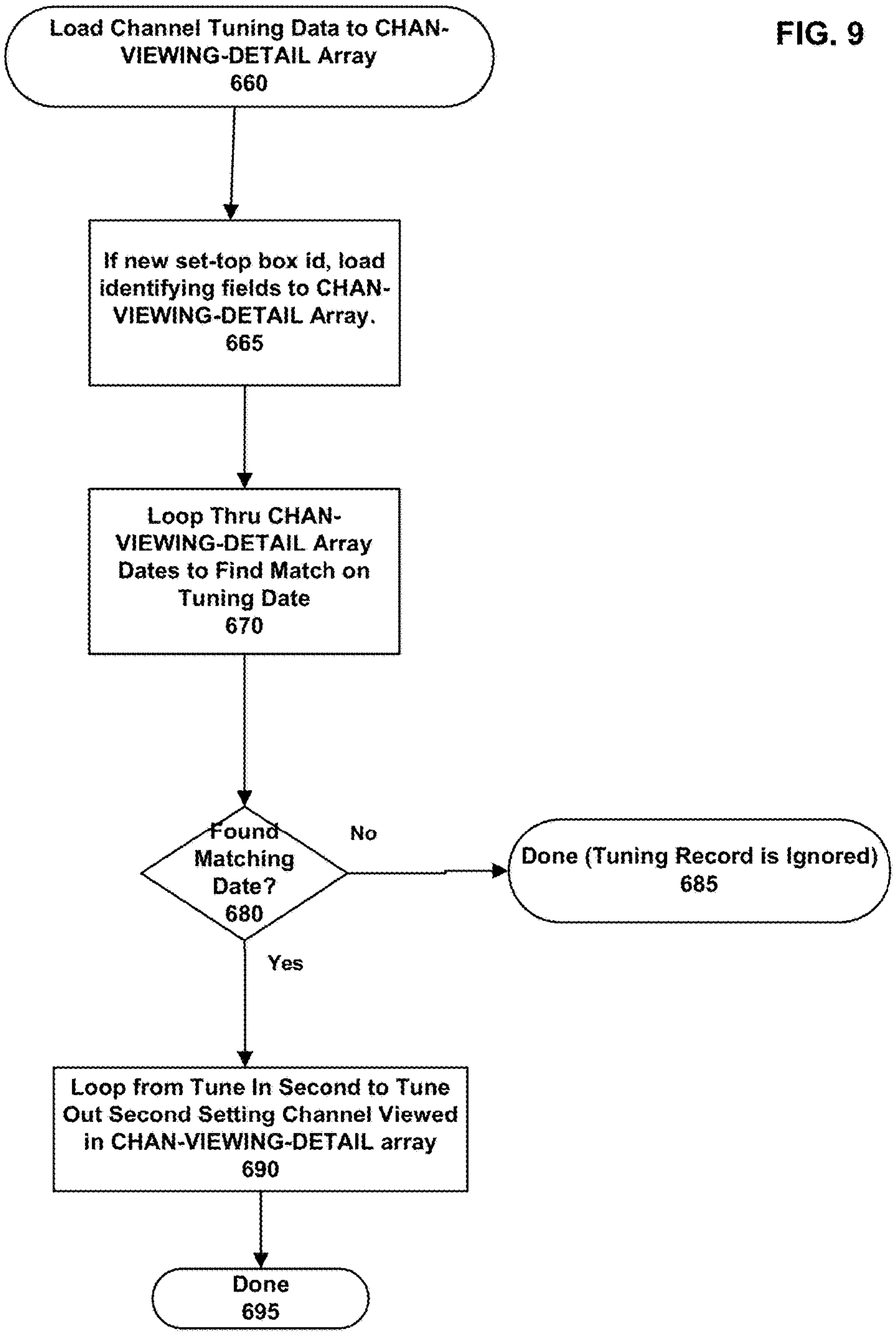
FIG. 9 illustrates an exemplary flowchart for loading second-by-second Channel Tuning Activity to an array in the memory of a computer in preparation for analyzing video asset viewing device channel tuning activity during both a Lead-In period and a Target Period, according to one embodiment.

FIG. 9 is a flowchart which illustrates an exemplary process for loading the Channel Tuning Data for one set-top box at a time into an array in the memory of a computer that is running the the Lead-In Analytics Engine 200, so that this data can be used by Lead-In Analytics Engine 200 as it tracks viewership by the set-top boxes for this study. The process begins with Load Channel Tuning Data to CHAN-VIEWING-DETAIL Array 660. Prior to calling this routine, the Lead-In Analytics Engine 200 has already read a Channel Tuning record from the file Channel Tune File 110.

Each time the Lead-In Analytics Engine 200 detects a new set-top box id in routine If new set-top box id, load identifying fields to CHAN-VIEWING-DETAIL Array 665, it populates the identifying fields in the CHAN-VIEWING-DETAIL array as follows:

CVIEW-MARKET 4200 is populated from MARKET 1010 in Channel Tune File 110.

CVIEW-SET-TOP-BOX-ID 4210 is populated from SET-TOP-BOX-ID 1050 in Channel Tune File 110.

CVIEW-DEMOGRAPHIC-CODE 4220 is populated from DEMOGRAPHIC-CODE 1220 in Channel Tune File 110.

CVIEW-GEOGRAPHIC-CODE 4230 is populated from GEOGRAPHIC-CODE 1230 in Channel Tune File 110.

The process then executes Loop Thru CHAN-VIEWING-DETAIL Array Dates to Find Match on Tuning Date 670. In this process the program is looping thru the dates that were loading to the CHAN-VIEWING-DETAIL array by the process described in FIG. 7 to determine whether the date in the Channel Tuning Data (field Tune-in-date 1090) matches one of the dates in the CHAN-VIEWING-DETAIL array (field CVIEW-Viewing-date 4300). Reference procedure: Found Matching Date? 680.

If the Channel Tune Date (field Tune-in-date 1090) does not match any of the dates in the CHAN-VIEWING-DETAIL array, then this Channel Tuning record is ignored; reference procedure: Done (Tuning Record is Ignored) 685.

If the Channel Tune Date (field Tune-in-date 1090) does match one of the dates in the CHAN-VIEWING-DETAIL array (field CVIEW-Viewing-date 4300), then the viewing activity represented in this Channel Tuning record is loaded to the array by process Loop from Tune In Second to Tune Out Second Setting Channel Viewed in CHAN-VIEWING-DETAIL array 690. Upon successful completion of loading the Channel Tuning Data to the CHAN-VIEWING-DETAIL array, Done 695, returns control to the main routine where the next channel tuning record is read.

The end result of this process is that the Lead-In Analytics Engine 200 has loaded all of the required Channel Tuning Data for one set-top box into the CHAN-VIEWING-DETAIL array in the memory of the computer running the Lead-In Analytics Engine 200. The required data is that data where the Channel Tune Date matches a date that the analyst has defined for this study. The array structure provides one bucket for every second of the day with said bucket identifying the channel to which the set-top box was tuned; this array contains multiple days of tuning data thus allowing the Lead-In Analytics Engine 200 to analyze second-by-second level tuning activity for the set-top box over an extended period of time thus providing Longitudinal viewing analysis at a second-by-second level.

Additional detail on step Loop Thru CHAN-VIEWING-DETAIL Array Dates to Find Match on Tuning Date 670 follows:

The Lead-In Analytics Engine 200 identifies the correct date in the channel viewing array using a routine like this:

```
PERFORM
  VARYING CVIEW-DATE-SUB
  FROM 1 BY 1
    UNTIL TUNE-IN-DATE 1090 = CVIEW-VIEWING-DATE
    (CVIEW-DATE-SUB) 4300
      Or no match is found
END-PERFORM
```

Additional detail on step Loop from Tune In Second to Tune Out Second Setting Channel Viewed in CHAN-VIEWING-DETAIL array 690 follows:

The Lead-In Analytics Engine 200 populates the second-by-second viewing activity using a routine like this:

```
PERFORM VARYING CVIEW-SEC-SUB
  FROM TUNE-IN-SECOND-OF-DAY 1120
  BY 1
  UNTIL CVIEW-SEC-SUB > TUNE-OUT-SECOND-OF-DAY 1160
    MOVE CHANNEL-CALL-SIGN 1170 TO
      CVIEW-CHANNEL-CALL-SIGN (CVIEW-DATE-SUB,
      CVIEW-SEC-SUB) 4330
END-PERFORM
```

The source code for this routine can be found in the accompanying source code file as routines D000-PREP-CHAN-TUNING-FILE and D100-PROCESS-CHAN-TUNING-FILE and the various routines called by D100-PROCESS-CHAN-TUNING-FILE, which is included herein by reference.

Figure 10:
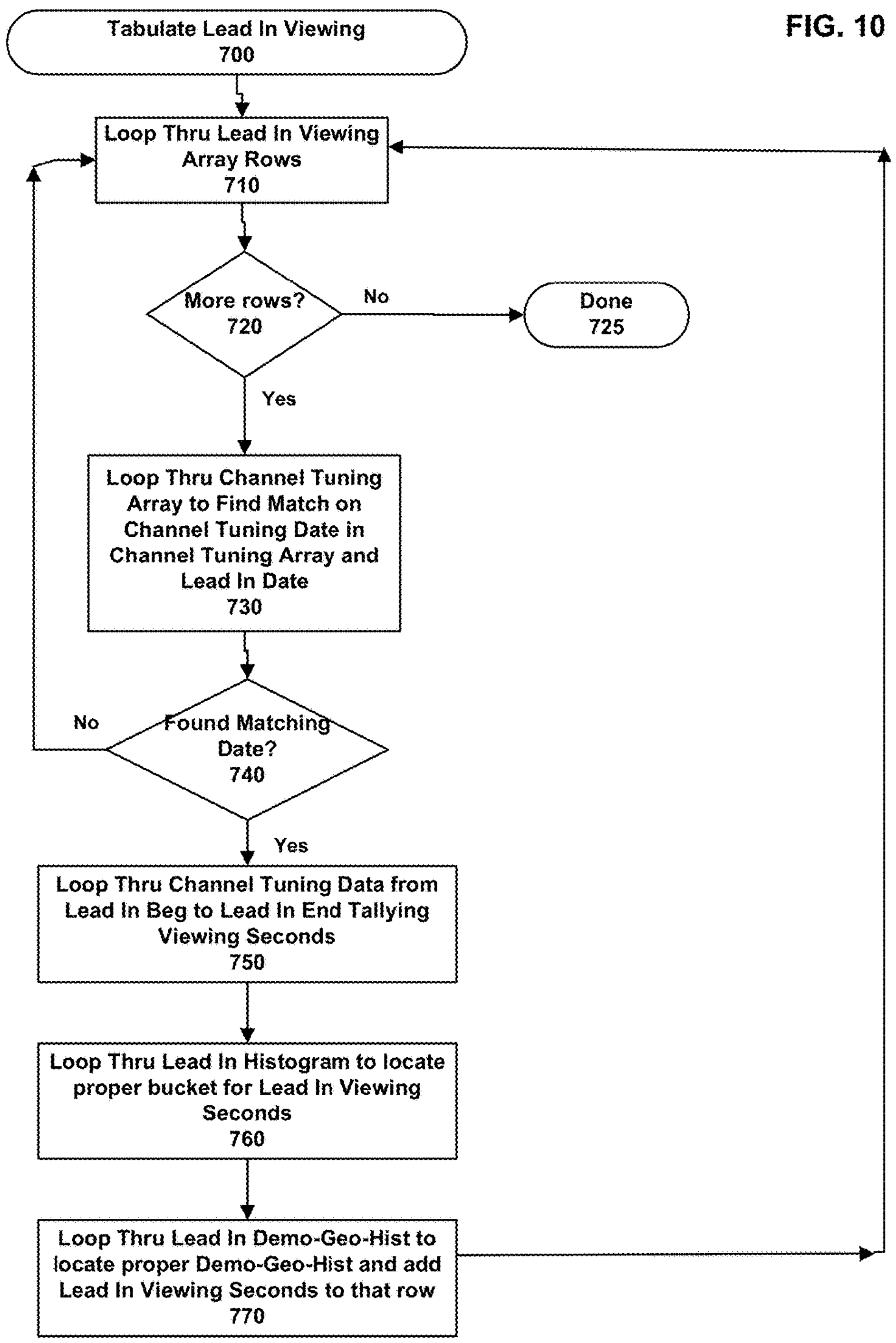
FIG. 10 illustrates an exemplary flowchart for Tabulating Lead-In Viewing at a video asset viewing device level using Lead-In and related data along with Channel Tuning Data, all of which was loaded to arrays in the memory of a computer, according to one embodiment.

FIG. 10 illustrates an exemplary flowchart for Tabulating Lead-In Viewing at a Set-top box level using Lead-In and related data along with Channel Tuning Data, all of which was loaded to arrays in the memory of a computer that is running the Lead-In Analytics Engine 200, so that this data can be used by Lead-In Analytics Engine 200 as it tracks Lead-in viewership by the set-top boxes for this study, according to one embodiment.

The Lead-In and related data was loaded to the LEAD-IN-AND-TARGET-INFO array defined in FIG. 31.

The Channel Tuning Data was loaded to the CHAN-VIEWING-DETAIL array defined in FIG. 30.

The process begins with Tabulate Lead In Viewing 700. Prior to calling this routine, the Lead-In Analytics Engine 200 has already read all of the Channel Tuning records for a set-top box and loaded them to the CHAN-VIEWING-DETAIL Array as described in FIG. 9. Additionally, the Lead-in period definitions have been loaded to the LEAD-IN-AND-TARGET-INFO array as described in FIG. 5.

The process then executes Loop Thru Lead In Viewing Array Rows 710. In this process the program is looping thru the array rows that define the lead in periods. If there are no more rows, the program proceeds to Done 725. If there are more rows, then the program proceeds to Loop Thru Channel Tuning Array to Find Match on Channel Tuning Date in Channel Tuning Array and Lead In Date 730 where the Lead-In Analytics Engine 200 compares the date of the channel tuning activity (Viewing-date 4300) with the date of the Lead-in period (LEAD-VIDEO-PLAY-DATE 4900) to determine if there is a match.

When Found Matching Date 740 is not true, the program proceeds to 710 to get the next lead-in period.

When Found Matching Date 740 is true, the program proceeds to Loop Thru Channel Tuning Data from Lead In Beg to Lead In End Tallying Viewing Seconds 750 tallying the viewing seconds by the set-top box during this lead-in period.

After tallying the viewing seconds, the program proceeds to Loop Thru Lead In Histogram to locate proper bucket for Lead In Viewing Seconds 760 where it loops through the Histogram definitions to find the proper histogram into which to categorize the set-top box's lead-in period viewing.

Once the proper Histogram identifier is found, the program proceeds to Loop Thru Lead In Demo-Geo-Hist to locate proper Demo-Geo-Hist and add Lead In Viewing Seconds to that row 770 where the program loops through each of the Demographic-Geographic-Histogram groupings defined for this lead-in period with the objective of finding the proper bucket into which to tally this set-top box's lead-in viewing. The program is looking for the Demographic-Geographic-Histogram grouping where the set-top box Demographic identifier 4220 matches the lead-in period Demographic identifier 5050, and the set-top box Geographic identifier 4230 matches the lead-in period Geographic identifier 5060 and the Histogram bucket that was identified in 760 matches the one in the Lead-in period 5070.

Once the proper row is found, the viewing seconds are tabulated as defined in the program. Reference procedure: E140-TALLY-LEAD-IN-VIEWING in the accompanying source code file which is included herein by reference.

At this point the Lead-In Analytics Engine 200 is done tallying lead-in period viewing for this lead-in period for this set-top box. It will now proceed to the next lead-in period as described in Loop Thru Lead In Viewing Array Rows 710.

Additional detail on step Loop Thru Channel Tuning Data from Lead In Beg to Lead In End Tallying Viewing Seconds 750 follows:

The Lead-In Analytics Engine 200 tallies the lead in viewing using a routine like this:

```
MOVE 0 TO    LEAD-IN-SECONDS-VIEWED-COUNTER.
MOVE 0 TO    LEAD-IN-EXPOSURES-COUNTER.
PERFORM VARYING CVIEW-SEC-SUB
  FROM LEAD-VIDEO-PLAY-BEG-SEC-OF-DAY(LI-SUB) 4920
  BY 1
  UNTIL CVIEW-SEC-SUB > LEAD-VIDEO-PLAY-END-SEC-OF-
  DAY(LI-SUB) 4940
  IF CVIEW-CHANNEL-CALL-SIGN (CVIEW-DATE-SUB,
  CVIEW-SEC-SUB) 4330 =
    LEAD-CHANNEL-CALL-SIGN(LI-SUB) 4890
```

-continued

```
    ADD 1 TO LEAD-IN-SECONDS-VIEWED-COUNTER
    ADD 1 TO AGGR-ALL-LEAD-IN-VIEW-SECS
  END-IF
END-PERFORM.
```

Calculate the number of set-top boxes tuned in at the beginning of the lead-in period.

```
IF CVIEW-CHANNEL-CALL-SIGN 4330
    (CVIEW-DATE-SUB, LEAD-VIDEO-PLAY-BEG-SEC-OF-
    DAY(LI-SUB) 4920) =
  LEAD-CHANNEL-CALL-SIGN(LI-SUB) 4890
  ADD 1 TO LEAD-IN-STB-COUNT-AT-BEG(LI-SUB)    5020
END-IF
```

Calculate the number of set-top boxes tuned in at the end of the lead-in period.

```
IF CVIEW-CHANNEL-CALL-SIGN 4330
    (CVIEW-DATE-SUB, LEAD-VIDEO-PLAY-END-SEC-OF-
    DAY(LI-SUB) 4940) =
  LEAD-CHANNEL-CALL-SIGN(LI-SUB) 4890
  ADD 1 TO LEAD-IN-STB-COUNT-AT-END(LI-SUB)    5030
END-IF
```

Calculate the number of set-top boxes tuned in for the entire lead-in period.

```
IF LEAD-IN-SECONDS-VIEWED-COUNTER =
      LEAD-IN-VIDEO-DURATION-SECS (LI-SUB) 4970
  ADD 1 TO LEAD-IN-STB-COUNT-VIEW-ALL(LI-SUB) 5040
END-IF.
IF LEAD-IN-SECONDS-VIEWED-COUNTER >
      LEAD-IN-SECS-FOR-EXPOSURE (LI-SUB) 4975
  MOVE 1 TO LEAD-IN-EXPOSURES-COUNTER
END-IF.
```

Additional detail on step Loop Thru Lead In Histogram to locate proper bucket for Lead In Viewing Seconds 760 follows:

The Lead-In Analytics Engine 200 locates the proper histogram bucket for lead in viewing using a routine like shown below and then it tallies the lead-in viewing as shown:

```
COMPUTE PCT-OF-LEAD-IN-VIEWING =
        (LEAD-IN-SECONDS-VIEWED-COUNTER /
        LEAD-IN-VIDEO-DURATION-SECS(LI-SUB)) 4970 * 100
PERFORM
  VARYING LEAD-RES-SUB
  FROM 1 BY 1
  UNTIL FOUND-HISTOGRAM-MATCH = "Y"
  OR LEAD-RES-SUB > LI-DEMO-GEO-HISTG-ROWS-LOADED
    IF CVIEW-DEMOGRAPHIC-CODE 4220 =
        LEAD-RESLT-DEMOGRAPHIC-CODE (LI-SUB, LEAD-RES-SUB) 5050 AND
      CVIEW-GEOGRAPHIC-CODE   4230 =
        LEAD-RESLT-GEOGRAPHIC-CODE   (LI-SUB, LEAD-RES-SUB) 5060 AND
      PCT-OF-LEAD-IN-VIEWING >=
        LEAD-RESLT-HISTOGRAM-BEG-PCT (LI-SUB, LEAD-RES-SUB) 5080 AND
      PCT-OF-LEAD-IN-VIEWING <=
        LEAD-RESLT-HISTOGRAM-END-PCT (LI-SUB, LEAD-RES-SUB) 5090
          MOVE "Y"      TO FOUND-HISTOGRAM-MATCH
```

-continued

```
    At this point, tally the lead in viewing using logic like
this:
        COMPUTE LEAD-RESLT-STB-COUNT (LI-SUB, LEAD-RES-SUB) 5100 =
                LEAD-RESLT-STB-COUNT (LI-SUB, LEAD-RES-SUB) 5100 + 1
        COMPUTE LEAD-RESLT-AGGR-VIEW-SECS (LI-SUB, LEAD-RES-SUB) 5110 =
                LEAD-RESLT-AGGR-VIEW-SECS (LI-SUB, LEAD-RES-SUB) 5110 +
                LEAD-IN-SECONDS-VIEWED-COUNTER
        COMPUTE LEAD-RESLT-EXPOSURES (LI-SUB, LEAD-RES-SUB) 5120 =
                LEAD-RESLT-EXPOSURES (LI-SUB, LEAD-RES-SUB) 5120 +
                LEAD-IN-EXPOSURES-COUNTER
```

Calculate the number of set-top boxes tuned in at the beginning of the lead-in period for this demographic-geographic-histogram group.

```
IF CVIEW-CHANNEL-CALL-SIGN 4330
    (CVIEW-DATE-SUB,
        LEAD-VIDEO-PLAY-BEG-SEC-OF-DAY(LI-SUB) 4920) =
    LEAD-CHANNEL-CALL-SIGN(LI-SUB) 4890
  ADD 1 TO LEAD-RES-STB-COUNT-AT-BEG
                (LI-SUB, LEAD-RES-SUB)    5130
END-IF
```

Calculate the number of set-top boxes tuned in at the end of the lead-in period for this demographic-geographic-histogram group.

```
IF CVIEW-CHANNEL-CALL-SIGN 4330
    (CVIEW-DATE-SUB,
        LEAD-VIDEO-PLAY-END-SEC-OF-DAY(LI-SUB) 4940) =
  LEAD-CHANNEL-CALL-SIGN(LI-SUB) 4890
  ADD 1 TO LEAD-RES-STB-COUNT-AT-END
                (LI-SUB, LEAD-RES-SUB)    5140
END-IF
```

Calculate the number of set-top boxes tuned in for the entire lead-in period for this demographic-geographic-histogram group.

```
        IF LEAD-IN-SECONDS-VIEWED-COUNTER =
            LEAD-IN-VIDEO-DURATION-SECS (LI-SUB) 4970
          ADD 1 TO LEAD-RES-STB-COUNT-VIEW-ALL
                (LI-SUB, LEAD-RES-SUB)    5150
        END-IF.
      END-IF
   END-PERFORM
```

Figure 11:
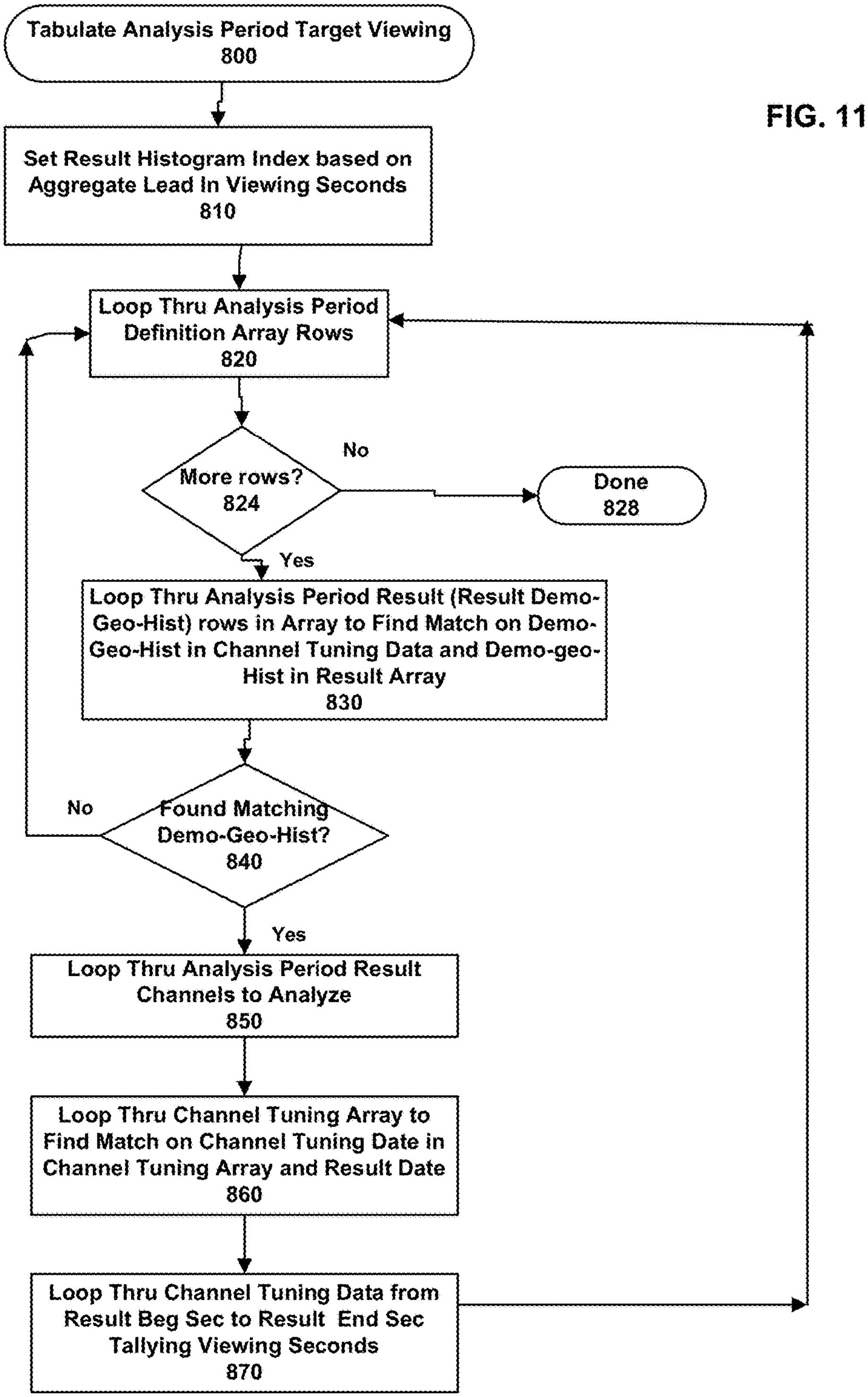
FIG. 11 illustrates an exemplary flowchart for Tabulating Target Period Viewing at a video asset viewing device level using Target Period and related data along with Channel Tuning Activity, all of which was loaded to arrays in the memory of a computer, according to one embodiment.

FIG. 11 illustrates an exemplary flowchart for Tabulating Result Viewing at a Set-top box level using Analysis Period Result and related data along with Channel Tuning Data, all of which was loaded to arrays in the memory of a computer that is running the the Lead-In Analytics Engine 200, so that this data can be used by Lead-In Analytics Engine 200 as it tracks Analysis Period Result viewership by the set-top boxes for this study, according to one embodiment.

The Analysis Period Result and related data was loaded to the LEAD-IN-AND-TARGET-INFO array defined in FIG. 31.

The Channel Tuning Data was loaded to the CHAN-VIEWING-DETAIL array defined in FIG. 30.

The process begins with Tabulate Analysis Period Target Viewing 800. It then proceeds to Set Result Histogram Index based on Aggregate Lead In Viewing Seconds 810 which sets the histogram index that will be used to group Analysis Period Result viewership. In this process the Lead-In Analytics Engine 200 is identifying the proper histogram bucket to use by comparing the aggregate lead-in period viewing with the histogram definitions that were defined for Result (Target) period viewing.

Once the proper histogram index is identified, the program proceeds to Loop Thru Analysis Period Definition Array Rows 820 where it loops thru the Analysis Period definitions in the array. This is where the analyst has defined the individual analysis periods for which the system is to track viewing during the overall Target Analysis Period.

The program then checks for More rows 824. When there are no more Analysis Period Definitions, the process is Done 828. When there are more rows, it proceeds to step Loop Thru Analysis Period Result (Result Demo-Geo-Hist) rows in Array to Find Match on Demo-Geo-Hist in Channel Tuning Data and Demo-geo-Hist in Result Array 830 where the program looks for a match on the Demographic-Geographic-Histogram values. The program is looking for the Demographic-Geographic-Histogram grouping where the set-top box Demographic identifier 4220 matches the Analysis period Demographic identifier 5390, and the set-top box Geographic identifier 4230 matches the Analysis period Geographic identifier 5400 and the Histogram bucket that was identified in 810 matches the one in the Analysis period 5410.

When Found Matching Demo-Geo-Hist? 840 results in No, the program returns control to Loop Thru Analysis Period Definition Array Rows 820. When a match is found, control passes to Loop Thru Analysis Period Result Channels to Analyze 850 where the program loops thru each of the channels that the analyst has specified to be analyzed (this list was loaded by the process in FIG. 06 step 560) and for each channel, the Lead-In Analytics Engine 200 runs procedure Loop Thru Channel Tuning Array to Find Match on Channel Tuning Date in Channel Tuning Array and Result Date 860 to find the channel tuning data date that matches with the date in the Analysis Period Result.

Once the matching date is found, the Lead-In Analytics Engine 200 runs procedure Loop Thru Channel Tuning Data from Result Beg Sec to Result End Sec Tallying Viewing Seconds 870 where the Engine 200 tabulates viewing of that channel during the Analysis period by looping from the result beginning second to the result ending second tallying viewing seconds of where the channel in ANALYS-RES-CHANNEL-CALL-SIGN 5500 matches the channel in CVIEW-CHANNEL-CALL-SIGN 4330.

When the program finishes tallying the viewing seconds, it returns control to Loop Thru Analysis Period Definition Array Rows 820.

Additional detail on step Set Result Histogram Index based on Aggregate Lead In Viewing Seconds 810 follows:

The Lead-In Analytics Engine 200 locates the proper histogram bucket for result viewing and then sets the desired values using a routine like shown below:

```
COMPUTE PCT-OF-ALL-LEAD-IN-VIEWING =
    (CVIEW-1-LEAD-IN-AGGR-VIEW-SECS 4280 /
     LEAD-CALCULATED-POT-VIEW-SECS) 4840 * 100
PERFORM
  VARYING DGH-SUB
  FROM 1 BY 1
  UNTIL FOUND-HISTOGRAM-MATCH = "Y"
  OR DGH-SUB > RE-DEMO-GEO-HISTG-ROWS-LOADED
    IF PCT-OF-ALL-LEAD-IN-VIEWING >=
        RE-HISTOGRAM-BEG-PCT(DGH-SUB) 5970 AND
      PCT-OF-ALL-LEAD-IN-VIEWING <=
        RE-HISTOGRAM-END-PCT(DGH-SUB) 5980
      MOVE "Y"  TO FOUND-HISTOGRAM-MATCH
      MOVE RE-HISTOGRAM-INDEX(DGH-SUB) 5950
          TO CVIEW-HISTOGRAM-INDEX 4240
      MOVE RE-HISTOGRAM-BUCKET-NAME(DGH-SUB) 5960
          TO CVIEW-HISTOGRAM-DESC 4250
      MOVE RE-HISTOGRAM-BEG-PCT(DGH-SUB)   5970
          TO CVIEW-HISTOGRAM-BEG-PCT 4260
      MOVE RE-HISTOGRAM-END-PCT(DGH-SUB)   5980
          TO CVIEW- HISTOGRAM-END-PCT 4270
    END-IF
END-PERFORM.
```

Claims Reference:

In this process the Lead-In Analytics Engine 200 has identified the target histogram bucket for this video asset viewing device based on the aggregate lead-in viewing by this device across the various lead-in periods. This allows the Lead-In Analytics Engine 200 to correlate lead-in viewing activity for a video asset viewing device with target viewing activity for that device and to group the target viewing activity for the device with other video asset viewing devices that had a similar amount of aggregate viewing of the lead-in video assets.

Additional detail on step Loop Thru Channel Tuning Array to Find Match on Channel Tuning Date in Channel Tuning Array and Result Date 860 follows:

The Lead-In Analytics Engine 200 locates the proper date where the channel tuning data matches the result viewing data using a routine like shown below:

```
  PERFORM
    VARYING CVIEW-DATE-SUB
    FROM 1 BY 1
      UNTIL AP-DEF-DATE(AP-DEF-SUB) 5300 =
        CVIEW-VIEWING-DATE(CVIEW-DATE-SUB) 4300
      Or no more rows
  END-PERFORM
```

Additional detail on step Loop Thru Channel Tuning Data from Result Beg Sec to Result End Sec Tallying Viewing Seconds 870 follows:

The Lead-In Analytics Engine 200 tabulates the detail channel viewing during the analysis result period using a routine like shown below:

```
MOVE 0 TO ANALYSIS-PERIOD-CHAN-VIEW-SECS
PERFORM VARYING CVIEW-SEC-SUB
  FROM AP-DEF-BEG-TIME-SEC-OF-DAY(AP-DEF-SUB) 5320
  BY 1
  UNTIL CVIEW-SEC-SUB > AP-DEF-END-TIME-SEC-OF-
  DAY(AP-DEF-SUB) 5340
  IF CVIEW-CHANNEL-CALL-SIGN(CVIEW-DATE-SUB, CVIEW-
  SEC-SUB) 4330 =
      ANALYS-RES-CHANNEL-CALL-SIGN
            (AP-DEF-SUB, AP-RES-SUB, CTA-SUB) 5500
```

-continued

```
  COMPUTE ANALYS-RES-AGGR-CHAN-VIEW-SECS
          (AP-DEF-SUB, AP-RES-SUB, CTA-SUB) 5510 =
        ANALYS-RES-AGGR-CHAN-VIEW-SECS
          (AP-DEF-SUB, AP-RES-SUB, CTA-SUB) 5510 + 1
    ADD 1 TO ANALYSIS-PERIOD-CHAN-VIEW-SECS
    ADD 1 TO AGGR-ALL-RES-HISTG-CHN-VW-SECS
  END-IF
  END-PERFORM.
  IF ANALYSIS-PERIOD-CHAN-VIEW-SECS >
      AP-TARGET-MIN-SECS-VW-AT-START 5260
    COMPUTE ANALYS-RES-CHAN-EXPOSURES
        (AP-DEF-SUB, AP-RES-SUB, CTA-SUB) 5520 =
          ANALYS-RES-CHAN-EXPOSURES
        (AP-DEF-SUB, AP-RES-SUB, CTA-SUB) 5520 + 1
  END-IF.
  IF ANALYSIS-PERIOD-CHAN-VIEW-SECS > 0
    COMPUTE ANALYS-RES-STB-ANY-VIEWING
        (AP-DEF-SUB, AP-RES-SUB, CTA-SUB) 5530 =
          ANALYS-RES-STB-ANY-VIEWING
        (AP-DEF-SUB, AP-RES-SUB, CTA-SUB) 5530 + 1
  END-IF.
```

Claims Reference:

Both FIG. 10 and FIG. 11 identify processes by which the viewing activity for the video asset viewing device is being tabulated based upon the demographic and geographic codes linked to the viewer in the user activity data structure. When the Lead-In Analytics Engine 200 is provided with similar demographic and geographic codes for both lead-in (from file 140) and target (from file 170) viewing, this enables the Lead-In Analytics Engine 200 to correlate the target viewing activity with the lead-in viewing activity based on demographic code and/or geographic code.

Figure 12:
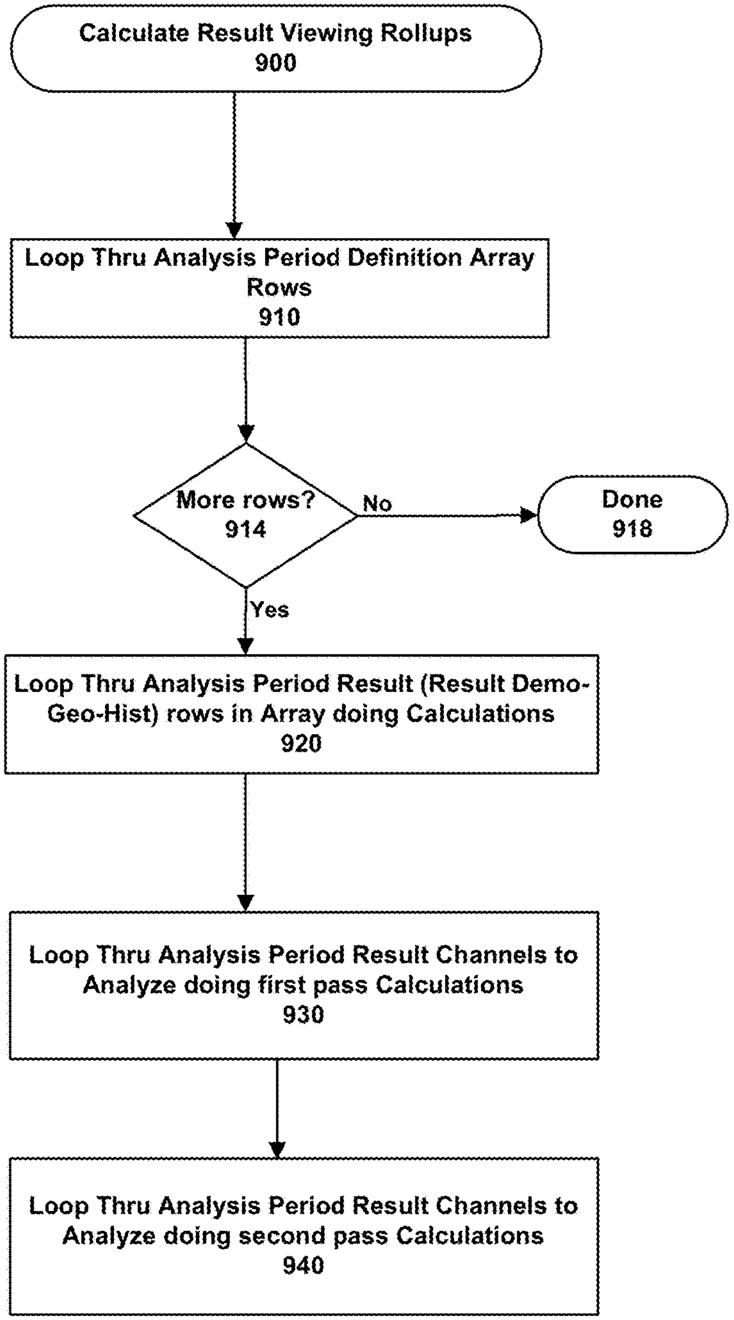
FIG. 12 illustrates an exemplary flowchart for Calculating Result Viewing Rollups related to Target period viewing by manipulating Analysis Period Result data in arrays in the memory of a computer, according to one embodiment.

FIG. 12 illustrates an exemplary flowchart for Calculating Result Viewing Rollups related to Target period viewing by manipulating Analysis Period Result data in arrays in the memory of a computer that is running the the Lead-In Analytics Engine 200, according to one embodiment. FIG. 12 refers to routine M100-CALC-ROLLUP-VALUES in the source program which is included herein by reference.

The LEAD-IN-AND-TARGET-INFO array defined in FIG. 31 contains the data being manipulated by this process.

The process begins with Calculate Result Viewing Rollups 900. In this process the Lead-In Analytics Engine 200 is performing various aggregations which will summarize the detail viewing data calculated at the Channel level to higher levels.

The step Loop Thru Analysis Period Definition Array Rows 910 loops thru each of the Analysis Period definition rows in the array. The process performs More rows? 914 where it checks for more rows in the array. When there are no more rows, Done 918 is executed. When the are more rows, then control passes to Loop Thru Analysis Period Result (Result Demo-Geo-Hist) rows in Array doing Calculations 920 where the process loops thru each of the Result Demographic-Geographic-Histogram rows performing various calculations as defined in the source code which is included herein by reference.

The next step is Loop Thru Analysis Period Result Channels to Analyze doing first pass Calculations 930 where the program loops thru the Analysis Period Result Channels doing a first pass of calculations as defined in the source code which is included herein by reference. The first pass is performing various aggregations.

After the first pass calculations are completed, the program proceeds to Loop Thru Analysis Period Result Channels to Analyze doing second pass Calculations 940 where a second pass of calculations is completed as defined in the source code which is included herein by reference. The second pass is calculating percentage of viewing using the aggregated values calculated in the first pass.

Additional detail on this step follows:

The Lead-In Analytics Engine 200 tabulates various aggregations for the analysis result period using a routine like shown below:

```
PERFORM         loop thru Analysis Period Def Rows
  VARYING AP-DEF-SUB
  FROM 1 BY 1
    UNTIL AP-DEF-SUB > ANALYSIS-PERIOD-ROWS-LOADED
      PERFORM      loop thru Analysis Result Rows (Demo-Geo-Histg)
        VARYING AP-RES-SUB
          FROM 1 BY 1
          UNTIL AP-RES-SUB > RE-DEMO-GEO-HISTG-ROWS-LOADED
          PERFORM loop thru Channels
            VARYING CTA-SUB
            FROM 1 BY 1
            UNTIL CTA-SUB > CHAN-TO-ANALYZE-ROWS-LOADED
            calculate the totals (rollups) needed to calculate
            the percent of viewing that this channel got.
            COMPUTE ANALYS-RESLT-TOT-CHAN-VIEW-SEC
                        (AP-DEF-SUB, AP-RES-SUB) 5440 =
                      ANALYS-RESLT-TOT-CHAN-VIEW-SEC
                        (AP-DEF-SUB, AP-RES-SUB) 5440 +
                          ANALYS-RES-AGGR-CHAN-VIEW-SECS
                            (AP-DEF-SUB, AP-RES-SUB, CTA-SUB) 5510
            COMPUTE ANALYS-RESLT-TOT-CHAN-EXPOSURE
                         (AP-DEF-SUB, AP-RES-SUB) 5450 =
                      ANALYS-RESLT-TOT-CHAN-EXPOSURE
                         (AP-DEF-SUB, AP-RES-SUB) 5450 +
                          ANALYS-RES-CHAN-EXPOSURES
                            (AP-DEF-SUB, AP-RES-SUB, CTA-SUB) 5520
            COMPUTE ANALYS-RESLT-TOT-STB-ANY-VIEW
                         (AP-DEF-SUB, AP-RES-SUB) 5460 =
                      ANALYS-RESLT-TOT-STB-ANY-VIEW
                         (AP-DEF-SUB, AP-RES-SUB) 5460 +
                          ANALYS-RES-STB-ANY-VIEWING
                            (AP-DEF-SUB, AP-RES-SUB, CTA-SUB) 5530
            COMPUTE AP-DEF-TOT-CHAN-VIEW-SEC (AP-DEF-SUB) 5360 =
                      AP-DEF-TOT-CHAN-VIEW-SEC (AP-DEF-SUB) 5360 +
                          ANALYS-RES-AGGR-CHAN-VIEW-SECS
                              (AP-DEF-SUB, AP-RES-SUB, CTA-SUB) 5510
            COMPUTE AP-DEF-TOT-CHAN-EXPOSURE (AP-DEF-SUB) 5370 =
                      AP-DEF-TOT-CHAN-EXPOSURE (AP-DEF-SUB) 5370 +
                          ANALYS-RES-CHAN-EXPOSURES
                              (AP-DEF-SUB, AP-RES-SUB, CTA-SUB) 5520
            COMPUTE AP-DEF-TOT-STB-ANY-VIEW (AP-DEF-SUB) 5380 =
                      AP-DEF-TOT-STB-ANY-VIEW (AP-DEF-SUB) 5380 +
                          ANALYS-RES-STB-ANY-VIEWING
                              (AP-DEF-SUB, AP-RES-SUB, CTA-SUB) 5530
            Aggregate values for the entire Target viewing period.
            COMPUTE AP-TARGET-AGGR-ACTUAL-VIEW-SEC 5280 =
                      AP-TARGET-AGGR-ACTUAL-VIEW-SEC 5280 +
                          ANALYS-RES-AGGR-CHAN-VIEW-SECS
                              (AP-DEF-SUB, AP-RES-SUB, CTA-SUB) 5510
            COMPUTE AP-TARGET-AGGR-ACTUL-EXPOSURES 5290 =
                      AP-TARGET-AGGR-ACTUL-EXPOSURES 5290 +
                          ANALYS-RES-CHAN-EXPOSURES
                              (AP-DEF-SUB, AP-RES-SUB, CTA-SUB) 5520
          END-PERFORM end loop thru channels part 1
          Now that we have calculated the total viewing seconds
          for this Demo-Geo-Histg, calculate the percent
          of viewing that this channel got from all the
          viewing for this Demo-Geo-Hist.
          PERFORM loop thru Channels
            VARYING CTA-SUB
            FROM 1 BY 1
            UNTIL CTA-SUB > CHAN-TO-ANALYZE-ROWS-LOADED
            IF ANALYS-RESLT-TOT-CHAN-VIEW-SEC
                (AP-DEF-SUB, AP-RES-SUB) 5440 > 0
              COMPUTE CHAN-PCT-SHARE-OF-VIEWING
                  (AP-DEF-SUB, AP-RES-SUB, CTA-SUB) 5540 =
                   ANALYS-RES-AGGR-CHAN-VIEW-SECS
                     (AP-DEF-SUB, AP-RES-SUB, CTA-SUB) 5510 /
                   ANALYS-RESLT-TOT-CHAN-VIEW-SEC
                     (AP-DEF-SUB, AP-RES-SUB) 5440 * 100
```

-continued

```
            ELSE
              MOVE 0 TO CHAN-PCT-SHARE-OF-VIEWING
                (AP-DEF-SUB, AP-RES-SUB, CTA-SUB) 5540
            END-IF
          END-PERFORM end loop thru channels part 2
      END-PERFORM      end loop thru Analysis Result Rows
                    (Demo-Geo-Histg)
    COMPUTE AP-TARGET-AGGR-EXPECT-VIEW-SEC 5270 =
              AP-TARGET-AGGR-EXPECT-VIEW-SEC 5270 +
              AP-DEF-TOT-CHAN-EXPOSURE (AP-DEF-SUB) 5370 *
                (AP-DEF-END-TIME-SEC-OF-DAY(AP-DEF-SUB) 5340 –
                 AP-DEF-BEG-TIME-SEC-OF-DAY(AP-DEF-SUB) 5320 + 1)
END-PERFORM.     End loop thru Analysis Period Def Rows
```

Figure 13:
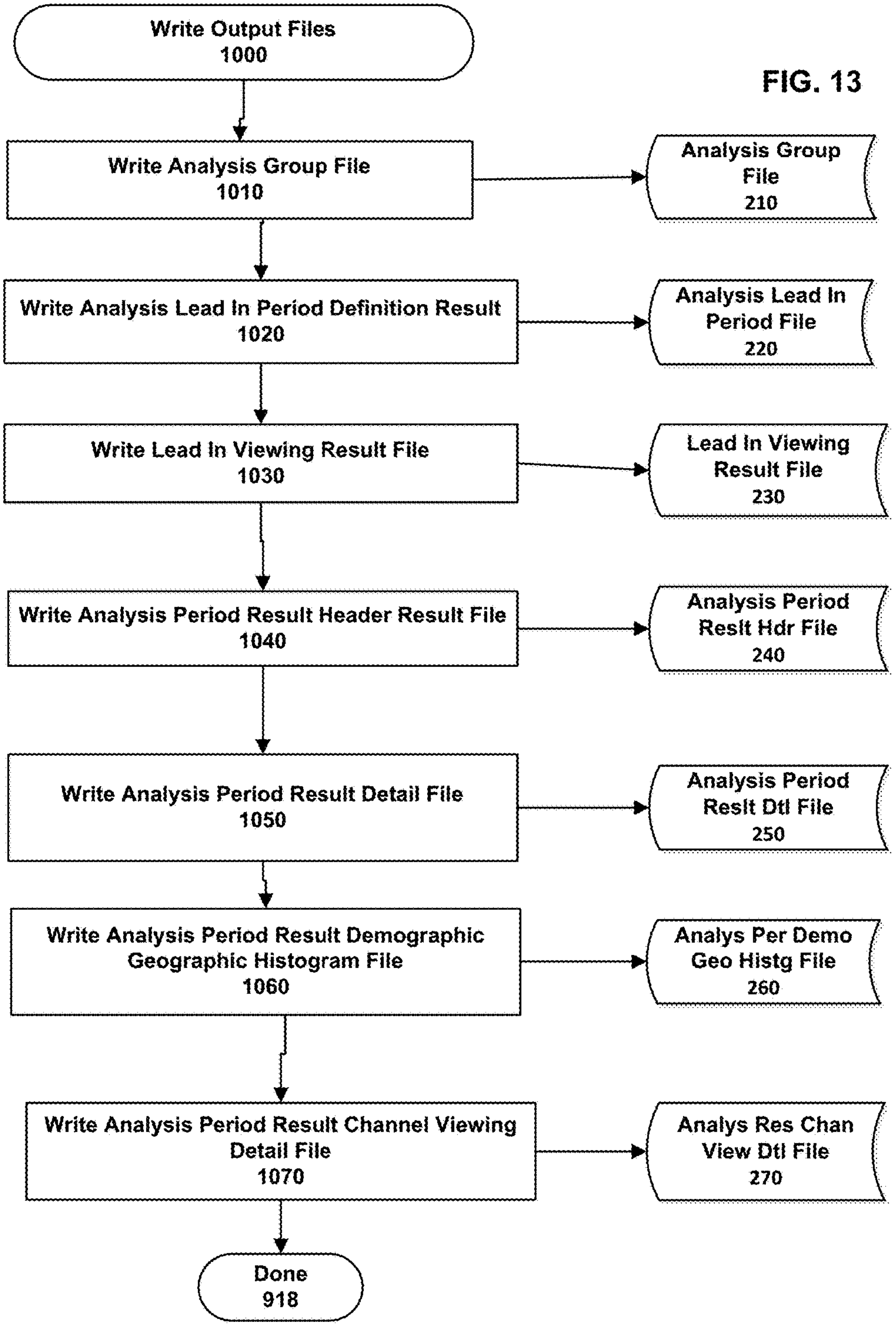
FIG. 13 illustrates an exemplary flowchart for Writing the Output files that result from both the Lead-In Viewing analysis and the Analysis Period Result analysis by manipulating data in arrays in the memory of a computer, according to one embodiment.

FIG. 13 illustrates an exemplary flowchart for Writing the Output files that result from both the Lead-In Viewing analysis and the Analysis Period Result (Target) analysis by manipulating data in arrays in the memory of a computer, according to one embodiment.

The LEAD-IN-AND-TARGET-INFO array defined in FIG. 31 contains the data being manipulated by this process.

The process begins with Write Output Files 1000. The Lead-In Analytics Engine 200 will perform process Write Analysis Group File 1010 where it will write the Analysis Group information to file Analysis Group File 210 using data in the LEAD-IN-AND-TARGET-INFO array which was described in FIG. 31.

The field mapping is as follows:

ANALYSIS-GROUP-ID 3010 is populated from LEAD-IN-ANALYSIS-GROUP-ID 4810 from array in FIG. 31.

ANALYSIS-GROUP-MARKET 3020 is populated from LEAD-IN-MARKET 4800 from array in FIG. 31.

ANALYSIS-GROUP-DESC 3030 is populated from LEAD-IN-ANALYSIS-GROUP-DESC 4820 from array in FIG. 31.

POTENTIAL-VIEWING-SECONDS 3040 is populated from LEAD-IN-POTENTIAL-VIEWING-SECS 4830 from array in FIG. 31.

POTENTIAL-EXPOSURES 3050 is populated from LEAD-IN-POTENTIAL-EXPOSURES 4850 from array in FIG. 31.

AGGREGATE-VIEWING-ALL-STB 3060 is populated from LEAD-IN-AGGR-VIEWING-ALL-STB 4860 from array in FIG. 31.

AGGREGATE-EXPOSURES-ALL-STB 3070 is populated from LEAD-IN-AGGR-EXPOSURES-ALL-STB 4870 from array in FIG. 31.

The Lead-In Analytics Engine 200 will then perform process Write Analysis Lead In Period Definition Result 1020 where will it will write the Analysis Lead In Period File 220 which contains the information about the Lead-In period(s) that were defined by the analyst for the study.

The field mapping is as follows:

ANALYSIS-GROUP-ID 3105 is populated from LEAD-IN-ANALYSIS-GROUP-ID 4810 from array in FIG. 31.

ANALYSIS-PERIOD-ID 3110 is populated from LEAD-ANALYSIS-PERIOD-ID 4880 from array in FIG. 31.

CHANNEL-CALL-SIGN 3115 is populated from LEAD-CHANNEL-CALL-SIGN 4890 from array in FIG. 31.

VIDEO-PLAY-DATE 3120 is populated from LEAD-VIDEO-PLAY-DATE 4900 from array in FIG. 31.

VIDEO-PLAY-BEG-TIME 3125 is populated from LEAD-VIDEO-PLAY-BEG-TIME 4910 from array in FIG. 31.

VIDEO-PLAY-BEG-SEC-OF-DAY 3130 is populated from LEAD-VIDEO-PLAY-BEG-SEC-OF-DAY 4920 from array in FIG. 31.

VIDEO-PLAY-END-TIME 3135 is populated from LEAD-VIDEO-PLAY-END-TIME 4930 from array in FIG. 31.

VIDEO-PLAY-END-SEC-OF-DAY 3140 is populated from LEAD-VIDEO-PLAY-END-SEC-OF-DAY 4940 from array in FIG. 31.

VIDEO-DURATION-SECS 3145 is populated from LEAD-IN-VIDEO-DURATION-SECS 4970 from array in FIG. 31.

LEAD-IN-SECS-FOR-EXPOSURE 3150 is populated from LEAD-IN-SECS-FOR-EXPOSURE 4975 from array in FIG. 31.

INDUSTRY-PROGRAM-ID 3155 is populated from LEAD-IN-INDUSTRY-PROGRAM-ID 4950 from array in FIG. 31.

INDUSTRY-ASSET-ID 3160 is populated from LEAD-IN-INDUSTRY-ASSET-ID 4960 from array in FIG. 31.

VIDEO-DESC 3165 is populated from LEAD-VIDEO-DESC 4980 from array in FIG. 31.

STB-COUNT 3170 is populated from LEAD-IN-STB-COUNT 4990 from array in FIG. 31.

AGGR-VIEW-SECS 3175 is populated from LEAD-IN-AGGR-VIEW-SECS 5000 from array in FIG. 31.

EXPOSURES 3180 is populated from LEAD-IN-EXPOSURES 5010 from array in FIG. 31.

STB-TUNED-AT-BEG-OF-LEAD-IN-CNT 3185 is populated from LEAD-IN-STB-COUNT-AT-BEG 5020 from array in FIG. 31.

STB-TUNED-AT-END-OF-LEAD-IN-CNT 3190 is populated from LEAD-IN-STB-COUNT-AT-END 5030 from array in FIG. 31.

STB-TUNE-FOR-ALL-OF-LEAD-IN-CNT 3195 is populated from LEAD-IN-STB-COUNT-VIEW-ALL 5040 from array in FIG. 31.

The Lead-In Analytics Engine 200 will then perform process Write Lead In Viewing Result File 1030 where it will write the Lead In Viewing Result File 230 which contains information about the viewing that occurred during the Lead-In period. This viewing is broken down into the Demographic-Geographic-Histogram segments that the Analysis defined for this study.

The field mapping is as follows:

ANALYSIS-GROUP-ID 3205 is populated from LEAD-IN-ANALYSIS-GROUP-ID 4810 from array in FIG. 31.

ANALYSIS-PERIOD-ID 3210 is populated from LEAD-ANALYSIS-PERIOD-ID 4880 from array in FIG. 31.

CHANNEL-CALL-SIGN 3215 is populated from LEAD-CHANNEL-CALL-SIGN 4890 from array in FIG. 31.

VIDEO-PLAY-DATE 3220 is populated from LEAD-VIDEO-PLAY-DATE 4900 from array in FIG. 31.

VIDEO-PLAY-BEG-TIME 3225 is populated from LEAD-VIDEO-PLAY-BEG-TIME 4910 from array in FIG. 31.

LEAD-IN-DEMOGRAPHIC-CODE 3230 is populated from LEAD-RESLT-DEMOGRAPHIC-CODE 5050 from array in FIG. 31.
LEAD-IN-GEOGRAPHIC-CODE 3235 is populated from LEAD-RESLT-GEOGRAPHIC-CODE 5060 from array in FIG. 31.
LEAD-IN-HISTOGRAM-INDEX 3240 is populated from LEAD-RESLT-HISTOGRAM-INDEX 5070 from array in FIG. 31.
LEAD-IN-HISTOGRAM-BEG-PCT 3245 is populated from LEAD-RESLT-HISTOGRAM-BEG-PCT 5080 from array in FIG. 31.
LEAD-IN-HISTOGRAM-END-PCT 3250 is populated from LEAD-RESLT-HISTOGRAM-END-PCT 5090 from array in FIG. 31.
STB-COUNT 3255 is populated from LEAD-RESLT-STB-COUNT 5100 from array in FIG. 31.
AGGR-VIEW-SECS 3260 is populated from LEAD-RESLT-AGGR-VIEW-SECS 5110 from array in FIG. 31.
EXPOSURES 3265 is populated from LEAD-RESLT-EXPOSURES 5120 from array in FIG. 31.
STB-TUNED-AT-BEG-OF-LEAD-IN-CNT 3270 is populated from LEAD-RES-STB-COUNT-AT-BEG 5130 from array in FIG. 31.
STB-TUNED-AT-END-OF-LEAD-IN-CNT 3275 is populated from LEAD-RES-STB-COUNT-AT-END 5140 from array in FIG. 31.
STB-TUNE-FOR-ALL-OF-LEAD-IN-CNT 3280 is populated from LEAD-RES-STB-COUNT-VIEW-ALL 5150 from array in FIG. 31.

The Lead-In Analytics Engine 200 will then perform process Write Analysis Period Result Header Result File 1040 where will it will write the Analysis Period Reslt Hdr File 240 which contains the information about the overall Analysis Period or Target for which viewing was being measured by this study.

The field mapping is as follows:
ANALYSIS-GROUP-ID 3405 is populated from LEAD-IN-ANALYSIS-GROUP-ID 4810 from array in FIG. 31.
TARGET-CHANNEL 3410 is populated from AP-TARGET-CHANNEL 5160 from array in FIG. 31.
POTENTIAL-VIEWING-SECOND 3415 is populated from AP-POTENTIAL-VIEWING-SECONDS 5170 from array in FIG. 31.
POTENTIAL-EXPOSURES 3420 is populated from AP-POTENTIAL-EXPOSURES 5180 from array in FIG. 31.
TARGET-INDUSTRY-VIDEO-PROGRAM-ID 3425 is populated from AP-TARGET-IND-VIDEO-PGM-ID 5190 from array in FIG. 31.
TARGET-INDUSTRY-VIDEO-ASSET-ID 3430 is populated from AP-TARGET-IND-VIDEO-ASSET-ID 5200 from array in FIG. 31.
TARGET-AIRING-DATE 3435 is populated from AP-TARGET-AIRING-DATE 5210 from array in FIG. 31.
TARGET-AIRING-BEG-TIME 3440 is populated from AP-TARGET-AIRING-BEG-TIME 5220 from array in FIG. 31.
TARGET-AIRNG-BEG-SEC-OF-DAY 3445 is populated from AP-TARGET-AIRNG-BEG-SEC-OF-DAY 5240 from array in FIG. 31.
TARGET-AIRING-END-TIME 3450 is populated from AP-TARGET-AIRING-END-TIME 5230 from array in FIG. 31.
TARGET-AIRNG-END-SEC-OF-DAY 3455 is populated from AP-TARGET-AIRNG-END-SEC-OF-DAY 5250 from array in FIG. 31.
TARGET-MIN-SECS-VW-AT-START 3460 is populated from AP-TARGET-MIN-SECS-VW-AT-START 5260 from array in FIG. 31.
AGGR-EXPECT-VIEW-SEC 3465 is populated from AP-TARGET-AGGR-EXPECT-VIEW-SEC 5270 from array in FIG. 31.
AGGR-ACTUAL-VIEW-SEC 3470 is populated from AP-TARGET-AGGR-ACTUAL-VIEW-SEC 5280 from array in FIG. 31.
AGGR-ACTUL-EXPOSURES 3475 is populated from AP-TARGET-AGGR-ACTUL-EXPOSURES 5290 from array in FIG. 31.

The Lead-In Analytics Engine 200 will then perform process Write Analysis Period Result Detail File 1050 where it will write the Analysis Period Reslt Dtl File 250 which contains the information about the individual Analysis Periods (segments of the Target) that are being analyzing to determine viewership. Recall that one Analysis Period Header may have many individual detail periods defined such as, for example, the innings of a baseball game.

The field mapping is as follows:
APD-DEF-ANALYSIS-GROUP-ID 3610 is populated from LEAD-IN-ANALYSIS-GROUP-ID 4810 from array in FIG. 31.
AP-DEF-DATE 3615 is populated from AP-DEF-DATE 5300 from array in FIG. 31.
AP-DEF-BEG-TIME-HH-MM-SS 3620 is populated from AP-DEF-BEG-TIME-HH-MM-SS-PM 5310 from array in FIG. 31.
AP-DEF-BEG-TIME-SEC-OF-DAY 3625 is populated from AP-DEF-BEG-TIME-SEC-OF-DAY 5320 from array in FIG. 31.
AP-DEF-END-TIME-HH-MM-SS 3630 is populated from AP-DEF-END-TIME-HH-MM-SS-PM 5330 from array in FIG. 31.
AP-DEF-END-TIME-SEC-OF-DAY 3635 is populated from AP-DEF-END-TIME-SEC-OF-DAY 5340 from array in FIG. 31.
AP-DEF-PERIOD-DURATION-SECS 3640 is populated from AP-DEF-PERIOD-DURATION-SECS 5350 from array in FIG. 31.
AP-DEF-TOT-CHAN-VIEW-SEC 3645 is populated from AP-DEF-TOT-CHAN-VIEW-SEC 5360 from array in FIG. 31.
AP-DEF-TOT-CHAN-EXPOSURE 3650 is populated from AP-DEF-TOT-CHAN-EXPOSURE 5370 from array in FIG. 31.
AP-DEF-TOT-STB-ANY-VIEW 3655 is populated from AP-DEF-TOT-STB-ANY-VIEW 5380 from array in FIG. 31.

The Lead-In Analytics Engine 200 will then perform process Write Analysis Period Result Demographic Geographic Histogram File 1060 where it will write the Analys Per Demo Geo Histg File 260 file which contains the information about the viewing that occurred during each individual Analysis Period. This viewing is broken down into the Demographic-Geographic-Histogram segments that the analyst defined for this study.

The field mapping is as follows:
APD-DEF-ANALYSIS-GROUP-ID 3810 is populated from LEAD-IN-ANALYSIS-GROUP-ID 4810 from array in FIG. 31.
AP-DEF-DATE 3820 is populated from AP-DEF-DATE 5300 from array in FIG. 31.
AP-DEF-BEG-TIME-HH-MM-SS 3830 is populated from AP-DEF-BEG-TIME-HH-MM-SS-PM 5310 from array in FIG. 31.

RESULT-DEMOGRAPHIC-CODE 3840 is populated from ANALYS-RESLT-DEMOGRAPHIC-CODE 5390 from array in FIG. 31.

RESULT-GEOGRAPHIC-CODE 3850 is populated from ANALYS-RESLT-GEOGRAPHIC-CODE 5400 from array in FIG. 31.

RESULT-HISTOGRAM-INDEX 3860 is populated from ANALYS-RESLT-HISTOGRAM-INDEX 5410 from array in FIG. 31.

RESULT-HISTOGRAM-BEG-PCT 3870 is populated from ANALYS-RESLT-HISTOGRAM-BEG-PCT 5420 from array in FIG. 31.

RESULT-HISTOGRAM-END-PCT 3880 is populated from ANALYS-RESLT-HISTOGRAM-END-PCT 5430 from array in FIG. 31.

RESULT-TOT-CHAN-VIEW-SEC 3890 is populated from ANALYS-RESLT-TOT-CHAN-VIEW-SEC 5440 from array in FIG. 31.

RESULT-TOT-CHAN-EXPOSURE 3900 is populated from ANALYS-RESLT-TOT-CHAN-EXPOSURE 5450 from array in FIG. 31.

RESLT-TOT-STB-ANY-VIEW 3910 is populated from ANALYS-RESLT-TOT-STB-ANY-VIEW 5460 from array in FIG. 31.

Finally, the Lead-In Analytics Engine 200 will then perform process Write Analysis Period Result Channel Viewing Detail File 1070 where it will write the Analys Res Chan View Dtl File 270 which contains the viewing information for each channel that was viewed by the Set-top boxes classified by the Demographic-Geographic-Histogram segments that the analyst defined for this study.

The field mapping is as follows:

APD-DEF-ANALYSIS-GROUP-ID 4010 is populated from LEAD-IN-ANALYSIS-GROUP-ID 4810 from array in FIG. 31.

AP-DEF-DATE 4020 is populated from AP-DEF-DATE 5300 from array in FIG. 31.

AP-DEF-BEG-TIME-HH-MM-SS 4030 is populated from AP-DEF-BEG-TIME-HH-MM-SS-PM 5310 from array in FIG. 31.

RESULT-DEMOGRAPHIC-CODE 4040 is populated from ANALYS-RESLT-DEMOGRAPHIC-CODE 5390 from array in FIG. 31.

RESULT-GEOGRAPHIC-CODE 4050 is populated from ANALYS-RESLT-GEOGRAPHIC-CODE 5400 from array in FIG. 31.

RESULT-HISTOGRAM-INDEX 4060 is populated from ANALYS-RESLT-HISTOGRAM-INDEX 5410 from array in FIG. 31.

RESULT-CHANNEL-CALL-SIGN 4070 is populated from ANALYS-RES-CHANNEL-CALL-SIGN 5500 from array in FIG. 31.

RESULT-AGGR-CHAN-VIEW-SECS 4080 is populated from ANALYS-RES-AGGR-CHAN-VIEW-SECS 5510 from array in FIG. 31.

RESULT-CHAN-EXPOSURES 4085 is populated from ANALYS-RES-CHAN-EXPOSURES 5520 from array in FIG. 31.

RESULT-STB-ANY-VIEWING 4090 is populated from ANALYS-RES-STB-ANY-VIEWING 5530 from array in FIG. 31.

CHAN-PCT-SHARE-OF-VIEWING 4100 is populated from CHAN-PCT-SHARE-OF-VIEWING 5540 from array in FIG. 31.

At this point the process is Done 918.

The result is that the Lead-In Analytics Engine 200 has created very detailed analytics and written them to flat files which can be loaded to a data base for further reporting.

Alternatively, these analytics may be written directly to data base tables. In either event, the analyst now has very detailed information about video asset viewership for each Lead-in period with the various demographic, geographic, histogram breakouts, and for the Target period and its segments and the Demographic-Geographic-Histogram breakouts during each segment along with the channel viewing information.

Each of the files described in FIG. 13 is written by manipulating data in the LEAD-IN-AND-TARGET-INFO array which was described in FIG. 31. A person with ordinary skill in the art will have no difficult transferring data from the LEAD-IN-AND-TARGET-INFO array to the various output files. The attached source code which is included herein by reference provides an example of how to do this.

FIGS. 14-A-B-C illustrate an exemplary record layout for the Channel Tune File 110 formatted for use as input to the Lead In Analytics Engine 200 according to one embodiment.

FIG. 14-A illustrates the file format in which the Channel Tune File 110 may arrive from the Channel Tuning Data Collector 100.

FIG. 14-B illustrates two sample records 1003 and 1005 containing channel tuning data as it appears in Channel Tune File 110. Note that these records arrive as fixed length records. In another embodiment these could arrive as variable length records.

FIG. 14-C illustrates these two sample records 1003 and 1005 formatted into a table for human readability.

The Channel Tuning data is collected, preprocessed, and prepared for the Lead-In Analytics Engine 200 by the Channel Tuning Data Collector 100. The Channel Tuning Data Collector 100 may receive data from a variety of sources including but not limited to Switched Digital Video systems, Set top box applications, Internet Protocol collection systems, or from other collection sources.

The Channel Tuning Data Collector 100 delivers the Channel Tune File 110 containing channel tuning data ready to be analyzed to the Lead-In Analytics Engine 200.

Another embodiment may deliver that channel tuning data as the output of a data base query or as XML messages or in any other suitable format.

In my prior U.S. patent application having application Ser. No. 12/981,301 filed on Dec. 29, 2010, I reviewed switched digital video systems as one of several possible data sources. In that application I noted that switched digital video channel change data is readily available under current technology. I provided information about two vendors that supply switched digital video systems, namely Motorola and CISCO. I also described a process for preparing the channel tuning file created by a source system so that said file could be used by the Analytics Engine described in that specification.

The Lead-In Analytics Engine described in this specification uses a Channel Tuning File similar to the one described in my prior application. Therefore, in the present application, I have simply described the layout of the Channel Tune File while making note that the Lead-In Analytics Engine 200 does not presently use all of the fields in this layout. Because they are part of the process described in said prior patent application I have included them here.

FIGS. 15-A-B-C illustrate an exemplary record layout for the Analysis Group Info File 120 formatted for use as input to the Lead In Analytics Engine 200, according to one embodiment. The Analysis Group Information File records overall information about the Analysis study that is being done. Each study will have one Analysis Group Info record.

FIG. 15-A illustrates the file format in which the Analysis Group Info File 120 may arrive.

FIG. 15-B illustrates one sample record 1303 containing analysis group information data as it appears in Analysis Group Info File 120. Note that this record arrives as a fixed length record. In another embodiment this could arrive as a variable length record.

FIG. 15-C illustrates this sample record 1303 formatted into a table for human readability.

FIGS. 16-A-B-C illustrate an exemplary record layout for the Lead In Video Play Info File 130 formatted for use as input to the Lead In Analytics Engine 200, according to one embodiment.

Lead In Video Play Information File records information about each of the Lead In video viewing periods. The analyst is allowed to define whatever Lead-In periods he wants to analyze. Nonlimiting examples include:

In the case of an ad or a series of ads promoting an upcoming program, the analyst may use this to define each of the ads that will be presented to the viewer to encourage them to view the target video.

In the case where the analyst is seeking to explore viewership of a particular program, the analyst may treat the entire program as a series of lead-in segment; in that case the analyst may define various segments of that program such as twelve (12) five (5) minute segments for a one hour program.

In the case of an episodic program where the analyst is tracking viewing for the last 7 weeks with the Target being the $8^{th}$ week, the analyst may define weekly lead-in's for each episode for the last 7 weeks.

In the case of the nightly news where the analyst is tracking daily viewing for the last 7 days, the analyst may define daily lead-in periods for each day's news cast for the last week.

In the case of a series of ads where the advertiser is trying to measure audience fatigue, the analyst may define each of the instances of an ad that ran during the last day or several days as the lead-in periods.

In the case of prime time viewing, the analyst may define the first hour of broadcasting as the lead-in period which is then followed by a target hour.

The analyst is allowed to define whatever Lead-In periods he wants to analyze. The Lead In Analytic Engine 200 presently supports up to 100 Lead In periods.

FIG. 16-A illustrates the file format in which the Lead In Video Play Info File 130 may arrive.

FIG. 16-B illustrates two sample records 1403 and 1405 containing lead in video play information data as it appears in Lead In Video Play Info File 130. Note that these records arrive as fixed length records. In another embodiment these could arrive as variable length records.

FIG. 16-C illustrates these two sample records 1403 and 1405 formatted into a table for human readability.

FIGS. 17-A-B-C illustrate an exemplary record layout for the Lead In Demographic Geographic Histogram Definition File 140 formatted for use as input to the Lead In Analytics Engine 200, according to one embodiment.

The Lead In Demographic Geographic Histogram Definition File 140 is used to create a user defined Histogram of Demographic identifier, Geographic identifier, and Histogram Percentages by which to categorize Lead In viewing. The user may define one Demographic group and one Geographic group with a variety of Histogram viewing buckets, or Several Demographic groups and one Geographic group with a variety of Histogram viewing buckets, or one Demographic group and several Geographic groups, etc.

The Lead In Analytic Engine presently supports up to 200 combinations of Demographic, Geographic, and Histogram categories.

Note: This is similar to the histogram for Result viewing, except that this histogram is applicable only to analyzing Lead In viewing.

FIG. 17-A illustrates the file format in which the Lead In Demographic Geographic Histogram Definition File 140 may arrive.

FIG. 17-B illustrates two sample records 1603 and 1605 containing Demographic, Geographic, and Histogram category data as it appears in Demographic Geographic Histogram Definition File 140. Note that these records arrive as fixed length records. In another embodiment these could arrive as variable length records.

FIG. 17-C illustrates these two sample records 1603 and 1605 formatted into a table for human readability.

FIGS. 18-A-B-C illustrate an exemplary record layout for the Analysis Period Target File 150 formatted for use as input to the Lead In Analytics Engine 200 according to one embodiment.

The Analysis Period Target File 150 contains information about the Target video asset for which the system is tracking viewership to understand how effective the Lead-in video assets were in encouraging viewership of the Target.

If the analyst only needs to analyze Lead-in viewing without regard to Target viewing, then this file is not required.

The Lead In Analytic Engine 200 presently supports one Analysis Period Target. The Target can then be broken into segments as defined in FIG. 19.

FIG. 18-A illustrates the file format in which the Analysis Period Target File 150 may arrive.

FIG. 18-B illustrates a sample record 1803 containing target video asset data as it appears in Analysis Period Target File 150. Note that this record arrives as a fixed length record. In another embodiment this could arrive as a variable length record.

FIG. 18-C illustrates this sample record 1803 formatted into a table for human readability.

FIGS. 19-A-B-C illustrate an exemplary record layout for the Analysis Period Definition File 160 formatted for use as input to the Lead In Analytics Engine 200 according to one embodiment.

The Analysis Period Definition File 160 allows the user to subdivide the Target video defined in Analysis Period Target into viewing segments for analysis. For example, a baseball game could be divided into 9 segments, one for each inning. A football game could be divided into 4 segments, one for each quarter; or into 6 segments for pre-game show, 2 quarters, half-time, and final 2 quarters. A movie could be divided into scenes. A newscast could be divided into segments for the various parts of the newscast (national news, local news, weather, sports). One could also define segments for each commercial.

The analyst is allowed to use the Analysis Period Definition File 160 to define whatever Target segments he wants to analyze. The Lead In Analytics Engine 200 presently supports up to sixty (60) Analysis Period Definitions. This can be changed as needed.

FIG. 19-A illustrates the file format in which the Analysis Period Definition File 160 may arrive.

FIG. 19-B illustrates a sample record 2003 containing analysis period definition data as it appears in Analysis Period Definition File 160. Note that this record arrives as a fixed length record. In another embodiment this could arrive as a variable length record.

FIG. 19-C illustrates this sample record 2003 formatted into a table for human readability.

FIGS. 20-A-B-C illustrate an exemplary record layout for the Result Demographic Geographic Histogram Definition File 170 formatted for use as input to the Lead In Analytics Engine 200 according to one embodiment.

The Result Demographic Geographic Histogram Definition File 170 is used to create a user defined Histogram of Demographic identifier, Geographic identifier, and Histogram Percentages by which to categorize Result viewing. The histogram value is set based on the aggregate viewing during the lead-in period and then that value is used to assign the set-top box to the appropriate category for result viewing. The user may define one Demographic Group and one Geographic Group with a variety of Histogram viewing buckets, or Several Demographic Groups and one Geographic Group with a variety of Histogram viewing buckets, or one Demographic Group and several Geographic Groups, etc.

The Lead In Analytics Engine 200 presently supports up to 200 combinations of Demographic, Geographic, and Histogram categories. This can be changed as needed.

Note: This is similar to the histogram for Lead In viewing, except that this histogram is applicable only to analyzing Result viewing. Having the ability to create different definitions provides greater flexibility in the analysis.

FIG. 20-A illustrates the file format in which the Result Demographic Geographic Histogram Definition File 170 may arrive.

FIG. 20-B illustrates two sample records 2203 and 2205 containing Result Demographic Geographic Histogram Definition data as it appears in Result Demographic Geographic Histogram Definition File 170. Note that these records arrive as fixed length records. In another embodiment these could arrive as variable length records.

FIG. 20-C illustrates these two sample records 2203 and 2205 formatted into a table for human readability.

FIGS. 21-A-B-C illustrate an exemplary record layout for the Channels To Analyze File 180 formatted for use as input to the Lead In Analytics Engine 200 according to one embodiment.

The Channels To Analyze File 180 provides a list of all the channels on which the Lead In Analytics Engine 200 will run analytics during the Target period (defined in Analysis Period Def) to gather viewing information on those channels. The analyst may define one, several, or many channels as desired.

The Lead In Analytics Engine 200 presently supports up to 200 channels as presently configured, but this may be changed as needed.

FIG. 21-A illustrates the file format in which the Channels To Analyze File 180 may arrive.

FIG. 21-B illustrates two sample records 2403 and 2405 containing channels to analyze data as it appears in Channels To Analyze File 180. Note that these records arrive as fixed length records. In another embodiment these could arrive as variable length records.

FIG. 21-C illustrates these two sample records 2403 and 2405 formatted into a table for human readability.

FIGS. 22-A-B-C illustrate an exemplary record layout for the Tuning Data Dates File 190 formatted for use as input to the Lead In Analytics Engine 200, according to one embodiment.

The Tuning Data Dates File 190 records the date or dates in the tuning data file for which the Lead In Analytics Engine will process the channel tuning data. Only channel tuning data that matches the dates in this file will be processed as part of the analysis study. If the Channel Tuning Data file contains multiples days of data, this allows the analyst to choose the days of interest for the study.

FIG. 22-A illustrates the file format in which the Tuning Data Dates File 190 may arrive.

FIG. 22-B illustrates two sample records 2503 and 2505 containing tuning data dates data as it appears in Tuning Data Dates File 190. Note that these records arrive as fixed length records. In another embodiment these could arrive as variable length records.

FIG. 22-C illustrates these two sample records 2503 and 2505 formatted into a table for human readability.

FIGS. 23-A-B-C illustrate an exemplary record layout for the Analysis Group File 210 which is created as output from the Lead In Analytics Engine 200, according to one embodiment. The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 23-A.

The Analysis Group File 210 records overall information about the Analysis study that was done.

FIG. 23-A illustrates the file format of the Analysis Group File 210. The records may be created as either fixed length or variable length records as needed for downstream processing.

FIG. 23-B illustrates a sample record 3003 containing analysis group data as it may appear in the Analysis Group File 210.

FIG. 23-C illustrates a sample record 3003 formatted into a table for human readability.

FIGS. 24-A-B-C illustrate an exemplary record layout for the Analysis Lead In Period File 220 which is created as output from the Lead In Analytics Engine 200, according to one embodiment. The Analysis Lead In Period File 220 records information about each Lead-in video asset along with the aggregate viewing information for all of the Demographic Geographic Histogram groupings that viewed this Lead In video asset.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 24-A.

FIG. 24-A illustrates the file format of the Analysis Lead In Period File 220.

FIG. 24-B illustrates two sample records 3101 and 3103 containing Analysis Lead In Period data as it may appear in the Analysis Lead In Period File 220. The records may be created as either fixed length or variable length records as needed for downstream processing.

FIG. 24-C illustrates these two sample records 3101 and 3103 formatted into a table for human readability.

FIGS. 25-A-B-C illustrate an exemplary record layout for the Lead In Viewing Result File 230 which is created as output from the Lead In Analytics Engine 200, according to one embodiment.

The Lead In Viewing Result File 230 records statistics about the lead-in viewing broken out by the audience segments defined in the Demographic Geographic Histogram Definition File. Viewing during each Lead-in viewing period is broken out based on the criteria which the analyst defined in the Lead-In Demographic Geographic Histogram Definition File 140. Thus it is evident that the analyst has opportunity to define segmentation criteria that will reveal to him details about which demographic groups viewed each lead-in video, or which geographic groups viewed each lead-in video, or to categorize the viewers by the amount of lead-in viewing by using the histogram groups. Additionally, the analyst can combine any of these criteria to gain still greater insight to the viewers.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 25-A.

FIG. 25-A illustrates the file format of the Lead In Viewing Result File 230.

FIG. 25-B illustrates two sample records 3201 and 3203 containing Lead In Viewing Result data as it may appear in the Lead In Viewing Result File 230. The records may be created as either fixed length or variable length records as needed for downstream processing.

FIG. 25-C illustrates these two sample records 3201 and 3203 formatted into a table for human readability.

FIGS. 26-A-B-C illustrate an exemplary record layout for the Analysis Period Result Header File 240 which is created as output from the Lead In Analytics Engine 200, according to one embodiment. The Analysis Period Result Header File 240 records overall information about the Analysis Period, summary information for the Analysis Results, and a method to link together the various Analysis Result detail records. It also records viewing statistics for the analysis period as a whole.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 26-A.

FIG. 26-A illustrates the file format of the Analysis Period Result Header File 240.

FIG. 26-B illustrates a sample record 3401 containing Analysis Period Result Header data as it may appear in the Analysis Period Result Header File 240. The records may be created as either fixed length or variable length records as needed for downstream processing.

FIG. 26-C illustrates the sample records 3401 formatted into a table for human readability.

FIGS. 27-A-B-C illustrate an exemplary record layout for the Analysis Period Result Detail File 250 which is created as output from the Lead In Analytics Engine 200, according to one embodiment. The Analysis Period Result Detail File 250 records the start and end time of each video segment that was analyzed along with viewing statistics for the individual segment. It also has fields to link to the parent Analysis Period Result Header.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 27-A.

FIG. 27-A illustrates the file format of the Analysis Period Result Detail File 250.

FIG. 27-B illustrates a sample record 3601 containing Analysis Period Result Header data as it may appear in the Analysis Period Result Detail File 250. The records may be created as either fixed length or variable length records as needed for downstream processing.

FIG. 27-C illustrates the sample records 3601 formatted into a table for human readability.

FIGS. 28-A-B-C illustrate an exemplary record layout for the Analysis Period Result Demographic Geographic Histogram Detail File 260 which is created as output from the Lead In Analytics Engine 200, according to one embodiment.

The Analysis Period Result Demographic Geographic Histogram File 260 records for each start and end time of each video segment that was analyzed, the demographic grouping, the geographic grouping, and the histogram definitions along with viewing statistics for that combination within the Analysis Period Result Detail. It also has fields to link to the parent Analysis Period Result Detail.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 28-A.

FIG. 28-A illustrates the file format of the Analysis Period Result Demographic Geographic Histogram Detail File 260.

FIG. 28-B illustrates two sample records 3801 and 3803 containing Analysis Period Result Demographic Geographic Histogram data as it may appear in the Analysis Period Result Demographic Geographic Histogram Detail File 260. The records may be created as either fixed length or variable length records as needed for downstream processing.

FIG. 28-C illustrates the sample records 3801 and 3803 formatted into a table for human readability.

FIGS. 29-A-B-C illustrate an exemplary record layout for the Analysis Period Result Channel Viewing Detail File 270 which is created as output from the Lead In Analytics Engine 200, according to one embodiment.

The Analysis Period Result Channel Viewing Detail File 270 records for each of the start and end times of each video segment that was analyzed with its histogram definitions, each Channel Call Sign that was viewed and the related viewing statistics. It also has fields to link to the parent Analysis Period Result Demographic Geographic Histogram.

The data in this file may be loaded to a data base in support of further analytics. Those with ordinary skill in the art will have no difficulty using common software development tools to develop a process which loads a file like the one shown to a data base or data warehouse in support of additional reporting and analytics. Alternatively, the Lead-In Analytics Engine 200 could update a data base table which has a structure similar to file format shown in FIG. 29-A.

FIG. 29-A illustrates the file format of the Analysis Period Result Channel Viewing Detail File 270.

FIG. 29-B illustrates two sample records 4001 and 4003 containing Analysis Period Result Channel Viewing Detail data as it may appear in the Analysis Period Result Channel Viewing Detail File 270. The records may be created as either fixed length or variable length records as needed for downstream processing.

FIG. 29-C illustrates the sample records 4001 and 4003 formatted into a table for human readability.

FIGS. 30-A-B illustrate an exemplary data structure for storing channel tuning data from the Channel Tune File 110 in the memory of a computer in preparation for analyzing channel tuning activity, according to one embodiment. In addition to storing channel tuning data, the array is also used to store various values that are used by the Lead In Analytics Engine 200. In the accompanying program, this array is named CHAN-VIEWING-DETAIL. FIG. 9 describes the process for loading channel tuning data to this array.

Claims Reference:

In the Claims this CHAN-VIEWING-DETAIL array is referred to as a user activity data structure.

FIG. 30-A illustrates the data structure with its fields.

FIG. 30-B illustrates two sample array rows 4203 and 4205 as they would appear in this data structure, formatted into a table for human readability.

Claims Reference:

By defining a user activity data structure which contains both the identifying fields and the buckets for the second-by-second viewing activity, the Lead-In Analytics Engine 200 is able to correlate the identifying fields with the buckets representing individual seconds of time during a window of time of interest for analysis.

FIG. 31 illustrates an exemplary data structure with its fields for storing the analytic study data that is both used as input to and created as output from this study to track lead-in and result viewing, all by the Lead In Analytics Engine 200, according to one embodiment. In the accompanying program, this array is named LEAD-IN-AND-TARGET-INFO. Numerous other figures explain in detail how the fields in this table are populated.

Claims Reference:

In the Claims this LEAD-IN-AND-TARGET-INFO array is referred to as a Lead-in viewing analysis data structure (for the fields related to lead-in viewing) and Target viewing analysis data structure (for the fields related to Target viewing). Those with ordinary skill in the art will readily recognize that these descriptive names have no bearing on the end result, but they do make it easier to read the specification and accompanying claims.

Also, in the Claims the Demographic-geographic-histogram groupings in the LEAD-IN-AND-TARGET-INFO array are referred to as fields for tracking lead-in video asset viewing by various groupings.

Also, in the Claims the ANALYSIS-PERIOD-DEFINITION fields within the LEAD-IN-AND-TARGET-INFO array are referred to as a target viewing analysis data structure.

Also, in the Claims the ANALYSIS-PERIOD-DEF-ROW fields within the LEAD-IN-AND-TARGET-INFO array are referred to as a user defined target video asset segments.

Also, in the Claims the ANALYSIS-PERIOD-RESULT-ROW fields within the LEAD-IN-AND-TARGET-INFO array are referred to as fields for tracking target video asset segment viewing by demographic geographic histogram groupings.

Also, in the Claims the ANALYS-RESLT-CHANNELS-VIEWED fields within the LEAD-IN-AND-TARGET-INFO array are referred to as fields for tracking target video asset segment viewing by channel within said demographic geographic histogram groupings.

By defining a LEAD-IN-AND-TARGET-INFO array which contains both all of the lead-in fields and all of the target fields, the Lead-In Analytics Engine 200 is able to correlate the lead-in viewing results with the target viewing results for a video asset viewing device.

By defining a LEAD-IN-AND-TARGET-INFO array which contains both all of the lead-in fields and all of the target fields, the Lead-In Analytics Engine 200 is able to correlate the lead-in viewing results with the target viewing results for a computer system accessed through said network.

By defining a LEAD-IN-AND-TARGET-INFO array which contains both all of the lead-in fields and all of the target fields, the Lead-In Analytics Engine 200 is able to correlate the lead-in viewing results with the target viewing results for an operator of a video asset viewing device.

By defining a LEAD-IN-AND-TARGET-INFO array which contains both all of the lead-in fields and all of the target fields, the Lead-In Analytics Engine 200 is able to correlate the lead-in viewing results with the target viewing results for the video asset viewing devices associated with a household.

By defining a LEAD-IN-AND-TARGET-INFO array which contains both all of the lead-in fields and all of the target fields, the Lead-In Analytics Engine 200 is able to correlate the lead-in viewing results with the target viewing results.

Furthermore, by having the lead-in part of the array contain each lead-in period and then having each lead-in period contain the lead-in demographic codes, geographic codes, and histogram bucket definitions, the Lead-In Analytics Engine 200 is able to correlate the lead-in demographic, geographic, and histogram data with the lead-in period.

Furthermore, by having the target part of the array contain the target period and then having the target period contain the target segments and then having each target segment contain the demographic codes, geographic codes, and histogram bucket definitions and then having each of those demographic codes, geographic codes, and histogram bucket definitions contain the channel viewing data, the Lead-In Analytics Engine 200 is able to correlate the target segments with the demographic, geographic, and histogram grouping with the channel viewing data for the target viewing period.

FIG. 32 illustrates an exemplary data structure for the Lead-In Demographic Geographic Histogram Array which is used to store the demographic-geographic-histogram definitions used by the Lead In Analytics Engine 200 for categorizing lead-in viewing. This array records in a table in memory all of the combinations of Demographic code, Geographic code, and Histogram values that the analyst wants to use as he tracks the lead-in viewing. These values are loaded from the values in the input file Lead In Demographic Geographic Histogram Definition File 140 which was described in FIG. 17.

The Lead In Analytics Engine 200 presently supports up to 200 combinations as presently configured, but this may be changed as needed.

In the accompanying program, this array is named LI-DEMO-GEO-HISTG-ARRAY.

FIG. 33 illustrates an exemplary data structure for the Result Demographic Geographic Histogram Array which is used to store the demographic-geographic-histogram definitions used by the Lead In Analytics Engine 200 for categorizing result viewing. This array records in a table in memory all of the combinations of Demographic code, Geographic code, and Histogram values that the analyst wants to use as he tracks the Result viewing. These values are loaded from the values in the input file Result Demographic Geographic Histogram Definition File 170 which was described in FIG. 20.

The Lead In Analytics Engine 200 presently supports up to 200 combinations as presently configured, but this may be changed as needed.

In the accompanying program, this array is named RE-DEMO-GEO-HISTG-ARRAY.

FIG. 34 illustrates an exemplary data structure for the Channels to Analyze Array which is used to store the channels which will be analyzed by the Lead In Analytics Engine 200 as part of this study. This array records in a table in memory all of the channels for which we will track viewing activity during the analysis period. These values are loaded from the values in the input file Channels To Analyze File 180 which was described in FIG. 21.

The Lead In Analytics Engine 200 presently supports up to 300 combinations as presently configured, but this may be changed as needed.

In the accompanying program, this array is named CHANNELS-TO-ANALYZE.

Figure 35:
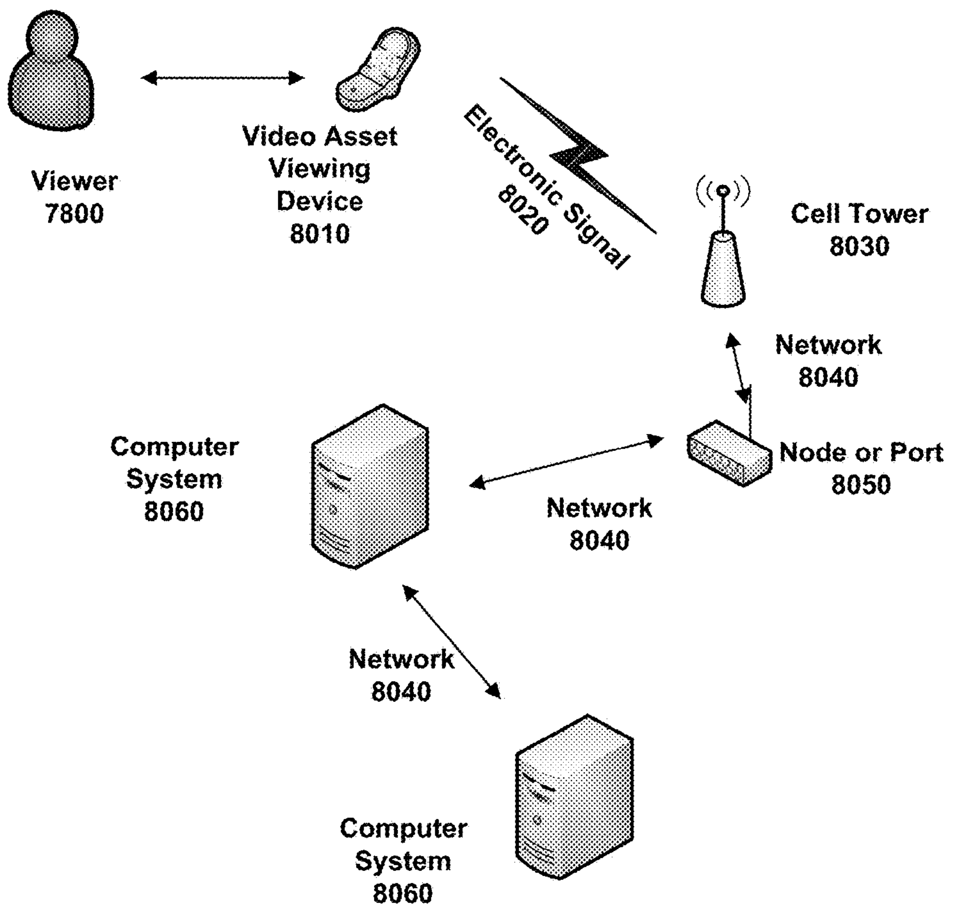
FIG. 35 illustrates a human being interacting with an video asset viewing device which is interacting with a computer system accessed through a network, according to one embodiment.

FIG. 35 illustrates a viewer 7800 interacting with a video asset viewing device 8010 which is interacting with a computer system 8060 accessed through a network 8040, according to one embodiment.

In this nonlimiting example, the purpose is not to describe in detail the operations of a cellular network, but to simply show that the viewer 7800 is interacting with a video asset viewing device 8010 which is interacting with a computer system 8060 accessed through a network 8040.

The video asset viewing device in this example may be a hand-held device which allows the viewer to view video content. A non-limiting example may be a smart phone or an electronic tablet device.

To follow the chain of interactions in this nonlimiting example, the viewer 7800 is using a video asset viewing device 8010 such as a cell phone or a personal communication device or a personal video player or tablet or any similar electronic device. The video asset viewing device 8010 uses a radio wave or electronic signal 8020 to communicate with a cell tower or wireless network 8030 which then communicates via a network 8040 to reach a computer system such as a node or port 8050 which then communicates via a another network segment 8040 to access a computer system 8060 which uses another network segment 8040 to communicate with another computer system 8060 which may feed streaming video to the video asset viewing device 8010.

The video asset viewing device 8010 is then able to capture the Video asset viewing device usage data caused by the viewer 7800 and feed this back to the central collection system which resides on a Computer system 8060.

As described in FIG. 1, that data can then be made available to the Channel Tuning Data Collector 100 for use by the Lead In Analytics Engine 200.

Figure 36:
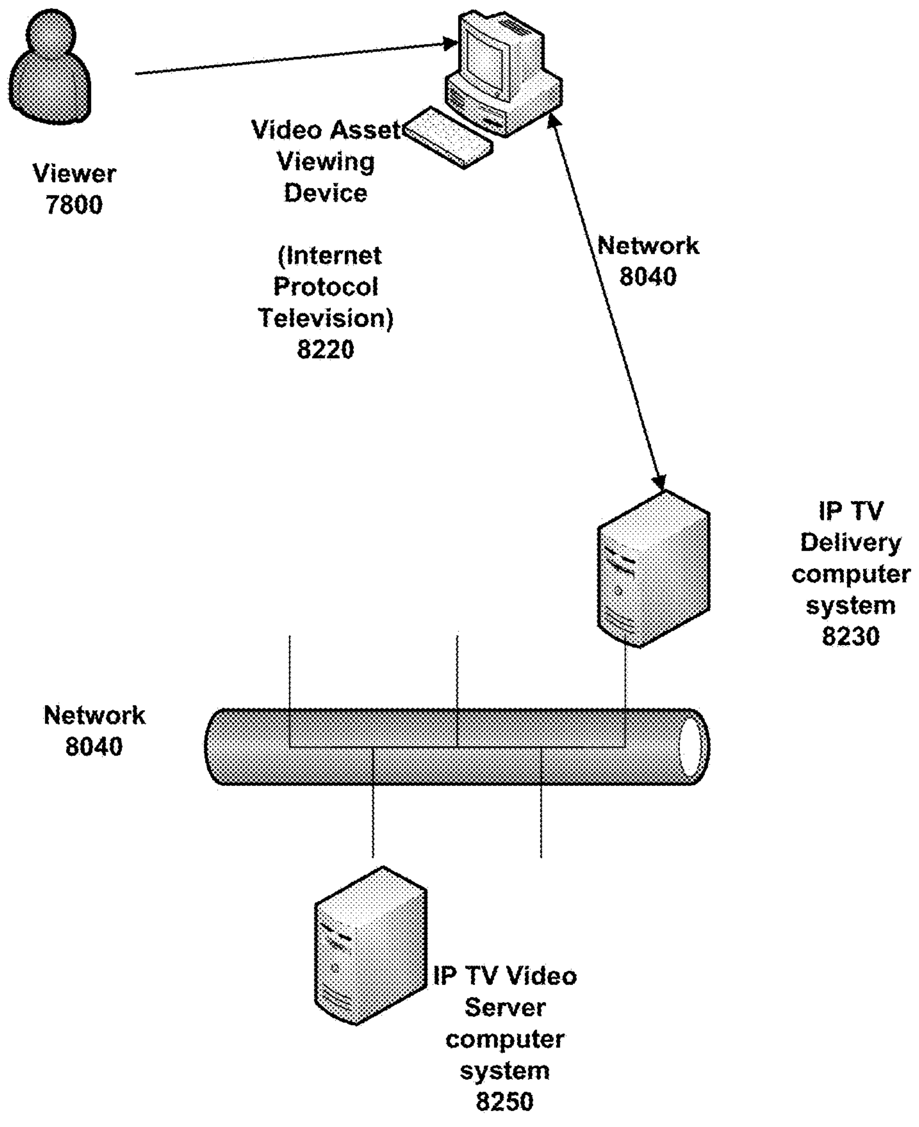
FIG. 36 illustrates an alternative version of a human being interacting with a video asset viewing device which is interacting with a computer system accessed through a network, according to one embodiment.

FIG. 36 illustrates an alternative version of a viewer 7800 interacting with an video asset viewing device device 8220 which is interacting with a computer system 8230 accessed through a network 8040, according to one embodiment.

In this nonlimiting example, the purpose is not to describe in detail the operations of an internet protocol network, but to simply show that the viewer 7800 is interacting with a video asset viewing device which in this example is an Internet Protocol Television device 8220 which is interacting with a computer system 8230 accessed through a network 8040.

To follow the chain of interactions in this nonlimiting example, the viewer 7800 is using a video asset viewing device 8220 such as an internet protocol television or any similar video asset viewing device. The video asset viewing device 8220 uses a wireless or wired network 8040 to communicate with an Internet Protocol (IP) TV Delivery computer system 8230 which provides video to the IP TV. IP TV Delivery computer system 8230 itself also uses a network 8040 to communicate with an IP TV Video Server computer system 8250.

The video asset viewing device 8220 is then able to capture the Video asset viewing device usage data caused by the viewer 7800 and feed this back to the central collection system which resides on an IP TV Delivery computer system 8230.

As described in FIG. 1, that data can then be made available to the Channel Tuning Data Collector 100 for use by the Lead In Analytics Engine 200.

Figure 37:
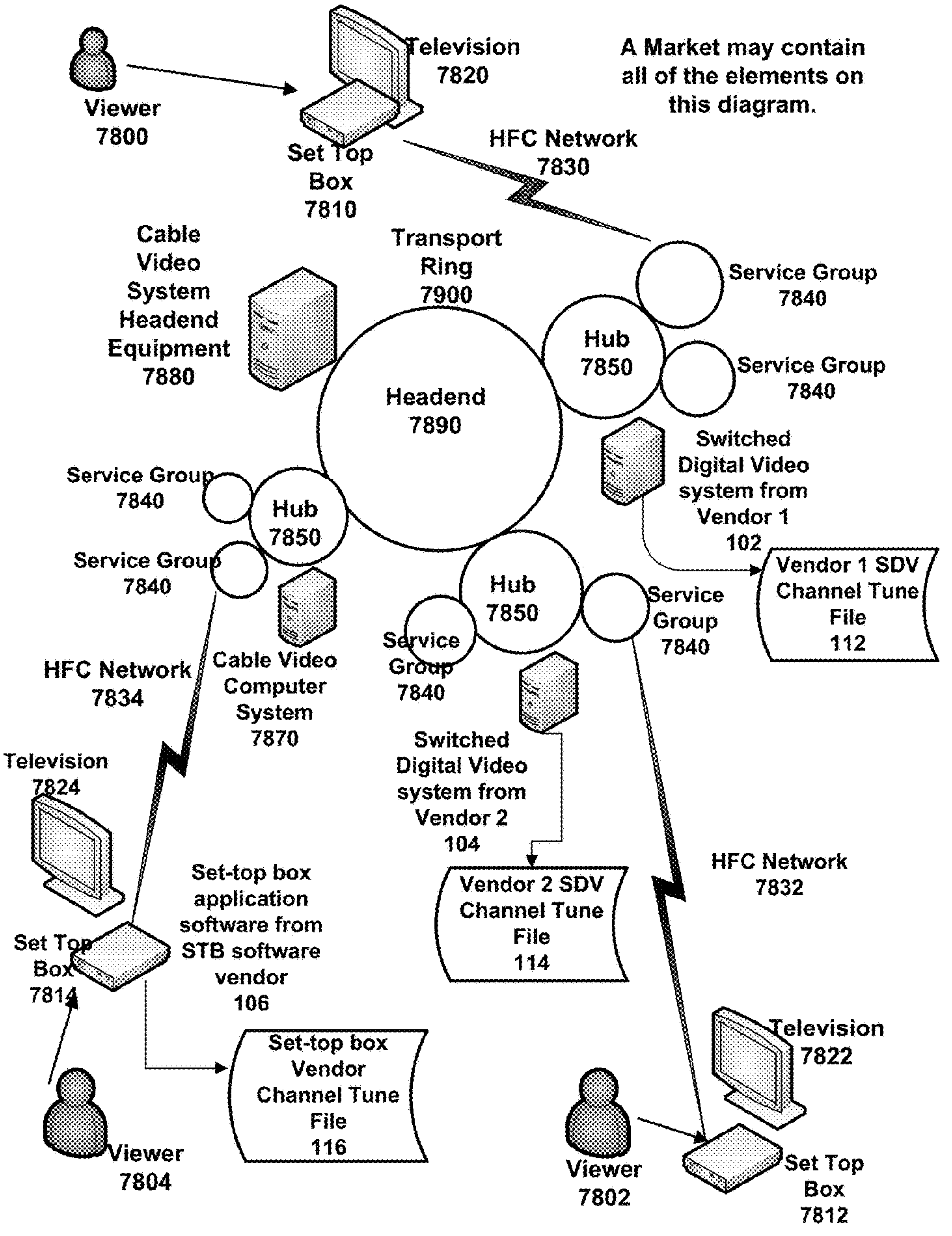
FIG. 37 illustrates various human beings (television viewers) interacting with various set-top boxes which are each interacting with a computer system accessed through a network, according to one embodiment.

FIG. 37 illustrates three different viewers 7800, 7802, 7804 interacting with three different set-top boxes 7810, 7812, 7814 which are each interacting with a computer system 102, 104, 7870 accessed through a network 7830 or 7832 or 7834, according to one embodiment.

In these nonlimiting examples, the purpose is not to describe in detail the operations of a cable television network or a switched digital video system, but to simply show that the viewer 7800 or 7802 or 7804 is interacting with a set-top box 7810 or 7812 or 7814 which is interacting with a computer system 102 or 104 or 7870 accessed through a network 7830 or 7832 or 7834 and that the overall network includes various components such as SDV systems, Cable Video systems, STB systems, Service Groups, Hubs, and Headends which are all part of a Market in a cable television system.

To follow the chain of interactions in this nonlimiting example, in the first Switched Digital Video part of this Figure, the viewer 7800 is using a set-top box 7810 or any similar video asset viewing device attached to a television 7820. The signal produced by the set-top box 7810 is viewed on a television 7820. The set-top box 7810 uses a HFC network segment 7830 to communicate with Switched Digital Video system from Vendor 1 102 which is accessed via a Service Group 7840 and a Hub 7850. The Hub 7850 is linked to a Headend 7890 via a transport ring 7900. Switched Digital Video system from Vendor 1 102 produces the file Vendor 1 SDV Channel Tune File 112 which can then be made available to the Channel Tuning Data Collector 100 for use by the Lead In Analytics Engine 200 (as described in FIG. 1).

To continue following the chain of interactions in this nonlimiting example, in the second Switched Digital Video part of this Figure, the viewer 7802 is using a set-top box 7812 or any similar video asset viewing device attached to a television 7822. The signal produced by the set-top box 7812 is viewed on a television 7822. The set-top box 7812 uses a HFC network segment 7832 to communicate with Switched Digital Video system from Vendor 2 104 which is accessed via a Service Group 7840 and a Hub 7850. The Hub 7850 is linked to a Headend 7890 via a transport ring 7900. Switched Digital Video system from Vendor 2 104 produces the file Vendor 2 SDV Channel Tune File 114 which can then be made available to the Channel Tuning Data Collector 100 for use by the Lead In Analytics Engine 200.

To further continue following the chain of interactions in this nonlimiting example, in the non-Switched Digital Video part of this Figure, a different viewer 7804 is using a different set-top box 7814 or any similar video asset viewing device attached to a television. The signal produced by the set-top box 7814 is viewed on a different television 7824. The set-top box 7814 uses a different HFC network segment 7834 to communicate with a Cable Video Computer System 7870 which is accessed via a Service Group 7840 and a Hub 7850. The Hub 7850 is linked to a Headend 7890 via a transport ring 7900. Set-top box 7814 is running Set-top box application software from STB software vendor 106 and the software is collecting channel tuning data which is used to produce Set-top box Vendor Channel Tune File 116.

The following details are not shown: The Set-top box Vendor Channel Tune File 116 from a plurality of set-top boxes is routed back through the HFC Network 7834 where the files are aggregated and can then be made available to the Channel Tuning Data Collector 100 for use by the Lead In Analytics Engine 200.

To summarize these nonlimiting examples shown in FIG. 37, in two cases the respective viewer is using his set-top box to interact with an SDV Computer system across the network while in another part of the cable company network a third viewer may be using his set-top box to interact with a traditional or non-SDV system. In the SDV cases, the system produces SDV channel change logs; in the non-SDV case, the system produces Set-top box tuning files. In all cases Headend Equipment 7880 at the Headend 7890 receives incoming signals, prepares them, and then transmits video streams downstream to other parts of the network.

As described in FIG. 1, the tuning files can be made available to the Channel Tuning Data Collector 100 for use by the Lead In Analytics Engine 200.

Channel tuning file formats for Switched Digital Video channel tuning data are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Channel tuning file formats for Set-top box channel tuning data are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Figure 38:
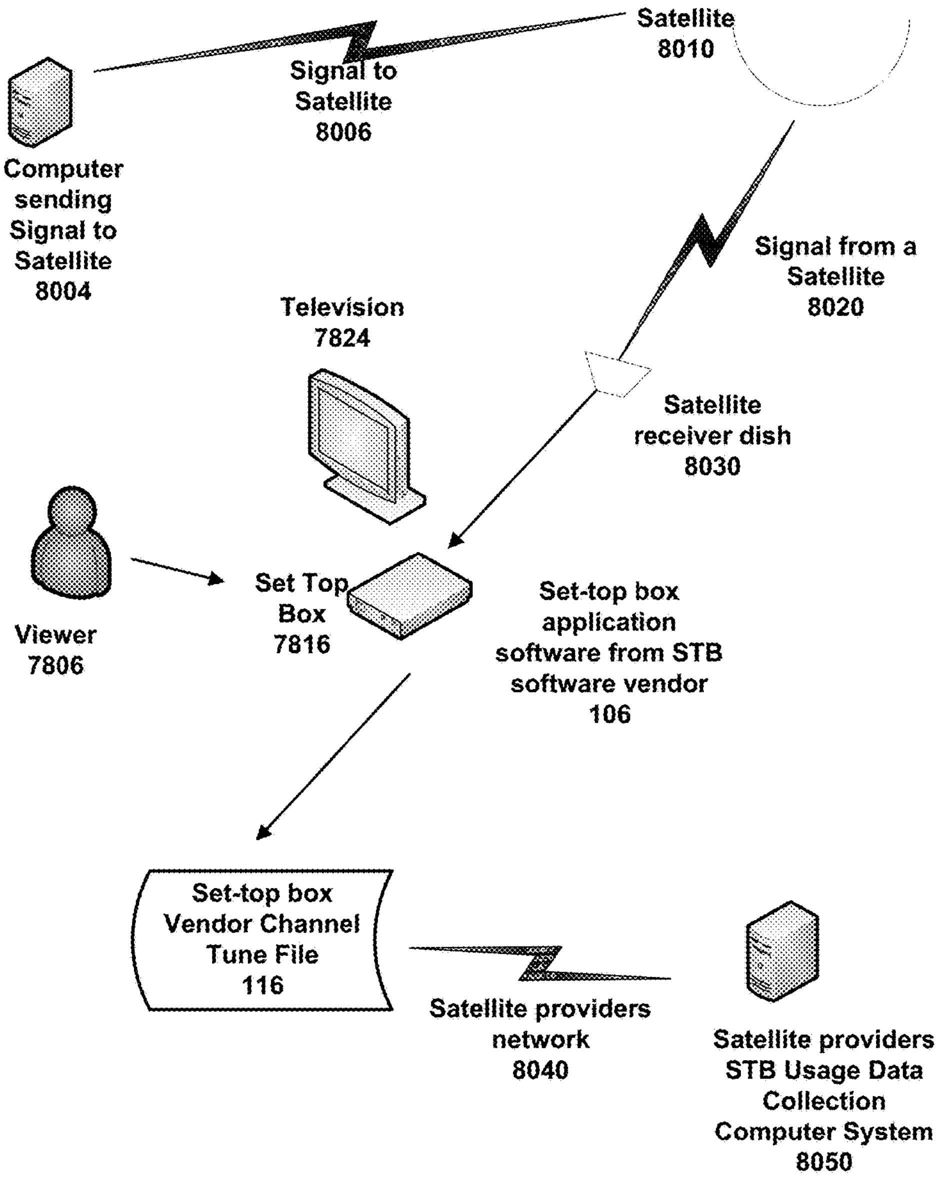
FIG. 38 illustrates a human being interacting with a television system which is part of a satellite television network, according to one embodiment.

FIG. 38 illustrates a viewer 7806 interacting with a set-top box 7816 which is interacting with computer systems 8004 and 8050 accessed through networks 8006 and 8040, according to one embodiment.

In these nonlimiting examples, the purpose is not to describe in detail the operations of a satellite television network, but to simply show that the viewer 7806 is interacting with a set-top box 7816 which is interacting with computer systems 8004 and 8050 accessed through networks 8006 and 8040 and that the overall network includes various components such as a Computer that sends signals to a satellite 8004 and a computer that receives set-top box activity 8050, both being part of a satellite television system.

To follow the chain of interactions in this nonlimiting example, the video or audio signal is sent by the Computer sending Signal to Satellite 8004 as a Signal to Satellite 8006. The Satellite 8010 receives the signal and beams it as a Signal from a Satellite 8020 to the Satellite receiver dish 8030 where it is then passed on to the Set-top box 7816. The viewer 7806 controls the Set-top box 7816 by interacting with it. The set-top box 7816 displays video on the Television 7824. The Set-top box application software from STB software vendor 106 captures the interactions of the viewer 7806 and packages them into a file Set-top box Vendor Channel Tune File 116 or other message which is then sent to the Satellite provider's STB Usage Data Collection Computer System 8050 using or across the Satellite providers network 8040.

As described in FIG. 1, the file of set-top box activity can be made available to the Channel Tuning Data Collector 100 for use by the Lead In Analytics Engine 200.

The Satellite provider's STB Usage Data Collection Computer System 8050 may aggregate Set-top box Vendor Channel Tune File 116 from many individual set-top boxes into one large STB Channel Tuning File. This detail is not shown.

Alternative Embodiments

Note that the specification and drawings use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device. Thus any discussion below that refers to a set-top box should be read to also include any kind of a video asset viewing device.

Although the description above contains much specificity, these should not be construed as limiting the scope of the embodiments but as merely providing illustrations of some of several embodiments. As a nonlimiting example, additional qualifiers may be added along with demographic and geographic codes. Histograms can be created based on quantity of viewing rather than percentage of viewing. Additional calculations can be done once the data is loaded to the various data structures.

Scope of Channel Tuning Data Loaded

I presently contemplate that the Lead-In Analytics Engine 200 will load up to seven days of channel tuning data to the CHAN-VIEWING-DETAIL array (user activity data structure in the claims) including all the seconds of the day for each day. Another embodiment may load only a subset of the daily channel tuning data but perhaps for more days. A non-limiting example of this would be to load viewing seconds for the 6:00 PM to 10:00 PM time slot for 30 days thus supporting longitudinal viewing analysis over a 30 day period.

Tracking Trick Play Activity

I presently contemplate that an additional field or fields may be added to the user activity data structure to allow the measurement of other types of viewing activity in addition to standard play mode. Such a field may be added at the one-second level such that for each second of the day there is a field to indicate play speed and direction. This then could be used in the various algorithms as part of the scoring when counting the number of viewing seconds earned by a video asset.

Tracking Multiple Concurrent Activities

As a second nonlimiting example, viewing activity or device usage data can reflect multiple concurrent activities such as a set-top box using multiple tuners simultaneously as in multiple pictures on a television screen or one picture on the television screen and one video stream being recorded by a digital video recorder. One can readily envision set-top box applications or personal computer applications or advanced television applications which show multiple windows such as a television program, a TV menu, a sports channel, a weather channel, a traffic cam, a twitter ((C) 2010 Twitter, Twitter, Inc.) session, an instant message session, a You Tube ((C) 2010 YouTube, LLC, www.youtube.com) video, an email session, a web browsing session, a Facebook (Facebook (C) 2010, www.facebook.com) session, etc.

Usage data could be collected for each of these activities with perhaps weightings assigned to the activities based on business rules. In this case, one could tally the ad or program viewing time taking into account multiple activities occurring simultaneously and perhaps assigning partial values to those seconds. For example, enable viewing activity to be tracked for multiple, perhaps five, channels for each second of the day. Then if the viewing device has two channels visible at the same time, allocate the viewing based on the percentage of the viewing space attributable to each channel (data source) with perhaps extra credit given to the channel (data source) which is being actively viewed as determined by business rules. Additional business rules can be developed to properly allocate the percentage of viewing activity that should be allocated in other similar circumstances.

As another nonlimiting example, set-top box viewing activity or video asset viewing device usage data can reflect use of trick plays such as fast forwarding through recorded content such as using the DVR to fast forwarding through commercials. In this case one could reduce the amount of viewing earned per second depending on how fast the DVR is moving with perhaps quad-speed earning less viewing credit than half-speed because the viewer will have reduced exposure to the content.

Methods for Receiving Data

I presently contemplate Channel Tuning data data being provided in flat files, but another embodiment may provide this data in any computer readable format including but not limited to data base tables, XML messages, or other messaging constructs. I presently contemplate Channel Tuning data data being being sorted as part of the Tuning Data Collector 100 processing, but another embodiment may sort this data as part of a data base query that is providing the data to the Lead-In Analytics Engine 200.

I presently contemplate Lead-in Video Schedule data data being provided in flat files, but another embodiment may provide this data in any computer readable format including but not limited to data base tables, XML messages, or other messaging constructs.

I presently contemplate Analysis Period Target data data being provided in flat files, but another embodiment may provide this data in any computer readable format including but not limited to data base tables, XML messages, or other messaging constructs.

Identifiers for Data

I presently contemplate using mnemonics for the various identifiers such as market, demographic code, geographic code, channel call sign, analysis group id, lead-in analysis period id, industry program id, industry asset id, and other similar fields, but another embodiment could use numeric values as identifiers with links to reference tables for the descriptions of the numeric identifiers.

I presently contemplate using record identifiers with multipart keys. Another embodiment could provide simple numeric identifiers or other identifiers that accomplish a similar purpose.

Run Size

I presently contemplate processing the data within the context of a Market or a Headend in a service provider's network, but another embodiment could process the data within larger or small groupings, or within any suitable combination of identifiers.

I presently contemplate allowing multiple, up to 100, lead-in viewing periods, but another embodiment may process only one lead-in viewing period per run or even more than 100 lead-in viewing periods per run.

I presently contemplate that the lead-in analysis period is associated with a channel, but another embodiment may associate it with a web address or an IP address.

I presently contemplate allowing multiple, up to 200, demographic-geographic-histogram combinations for each lead-in viewing period, but another embodiment may allow a different number of combinations.

I presently contemplate allowing multiple, up to 60, segments for the analysis periods, but another embodiment may allow a different number of segments.

I presently contemplate allowing multiple, up to 200, demographic-geographic-histogram combinations for each analysis period target segment, but another embodiment may allow a different number of such combinations.

I presently contemplate allowing multiple, up to 300, channels for each demographic-geographic-histogram combination for each analysis period target segment, but another embodiment may allow a different number of channels.

I presently contemplate analyzing channel viewing activity within each demographic-geographic-histogram combination, but another embodiment may analyze web sites or IP addresses.

I presently contemplate executing the algorithms described herein separately in some sequence, but another embodiment could combine multiple simple algorithms into fewer complex algorithms.

I presently contemplate processing up to seven days of channel tuning data at a time, but another embodiment may accept individual channel tuning events in near real time and then process them as they are received. Along with this, such an embodiment could also receive video asset schedule data or targeted content data in like manner so that the channel tuning events could be matched to such data.

I presently contemplate processing up to seven days of channel tuning data at a time, but another embodiment may process more days of data or only a part of a day.

Channel Tuning Data Non-Used Fields

I presently contemplate not using the fields in the Channel Tuning Data file 110 that are identified as "Not presently used"; they are included in FIG. 14 because they are normally available in the Channel Tuning File. Another embodiment may use one or more of these fields to provide a finer level of granularity in the analysis. As non-limiting examples, the BIT-RATE 1170 could be used to run an analysis on only standard definition activity; the HEADEND 1040 could be used to run an analysis on only channel tuning activity associated with that headend.

Receiving Date and Time Information

I presently contemplate that the tune-in date and time and the tune-out date and time will be presented in YYYY-MM-DD HH:MM:SS AM/PM format to the Channel Tuning Data Collector 100 which will then prepare the data for the Lead In Analytics Engine 200. Another embodiment could provide these values in seconds from some historic date such as Epoch time (Jan. 1, 1970) and then subtract the proper number of seconds from the value so as to bring the value into the seconds of the current date. For example, Aug. 1, 2010 at 12:00:00 AM is Epoch time 1280646000. Subtracting this value from any tune-in date and time or tune-out date and time from Aug. 1, 2010, will result in the second of the day that can be used in populating the Viewing Detail Data Structure. A tune-in at Aug. 1, 2010 at 12:30:00 AM has Epoch time of 1280647800. Thus we see that 1280647800−1280646000=1800 seconds which would be 30 minutes after midnight. Either embodiment can be used as input to create the metrics.

I presently contemplate that the Channel Tuning Data Collector 100 function will be provided with the tune-in date and time and the tune-out date and time presented in YYYY-MM-DD HH:MM:SS AM/PM format. Another embodiment could provide the tune-in date and time in this format and then provide the duration of the tuning activity in seconds instead of providing the tune-out date and time presented in YYYY-MM-DD HH:MM:SS AM/PM format. In this situation the Channel Tuning Data Collector 100 function would add the tuning duration in seconds to the tune-in time in seconds to arrive at the tune-out time.

I presently contemplate that the Channel Tuning Data Collector 100 function will be provided with the tune-in date and time and the tune-out date and time presented in YYYY-MM-DD HH:MM:SS AM/PM format. Another embodiment could provide the tune-out date and time in this format and then provide the duration of the tuning activity in seconds instead of providing the tune-in date and time presented in YYYY-MM-DD HH:MM:SS AM/PM format. In this situation the Channel Tuning Data Collector 100 function would subtract the tuning duration in seconds from the tune-out time in seconds to arrive at the tune-in time.

I presently contemplate that the Analysis Group Info File 120 will be provided as a flat file in the format shown. Another embodiment could provide similar information as the result of a data base query or other method.

I presently contemplate that the Lead In Video Play Info File 130 will be provided as a flat file in the format shown. Another embodiment could provide similar information as the result of a data base query or other method.

I presently contemplate that the Lead In Demographic Geographic Histogram Definition File 140 will be provided as a flat file in the format shown. Another embodiment could provide similar information as the result of a data base query or other method.

I presently contemplate that the Analysis Period Target File 150 will be provided as a flat file in the format shown. Another embodiment could provide similar information as the result of a data base query or other method.

I presently contemplate that the Analysis Period Definition File 160 will be provided as a flat file in the format shown. Another embodiment could provide similar information as the result of a data base query or other method.

I presently contemplate that the Result Demographic Geographic Histogram Definition File 170 will be provided as a flat file in the format shown. Another embodiment could provide similar information as the result of a data base query or other method.

I presently contemplate that the Channels to Analyze File 180 will be provided as a flat file in the format shown. Another embodiment could provide similar information as the result of a data base query or other method. Yet another embodiment may discover the channels to analyze as they appear in the channel tuning data.

I presently contemplate that the Tuning Data Dates File 190 will be provided as a flat file in the format shown. Another embodiment could provide similar information as the result of a data base query or other method. Yet another embodiment may discover the tuning data dates as they appear in the channel tuning data.

I presently contemplate that the data which is written to the Analysis Group File 210 will be written as a flat file. Another embodiment could insert to or update a data base table to record this information.

I presently contemplate that the data which is written to the Analysis Lead In Period File 220 will be written as a flat file. Another embodiment could insert to or update a data base table to record this information.

I presently contemplate that the data which is written to the Lead In Viewing Result File 230 will be written as a flat file. Another embodiment could insert to or update a data base table to record this information.

I presently contemplate that the data which is written to the Analysis Period Result Header File 240 will be written as a flat file. Another embodiment could insert to or update a data base table to record this information.

I presently contemplate that the data which is written to the Analysis Period Result Detail File 250 will be written as a flat file. Another embodiment could insert to or update a data base table to record this information.

I presently contemplate that the data which is written to the Analysis Period Result Demographic Geographic Histogram Detail File 260 will be written as a flat file. Another embodiment could insert to or update a data base table to record this information.

I presently contemplate that the data which is written to the Analysis Period Result Channel Viewing Detail File 270 will be written as a flat file. Another embodiment could insert to or update a data base table to record this information.

I presently contemplate receiving all of the date and time values in local time, but another embodiment may provide these in Coordinated Universal Time (UTC time).

Data Correlations

I presently contemplate that the Analysis Group will contain a common key (Analysis Group Id) that serves as the identifier of an entire study thus linking the lead-in parts of the study with the result (target) parts of the study. Another embodiment could provide a similar study identifier using some other method.

Yet another embodiment may provide this data in data base tables where a SQL query links the values together using a common key. Yet another embodiment may use multiple data base tables to store this information in a highly normalized format and link the various tables together using keys.

Thus we see that data correlations can be accomplished in various ways within the spirit and scope of this embodiment.

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond. Yet another embodiment may receive data at a granularity finer than one second and round to the nearest second for use by the Lead-In Analytics Engine 200.

I presently contemplate using data structures similar to those defined herein, but another embodiment may use a different data structure or data structures to accomplish a similar result.

I presently contemplate using a LEAD-IN-AND-TARGET-INFO array structure similar to that defined herein, but another embodiment may use a different data structure(s) to accomplish a similar result. As a nonlimiting example, the LEAD-IN-AND-TARGET-INFO array structure could be stored in a relational data base table or tables or similar structure and still accomplish a similar result.

Implementation Information

I presently contemplate using the WINDOWS 7 Professional operating system from MICROSOFT Corporation, but another embodiment may use a different operating system.

I presently contemplate using FUJITSU® NetCOBOL® for WINDOWS® version 10.1 developed by FUJITSU® and distributed by Alchemy Solutions Inc, but another embodiment may use a different programming language or a different version of COBOL.

General Remarks

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, C, C#, or C++ using, for example, conventional or object-oriented techniques. Such software may be stored on any type of suitable computer-readable medium or media such as, for example, a magnetic or optical storage medium. Thus, the operation and behavior of the embodiments are described in COBOL style pseudocode purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, a compact disk, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, memory sticks, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

While I have developed this embodiment on a personal computer, it can be appreciated that the "data analysis computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means or method for storing software, including a hard disk, an optical disk, floppy disk, ROM (read only memory), RAM (random access memory), PROM (programmable ROM), EEPROM (electrically erasable PROM), and other computer-readable media.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

Conclusions, Ramifications, and Scope

From the description above, a number of advantages of some embodiments of my Lead-In Analytics Engine 200 and its supporting processes become evident:

By having the Lead-In Analytics Engine 200 load (a) the video asset viewing device identifier, and (b) channel viewing activity identifying the channel viewed by that video asset viewing device for every second of the day for multiple days, this produces the result that the Lead-In Analytics Engine 200 can produce longitudinal metrics that were not previously possible.

By having the Lead-In Analytics Engine 200 load (a) the video asset viewing device identifier, (b) a Demographic identifier, and (c) channel viewing activity identifying the channel viewed by that video asset viewing device for every second of the day for multiple days, this produces the result that the Lead-In Analytics Engine 200 can produce longitudinal metrics at a demographic level that were not previously possible.

By having the Lead-In Analytics Engine 200 load (a) the video asset viewing device identifier, (b) a Geographic identifier, and (c) channel viewing activity identifying the channel viewed by that video asset viewing device for every second of the day for multiple days, this produces the result that the Lead-In Analytics Engine 200 can produce longitudinal metrics at a geographic level that were not previously possible.

This method of tracking viewing activity on a second-by-second basis is contrary to the teaching of those who work with start time and duration (seconds viewed) in a relational data base model. Thus I am able to solve problems previously found insolvable when limited to using the existing techniques. I am able to provide metrics that could not be produced using existing techniques.

In regard to video asset viewing on all manner of devices, I have provided numerous metrics showing a level of detailed analytics not previously possible. For example, the Lead-In Analytics Engine 200 allows me to measure viewing of ads and/or programs during a Lead-in period down to a granularity of one-second for both lightly viewed channels and more heavily viewed channels; traditional survey methods do not allow this. The Lead-In Analytics Engine 200 allows me to provide deeper insight into viewership of highly viewed channels. The Lead-In Analytics Engine 200 is able to provide the detailed information that industry researchers urgently need. There are many other examples contained herein.

I will now provide an in-depth discussion of the various advantages.

Lead In Content Viewership Analysis

The Lead-In Analytics Engine 200 has the advantage of allowing me to produce detailed metrics on the actual viewing of content during one or more lead-in periods. These metrics can provide insight into the demographic and geographic information about the viewers of the lead-in content. By measuring at the one second level the Lead-In Analytics Engine 200 is able to provide the data needed to compare the effectiveness of the various Lead-In content. For example, if the same lead-in asset on one channel earns a lower relative quantity of viewing seconds than that asset when aired on another channel, this indicates that the viewers on the second channel often tune away when the ad appears. These metrics can also provide insight into viewing patterns and human behavior.

These metrics are applicable to each individual airing of a lead-in video asset as described in the Lead In Video Asset Schedule. Thus if a lead-in video asset airs multiple times in one day, such as a commercial often does, the Lead-In Analytics Engine 200 produces metrics for each airing.

The Lead-In Analytics Engine 200 produces the following metrics for each unique airing of each lead-in video asset (i.e. the lead-in content):

- Set Top Box count which measures the aggregate number of set-top boxes (video asset viewing devices) that were tuned to at least some part of the lead-in asset. If the Lead-in is an advertisement, this provides a measure of how many viewers viewed at least some part of the ad. If the Lead-in is a program, this provides a measure of how many viewers viewed at least some part of the program.
- Aggregate Viewing Seconds count which measures the aggregate number of viewing seconds for those set-top boxes (video asset viewing devices) that were tuned to the lead-in asset. From an advertiser's perspective, this measures the amount of viewing that the ad earned. From a programmer's perspective, this measures the amount of viewing that the program earned.
- Exposures count which measures the aggregate number of set-top boxes (video asset viewing devices) that were tuned for at least the required number of seconds to be counted as an exposure to the lead-in asset. For example, a viewing instance may count as an exposure only when the set-top box (video asset viewing device) was tuned to the lead-in for at least 20 seconds. From an advertiser's perspective, this measures useful exposures to the ad. If the lead-in is a program, then the exposure could be increased to perhaps 300 seconds before it is counted as an exposure.
- Set Top Boxes Tuned in at the beginning of the lead-in period count which measures the number of video asset viewing devices that were tuned in at the start of the lead-in period. This can be used to measure size of viewing audience at the start of the lead-in period to then compare it with viewing audience at the end of the lead-in period.
- Set Top Boxes Tuned in at the end of the lead-in period count which measures the number of video asset viewing devices that were tuned in at the end of the lead-in period. This can be used to measure size of viewing audience at the end of the lead-in period to then compare it with viewing audience at the start of the lead-in period.
- Set Top Boxes Tuned in for all of the lead-in period count which measures the number of video asset viewing devices that were tuned in for the entire lead-in period. This can be used to measure size of viewing audience that viewed the entire lead-in period.

In addition, the Lead-In Analytics Engine 200 provides a finer granularity of break-out for the lead-in viewing by producing the following metrics for each unique airing of each lead-in video asset for each combination of Demographic-Geographic-Histogram index:

- Set Top Box count which measures the aggregate number of set-top boxes (video asset viewing devices) identified by this combination of Demographic-Geographic-Histogram index identifier that were tuned to at least some part of the lead-in asset. If the Lead-in is an advertisement, this provides a measure of how many viewers having this Demographic-Geographic code combination viewed the required percentage of the ad to fit into the indicated Histogram bucket. If the Lead-in is a program, this provides a measure of how many viewers having this Demographic-Geographic code combination viewed the required percentage of the program to fit into the indicated Histogram bucket.
- Aggregate Viewing Seconds count which measures the aggregate number of viewing seconds for those set-top boxes (video asset viewing devices) that were tuned to the lead-in asset and were identified by this combination of Demographic-Geographic-Histogram index identifier. If the Lead-in is an advertisement, this provides a measure the aggregate viewing seconds of the viewers having this Demographic-Geographic code combination that viewed the required percentage of the ad to fit into the indicated Histogram bucket. If the Lead-in is a program, this provides a measure the aggregate viewing seconds of the viewers having this Demographic-Geographic code combination that viewed the required percentage of the program to fit into the indicated Histogram bucket.

Exposures count which measures the aggregate number of set-top boxes (video asset viewing devices) identified by this combination of Demographic-Geographic-Histogram index identifier that were tuned to at least the required number of seconds to be counted as an exposure to the lead-in asset. If the Lead-in is an advertisement, this provides a measure of how many viewers having this Demographic-Geographic code combination and who met the minimum viewing threshold then viewed the required percentage of the ad to fit into the indicated Histogram bucket. From an advertiser's perspective, this measures useful exposures to the ad by this Demographic-Geographic group. If the Lead-in is a program, this provides a measure of how many viewers having this Demographic-Geographic code combination and who met the minimum viewing threshold then viewed the required percentage of the program to fit into the indicated Histogram bucket. From a programmer's perspective, this measures how many people saw at least a given amount of a program.

Set Top Boxes Tuned in at the beginning of the lead-in period count which measures the number of video asset viewing devices identified by this combination of Demographic-Geographic-Histogram index identifier that were tuned in at the start of the lead-in period. This can be used to measure size of viewing audience at the start of the lead-in period to then compare it with viewing audience at the end of the lead-in period.

Set Top Boxes Tuned in at the end of the lead-in period count which measures the number of video asset viewing devices identified by this combination of Demographic-Geographic-Histogram index identifier that were tuned in at the end of the lead-in period. This can be used to measure size of viewing audience at the end of the lead-in period to then compare it with viewing audience at the start of the lead-in period.

Set Top Boxes Tuned in for all of the lead-in period count which measures the number of video asset viewing devices identified by this combination of Demographic-Geographic-Histogram index identifier that were tuned in for the entire lead-in period. This can be used to measure size of viewing audience that viewed the entire lead-in period.

Advertising Placement

The Lead-In Analytics Engine 200 has the advantage of allowing advertisers to identify optimal times during which to place various ads. As a nonlimiting example, in general, once we are able to determine how much of the advertisement was viewed by each set-top box within the viewing group to which the advertisement was presented, advertisers can determine where to place ads. More specifically, by defining lead-in periods that identify the times when various ads aired, the Lead-In Analytics Engine 200 allows us to measure actual viewing seconds of each ad when it plays. This data can be used as input to actual ad placement. As nonlimiting examples, an advertiser could:

1. Identify whether a particular ad earns more viewing seconds when played during the morning news or the evening news. Such information would also be useful in negotiating advertising rates. Example: Does the same car commercial earn more viewing seconds during the morning news or the evening news?
2. Identify whether a particular ad earns more viewing seconds when played during a movie or a football game. Such information would be useful in choosing the program type in which to advertise. Example: Does the same toothpaste commercial earn more viewing seconds during a movie or a football game?
3. Identify what type of product is likely to earn the most viewing seconds during a particular type of program. Example: Does the car commercial or the toothpaste commercial earn more viewing seconds during the movie?

Such metrics would be very helpful to advertisers in identifying the most suitable programs in which to run various ads. Also, beyond simply identifying viewing time, the Lead-In Analytics Engine 200 allows the analyst to identify which demographic group viewed each ad along with the geographic area in which the viewing took place.

Advertising Cost Based on Viewership of Ad

The Lead-In Analytics Engine 200 has the advantage of allowing us to support charging for advertising based on actual viewership metrics. The Lead-In Analytics Engine 200 is able to measure the actual viewing seconds of whatever video asset is defined by the Lead-in analysis period. When this defines the time when an advertisement was run, then we are able to determine how much of the advertisement was viewed by each set-top box (video asset viewing device) represented in the channel tuning data. We are able to further break this out by demographic and geographic identifiers. Thus, as a non-limiting example, the Lead-In Analytics Engine 200 will calculate the aggregate viewing seconds of all the set-top boxes (video asset viewing devices) in the channel tuning file for each combination of demographic and geographic code that the analyst has defined in the job input. This data can be used as input to pricing of advertising based on actual viewing seconds for each demographic-geographic group.

As nonlimiting examples, a cable television provider or programming network could:

1. Charge the advertiser based on actual viewing seconds earned by the ad. Example: The base rate to run the advertisement on channel x during the 5:00 pm hour on Monday is amount $y; if the ad earns more than 500,000 viewing seconds, the advertiser is billed a premium of z cents per additional 10,000 viewing seconds.
2. Credit the advertiser based on actual viewing seconds earned by the ad. Example: The base rate to run the advertisement on channel x during the 5:00 pm hour on Monday is amount $y; if the ad earns less than 400,000 viewing seconds, the advertiser is given a credit of z cents for each 10,000 viewing seconds short of 400,000.
3. Charge the advertiser based on actual viewing seconds earned by the ad for a target demographic group. Example: The ad is targeted to the demographic group of families with children and the base rate to run the advertisement on channel x during the 5:00 pm hour on Monday is amount $y; if the ad earns more than 500,000 viewing seconds for the demographic identifier of families with children, the advertiser is billed a premium of z cents per additional 10,000 viewing seconds.
4. Credit the advertiser based on actual viewing seconds earned by the ad for the target demographic group. Example: The base rate to run the advertisement on channel x during the 5:00 pm hour on Monday is amount $y; if the ad earns less than 400,000 viewing seconds by the target demographic group, the advertiser is given a credit of z cents for each 10,000 viewing seconds by that demographic group short of 400,000.

Such metrics would be very helpful to advertisers in knowing how to allocate their advertising dollars.

Advertising Agency Grading

The Lead-In Analytics Engine 200 has the advantage of allowing us to produce metrics needed to grade or measure the effectiveness of the advertising agency. When the lead-in is period defines an advertisement, the Lead-In Analytics Engine 200 allows us to measure (a) set-top boxes (video asset viewing devices) tuned at the start of the lead-in period, (b) set-top boxes tuned at the end of the lead-in period, (c) actual aggregate viewing seconds for the entire lead-in period, (d) impressions greater than a minimum number of seconds during the lead-in period, and (e) how many set-top boxes were tuned for the entire lead-in period. This data can be used as input to valuing the services of the advertising agency allowing us to reward or penalize the advertising agency based on the ability of their ad to retain viewers.

As nonlimiting examples, a company whose product is being advertised could:

1. Reward the advertising agency based on the number of set-top boxes (video asset viewing devices) that remain tuned for the entire duration of the ad. Example: If at the point in time when the advertisement begins to play there are x (150) set-top boxes viewing the ad, and the number of set-top boxes that continue to view the ad until the end of the ad is y (120), then for each percentage point of set-top boxes above base threshold a % (75%) that view the ad to the end, reward the advertising agency a bonus of $z ($1.05) per set-top box that views the ad to the end. In this case, 75% of 150 is 112.5; since 120 were viewing at the end of the ad, the reward is [(120−112)*$1.05=$8.40).
2. Penalize the advertising agency based on the number of set-top boxes that tune away from the ad. Example: If at the point in time when the advertisement begins to play there are x (150) set-top boxes viewing the ad and the drop off rate by the end of the advertisement is more than y % (30%), then for each percentage of drop off below base threshold of y % (30%) penalize the advertising agency a fee of $z ($0.90) per set-top box that drops off above the 30% threshold. In this case, 150*(1−0.30)=105 is the minimum STB's tuned in at the end to avoid penalty; assume there were 88 set-top boxes at the end of the ad, the penalty would be 105−88=17*$0.90=$15.30.

Similar metrics could be developed based on aggregate viewing seconds or impressions.

Demographics Analysis

The Lead-In Analytics Engine 200 is able to merge demographic data with detailed viewing patterns. As the Lead-In Analytics Engine 200 analyzes the channel tuning data, it is able to group the viewers into buckets based on the demographic code associated with the set-top box. This allows us to collect detailed viewing patterns for each demographic group. This allows much deeper levels of analysis.

By combining the viewing data with demographic data, additional information can be determined.

As a nonlimiting example, where the lead-in period defines an advertisement, compare viewing behavior of the lead-in period based on demographic group to identify the group from which the ad earned more viewing seconds. Examples:

a. Did the clothing ad earn more viewing seconds with the white viewers or the Hispanic viewers?
b. Did the jewelry ad earn more viewing seconds with the male viewers or the female viewers?
c. Did the fast food ad earn more viewing seconds with the teen viewers or the adult viewers?
d. Did the fast food ad earn more viewing seconds with the low income viewers or the middle income viewers?
e. Did the car rental ad earn more viewing seconds with the single viewers or the married viewers?

Geographic Analysis

The Lead-In Analytics Engine 200 is able to merge geographic data with detailed viewing patterns. As the Lead-In Analytics Engine 200 analyzes the channel tuning data, it is able to group the viewers into buckets based on the geographic code associated with the set-top box (video asset viewing device). This allows us to collect detailed viewing patterns for each geographic group. This allows much deeper levels of analysis.

By combining the viewing data with geographic data, additional information can be determined.

As a nonlimiting example, where the lead-in period defines an advertisement, compare viewing behavior of the lead-in period based on geographic group to identify the group from which the ad earned more viewing seconds. Examples:

a. Did the clothing ad earn more viewing seconds with the viewers in ad zone x or ad zone y?
b. Did the jewelry ad earn more viewing seconds with the viewers in zip code x or zip code y?
c. Did the golf ad earn more viewing seconds with the viewers in census tract x or census tract y?

Combination Demographics and Geographic Analysis

Besides these examples, numerous additional examples can be readily imagined simply by combining the demographic and geographic attributes. As nonlimiting examples, one could combine:

a. Demographic and geographic identifiers to determine whether a lead-in period that defines an advertisement earns more viewing seconds with white males in zip code x or zip code y.
b. Demographic and geographic identifiers to determine whether a lead-in period that defines an advertisement earns more viewing seconds with families with children or retirees in zip code x.

A person skilled in data analysis could readily envision numerous other combinations for investigation.

Benefits for Content Providers

While much of the prior discussion of benefits focused on lead-in segments that defined advertisements, the lead-in period could also identify viewing results for any other video asset such as a news cast, a movie, a pilot program, a sports event, or a regularly scheduled program.

As nonlimiting examples, consider:

1. The content provider has been asked to carry a new program and the analyst desires to get accurate audience measurements. The analyst could define multiple lead-in viewing segments and measure viewership during each lead-in segment. The lead-in segments could be five minutes, ten minutes, fifteen minutes, or the entire hour. The analyst could even run the tuning data through the system with fifteen minute segments and then rerun it with 1 minute segments if desired. The Lead-In Analytics Engine 200 allows us to measure (a) set-top boxes tuned at the start of the lead-in period, (b) set-top boxes tuned at the end of the lead-in period, (c) actual aggregate viewing seconds for the entire lead-in period, (d) impressions greater than a minimum number of seconds during the lead-in period, and (e) how many set-top boxes were tuned for the entire lead-in period. Such metrics could be very useful to a content provider seeking to understand audience behavior.

2. The content provider needs exact viewership metrics to assist in negotiating rates to charge a studio (producer) for carrying a program. This may happen in the case of a low viewership program. The Lead-In Analytics Engine 200 allows the analyst to define a lead-in period of the entire program to measure aggregate viewing seconds for the program.
3. The content provider needs exact viewership metrics to assist in negotiating rates which will be paid by the content provider to the studio (producer) to carry a program. This may happen in the case of a high viewership program. The Lead-In Analytics Engine 200 allows the analyst to define a lead-in period of the entire program to measure aggregate viewing seconds for the program.
4. The content provider needs to know whether a certain video asset earns more viewing minutes during the day or the evening. The Lead-In Analytics Engine 200 allows the analyst to define a lead-in period for the morning show and for the evening show and measure aggregate viewing seconds for each showing.
5. The content provider needs to understand the demographics of the viewing audience for a program. The Lead-In Analytics Engine 200 allows the analyst to define a lead-in period that covers the program of interest and also to define multiple demographic groups and then to measure viewing by each group for that program.
6. The content provider needs accurate audience measurements to assist in negotiating advertising rates for the ads that play during a specific program. The Lead-In Analytics Engine 200 allows the analyst to define multiple lead-in segments and then measure viewing during each segment. These detailed audience measurements can be used to set advertising rates.
7. The content provider needs to know whether a certain video asset earns any viewing minutes. This is instrumental in developing programming schedules. This is very important in managing lightly viewed channels. By defining a lead-in segment for that program, the analyst can use the Lead-In Analytics Engine 200 to measure program viewership.
8. The content provider needs to provide detailed audience measurements for the morning news compared to the evening news. The Lead-In Analytics Engine 200 allows the analyst to define one lead-in segments for the morning news and one for the evening news and then measure viewing during each segment.
9. The content provider needs to provide detailed audience measurements for the local evening news compared to the national evening news. The Lead-In Analytics Engine 200 allows the analyst to define one lead-in segment for the local news and one for the national news and then measure viewing during each segment.

In each of the cases, the Lead-In Analytics Engine 200 produces the metrics needed to answer the question.

Lead-in to Target Viewing Analysis

The Lead-In Analytics Engine 200 also allows the analyst to measure longitudinal viewing behavior. In this case, the lead-in segment defines one or more viewing segments that precede the target segment. The analyst is interested in answering questions such as:

1. If the set-top box (video asset viewing device) is tuned to channel x during a first period of time, does the set-top box stayed tuned to the same channel during a subsequent period of time?
2. Do promotions of an upcoming show increase viewership of that show?

Longitudinal Viewing Analysis

Using Longitudinal Viewing Analysis the analyst can use the Lead-In Analytics Engine 200 to determine viewing habits across a period of time. For example, if a viewer views the 7 PM show, do they also view the 8 PM show. Or, if the viewer views the 6:00 PM news, do they stayed tuned for the next show in the schedule. In this case, the lead-in segment is defined as the 6:00 PM news. The analyst may define one lead-in period for the entire news cast, or multiple lead-in periods. The Lead-In Analytics Engine 200 will measure viewership for each lead-in segment. Then the analyst also defines a target period for analysis. In this example, the target period is the next show. The analyst can define one or many viewing segments for the target show. The Lead-In Analytics Engine 200 will measure viewership for each target segment. Additionally, it will group the viewership into buckets based on how much of the aggregate lead-in viewing the set-top box tuned to. This allows the engine to categorize the viewers based on how much of the lead-in they tuned to.

By grouping target viewers based on how much of the lead-in they tuned to, the Lead-In Analytics Engine 200 is able to differentiate viewers based on viewing during the lead-in period. It can compare target viewing for those who tuned to a small part of the lead-in video with those who tuned to a large part of the lead-in video. This then indicates whether or not the lead-in viewing was effective in drawing various demographic groups to view the target program.

In addition to measuring whether or not the set-top box viewed the target program, the Lead-In Analytics Engine 200 also measures any other viewing by that set-top box. Thus the analyst is able to determine what the viewer watched instead of the target program. This also is done in the context of demographic and geographic identifiers.

Promotional Viewing Analysis

Promotional Viewing Analysis may be used when a content provider want to measure the effectiveness of ads promoting an upcoming program. Each ad promoting the program is treated as a lead-in segment. The promoted program is the target. The Lead-In Analytics Engine 200 then measures viewing for each such lead-in segment on a set-top by set-top basis and for all of the lead-in segments in aggregate for that set-top box. The Engine then measures viewership of the target segment by that set-top box. For Target viewership measurement, the set-top boxes are grouped into histogram groups to identify what part of the total lead-in video the set-top box tuned to. This grouping enables the analyst to compare like to like target viewing. The Lead-In Analytics Engine 200 compares target viewing by set-top boxes that saw perhaps 1 to 10% of the lead-in viewing to determine what percentage of the target they saw.

If a demographic group saw comparatively little of the lead-in video but watched a great deal of the target video, then we could assume that either the lead-in video had very little effect on the customer's viewing choice or that a very small exposure was all that was needed to generate interest in viewing the target program. In either case, the analyst has learned that there is no need to promote that target program very heavily to that demographic.

On the other hand, if a demographic group viewed very little of the target program after heavy exposure to the lead-in video (ads) promoting it, then the analyst has learned that promoting that program to that demographic is wasteful since they are not interested in viewing it. Additionally, the Lead-In Analytics Engine 200 measures what the viewer watched instead thus allowing the analyst to gain additional insight into the customer behavior.

Subsequent Usage of the Metrics

The metrics produced by the Lead-In Analytics Engine 200 readily lend themselves to dimensional analysis using contemporary data warehouse methods. A Fact table in such an application may contain viewing data for an ad or a program. Multiple Dimension tables can readily be envisioned by those skilled in the art. As non-limiting examples, various values including demographic group, geographic group, industry asset id, industry program id, etc. could be Dimensions. Additionally, other attributes regarding the program content could be included in such an analysis by using the industry program id to join to other reference data that may be available to the analyst.

The metrics produced by the Lead-In Analytics Engine 200 can be loaded to a data warehouse to support additional longitudinal analysis beyond what is done by the Engine. Thus we can readily envision a myriad of uses for the metrics produced by the Lead-In Analytics Engine 200.

Several nonlimiting examples will be reviewed:

By analyzing viewer counts of a weekly program from week to week, a program producer can get an early indication of whether a program's viewership is trending up or down and then adjust accordingly.

By analyzing commercial viewing trends an advertiser can determine whether an ad has reached a saturation point and people tune away from the ad when they see it, this would suggest the need to run a different ad.

To further expand upon the second example, recognize that advertisers need to know both the audience reach and the viewing frequency of the ads they pay to air. In regard to audience reach, the advertisers want to know how many unique households or set-top boxes have been exposed to an ad. In regard to viewing frequency, the advertisers want to know how many times the household or set-top box has been exposed to the ad.

For audience reach, the Lead-In Analytics Engine 200 can identify at a set-top box (video asset viewing device) level how many unique set-top boxes have been exposed to an ad and the aggregate viewing seconds from those set-top boxes. As this information is tracked over a period of time, the advertiser gains valuable insight into the exposure of the ad and whether interest in the ad is diminishing.

For viewing frequency, the Lead-In Analytics Engine 200 can identify at a set-top box level each time that a set-top box views a particular ad or video asset along with the viewing time in seconds. This information could easily be written to a file and then loaded into a data warehouse in order to support queries showing how many times each set-top box viewed an ad. Along with the viewing counts such a system could also track viewing seconds to determine whether average viewing seconds are declining as ad exposure increases.

All of this could be done using anonymous and/or encrypted set-top box identifiers to protect viewer privacy.

Numerous additional metrics can readily be identified by those skilled in the art. Additionally, numerous additional uses for the metrics identified herein will be readily evident to those skilled in the art.

Other Ramifications

In today's world where the number of media viewing choices is vast, it is often difficult for the viewer to locate the content that he or she might be most interested in receiving. To assist in solving this problem, a content provider could develop viewing profiles that could then be used to suggest content to a viewer. Such profiles can be developed by tracking the viewing history of various groups of viewers. As an example, the Lead-In Analytics Engine 200 can produce metrics which identify the viewing behavior of various groups of people. Perhaps a lead-in video asset that represents a classic movie earns very high viewing rates with one group while a lead-in video asset that represents a mystery movie earns very high viewing rates with another group. Then a system could be setup to suggest candidate movies based on the viewer's viewing group so that a viewer in the first viewing group may be presented with a list of classic movie titles while a viewer in the second group would be presented with a list of mystery movies. The viewer is thus assisted in choosing content.

One can envision an embodiment of the Lead-In Analytics Engine 200 which runs on the set top box, with the viewer's permission, to perform second-by-second analysis of the viewing activity during a program. At the end of a program the Lead-In Analytics Engine 200 could analyze the viewer's activity related to that program. Based on that analysis, an interactive application could ask any number of questions to the viewer such as:

For Identifying Future Programs of Interest:

We noticed that you viewed the entire program. Would you like us to recommend similar programs in the future? Perhaps additional questions could be asked to identify what the viewer liked (the actor/actress, the genre, the setting, etc.) to assist in making viewing recommendations in the future.

For Product Information Requests:

We noticed that you are interested in outdoor programs. Would you like to have a product brochure for the (tent, cook stove, hiking boots, etc.) that were used by (actor name/actress name) sent to your home or email address?

We noticed that you are interested in gourmet cooking. Would you like to have a product brochure for the (brand name) cookware that (actor name/actress name) used on the program?

Actress (actress name) was wearing clothes from (clothing provider). Would you like to receive a coupon for 25% off on the line of clothing that (actress name) was wearing?

Actress (actress name) uses hair care products from (hair care product company). Would you like to receive a coupon for 25% off hair care products from (hair care product company)?

For Product Purchases:

We noticed that you are interested in outdoor programs. Would you like to purchase the (tent, cook stove, knife, etc.) that were used by (actor name/actress name)?

We noticed that you are interested in gourmet cooking. Would you like to purchase a set of the (brand name) cookware that (actor name/actress name) used on the program?

The soundtrack featured in this movie was an original creation. Would you like to purchase this soundtrack for only $1.95 on (music download service)?

In each of the above examples, by having a more complete understanding of what programs the viewer viewed, one could pose relevant marketing questions to the viewer. A set-top box marketing application could be structured around the increased understanding of what the viewer likes to watch.

Summary

I have shown numerous benefits produced by analyzing channel tuning data from a video asset viewing device connected to a network at a second-by-second level of granularity. I have also shown numerous benefits of tracking viewing during one or more lead-in periods and then correlating that with viewing during a target period. These viewing metrics meet pressing needs for detailed audience viewership information that is not presently available.

I claim:

1. A method comprising:

receiving, by a computing system and from a plurality of devices, a plurality of content-viewing events associated with output of a plurality of content assets by the plurality of devices during a period of time;

selecting, by the computing system, a pair of content-viewing events from the plurality of content-viewing events, based at least in part on a first time and a first device of the plurality of devices indicated by a first content-viewing event of the pair of content-viewing events, and a second time indicated by a second content-viewing event of the pair of content-viewing events;

determining, by the computing system, a plurality of intervals within the period of time, each interval of the plurality of intervals having an equal duration;

generating, by the computing system and based at least in part on the plurality of content-viewing events, a plurality of entries for storage in a database, wherein an entry of the plurality of entries associates the first device of the plurality of devices with an array of elements, wherein an element of the array of elements comprises a value indicating whether the first device outputted a first content asset of the plurality of content assets throughout a first interval of the plurality of intervals, wherein the element indicates a source from which the first content asset was received by the first device, and wherein the first interval is between the first time and the second time; and determining, by the computing system and based on the plurality of entries, a quantity of the plurality of devices that outputted:

the first content asset, of the plurality of content assets, before a second content asset, and a third content asset, of the plurality of content assets, after the second content asset.

2. The method of claim 1, wherein the element indicates the first content asset.

3. The method of claim 1, wherein the second content-viewing event is also associated with the first device.

4. The method of claim 1, wherein the second content-viewing event is associated with a second device, and the first device and the second device are both associated with at least one of a particular account, a particular household, or one or more particular viewers.

5. The method of claim 1, further comprising determining, by the computing system and based on the plurality of entries, a content-viewing metric indicating a correspondence between the first content asset of the plurality of content assets being outputted during a first portion of the period of time and the third content asset of the plurality of content assets being outputted during a second portion of the period of time, the second portion comprising a later portion of the period of time than the first portion.

6. The method of claim 5, wherein determining the content-viewing metric comprises:

determining a first group of elements from the arrays of elements in the plurality of entries, wherein each element of the first group of elements corresponds to the first content asset;

determining a second group of elements from the arrays of elements in the plurality of entries, wherein each element of the second group of elements corresponds to the third content asset; and determining a ratio of a number of elements in the first group of elements to a number of elements in the second group of elements.

7. The method of claim 6, wherein each element of the first group of elements is associated with the first device, and each element of the second group of elements is associated with the first device.

8. The method of claim 6, wherein:

each element of the first group of elements is determined to correspond to the first content asset based on determining that the element of the first group of elements comprises a value indicating that the first content asset was outputted during the first portion of the period of time; and each element of the second group of elements is determined to correspond to the third content asset based on determining that the element of the second group of elements comprises a value indicating that the third content asset was outputted during the second portion of the period of time.

9. The method of claim 8, wherein:

determining that the element of the first group of elements comprises a value indicating that the first content asset was outputted during the first portion of the period of time comprises determining that the element of the first group of elements comprises a value indicating the first content asset; and determining that the element of the second group of elements comprises a value indicating that the third content asset was outputted during the second portion of the period of time comprises determining that the element of the second group of elements comprises a value indicating the third content asset.

10. The method of claim 8, wherein:

determining that the element of the first group of elements comprises a value indicating that the first content asset was outputted during the first portion of the period of time comprises determining that the element of the first group of elements comprises a value indicating a source from which the first content asset was received; and determining that the element of the second group of elements comprises a value indicating that the third content asset was outputted during the second portion of the period of time comprises determining that the element of the second group of elements comprises a value indicating a source from which the third content asset was received.

11. The method of claim 6, wherein each element of the first group of elements is associated with the first device, and each element of the second group of elements corresponds to at least one of an account associated with the first device, a household associated with the first device, or a viewer associated with the first device.

12. A method comprising:

receiving, by a computing system and from a plurality of devices, log data indicating output of a plurality of content assets by the plurality of devices during a period of time;

determining, by the computing system, a plurality of intervals within the period of time, each interval of the plurality of intervals having an equal duration;

generating, by the computing system and based at least in part on the log data, a plurality of entries for storage in a database, wherein each entry of the plurality of entries corresponds to a device of the plurality of devices and comprises a plurality of values, and wherein each value of the plurality of values corresponds to an interval of the plurality of intervals and indicates one or more content assets of the plurality of content assets that the device outputted throughout the interval;

determining, by the computing system and based on the plurality of entries, a quantity of the plurality of devices that outputted both:

a first instance of an advertisement, of the plurality of content assets, and a second instance of the advertisement; and determining, by the computing system, a metric indicative of a comparison of the quantity of the plurality of devices that outputted both the first instance of the advertisement and the second instance of the advertisement to a quantity of the plurality of devices that outputted the first instance of the advertisement.

13. The method of claim 12, wherein the first instance of the advertisement references the second instance of the advertisement.

14. A method comprising:

receiving, by a computing system and from a plurality of devices, log data indicating output of a plurality of content assets by the plurality of devices during a period of time;

determining, by the computing system, a plurality of intervals within the period of time, each interval of the plurality of intervals having an equal duration;

generating, by the computing system and based at least in part on the log data, a plurality of entries for storage in a database, wherein each entry of the plurality of entries corresponds to a device of the plurality of devices and comprises a plurality of values, and wherein each value of the plurality of values corresponds to an interval of the plurality of intervals and indicates one or more content assets of the plurality of content assets that the device outputted throughout the interval;

determining, by the computing system and based on the plurality of entries, a quantity of the plurality of devices that outputted both a first content asset of the plurality of content assets and a second content asset of the plurality of content assets, wherein the first content asset comprises an episode in a series of episodic video content, and the second content asset comprises a subsequent episode in the series of episodic video content; and determining, by the computing system, a metric indicative of a comparison of the quantity of the plurality of devices that outputted both the first content asset and the second content asset to a quantity of the plurality of devices that outputted the first content asset.

15. The method of claim 14, wherein the log data comprises a plurality of content-viewing events associated with the output of a plurality of content assets by the plurality of devices.

16. The method of claim 14, wherein the metric measures an impact outputting the first content asset has on outputting the second content asset.

17. A method comprising:

receiving, by a computing system and from a plurality of devices, log data indicating output of a plurality of content assets by the plurality of devices during a period of time;

determining, by the computing system, a plurality of intervals within the period of time, each interval of the plurality of intervals having an equal duration;

generating, by the computing system and based at least in part on the log data, a plurality of entries for storage in a database, wherein each entry of the plurality of entries corresponds to a device of the plurality of devices and comprises a plurality of values, and wherein each value of the plurality of values corresponds to an interval of the plurality of intervals and indicates one or more content assets of the plurality of content assets that the device outputted throughout the interval;

determining, by the computing system and based on the plurality of entries, a quantity of the plurality of devices that outputted both:

a first content asset, of the plurality of content assets, preceding an advertisement, and a second content asset, of the plurality of content assets, following the advertisement; and determining, by the computing system, a ratio of the quantity of the plurality of devices that outputted both the first content asset and the second content asset to a quantity of the plurality of devices that outputted the first content asset.

18. The method of claim 17, wherein the log data comprises a plurality of content-viewing events associated with the output of the plurality of content assets by the plurality of devices.

19. The method of claim 17, further comprising determining, by the computing system, a ratio of the quantity of the plurality of devices that outputted both the first content asset and the second content asset to a quantity of the plurality of devices that outputted the second content asset.

20. The method of claim 17, further comprising determining, by the computing system and based on the plurality of entries, a quantity of the plurality of devices that outputted both the advertisement and the second content asset following the advertisement.

21. A method comprising:

receiving, by a computing system and from a plurality of devices, log data indicating output of a plurality of content assets by the plurality of devices during a period of time;

determining, by the computing system, a plurality of intervals within the period of time, each interval of the plurality of intervals having an equal duration;

generating, by the computing system and based at least in part on the log data, a plurality of entries for storage in a database, wherein each entry of the plurality of entries corresponds to a device of the plurality of devices and comprises a plurality of values, and wherein each value of the plurality of values corresponds to an interval of the plurality of intervals and indicates one or more content assets of the plurality of content assets that the device outputted throughout the interval;

determining, by the computing system and based on the plurality of entries, a quantity of the plurality of devices that outputted both a first content asset of the plurality of content assets and a second content asset of the plurality of content assets, wherein the first content asset comprises an advertisement for a provider, and the second content asset comprises a different advertisement for the provider; and determining, by the computing system, a ratio of the quantity of the plurality of devices that outputted both the first content asset and the second content asset to a quantity of the plurality of devices that outputted the second content asset.

22. The method of claim 21, further comprising:

populating an entry of a plurality of entries corresponding to a first device of the plurality of devices with a value based on a determination of one or more content assets of the plurality of content assets that the first device outputted throughout a corresponding interval.

23. The method of claim 21, further comprising determining, by the computing system, a ratio of the quantity of the plurality of devices that outputted both the first content asset and the second content asset to a quantity of the plurality of devices that outputted the first content asset.

24. A method comprising:

receiving, by a computing system and from a plurality of video-processing devices, log data indicating that media segments were outputted by the plurality of video-processing devices over a period of time;

determining, by the computing system, a plurality of intervals within the period of time, each interval having an equal duration;

generating, by the computing system and based at least in part on the log data, a plurality of records for storage in a database, wherein each record of the plurality of records indicates a video-processing device and comprises a plurality of elements, and wherein each element of the plurality of elements corresponds to an interval of the plurality of intervals and indicates whether the video-processing device outputted a media segment of the media segments throughout the interval;

determining, by the computing system and based on the plurality of records, that a portion of the plurality of video-processing devices outputted a first media segment and an advertisement associated with the first media segment;

determining, by the computing system and based on the plurality of records, a ratio of a quantity of video-processing devices in the portion of the plurality of video-processing devices that outputted the first media segment and the advertisement associated with the first media segment to:

a quantity of video-processing devices that outputted the first media segment, or a quantity of video-processing devices that outputted the advertisement associated with the first media segment;

determining that a video-processing device of the plurality of video-processing devices associated with a user outputted the advertisement associated with the first media segment; and determining that a different video-processing device of the plurality of video-processing devices associated with the user outputted the first media segment.

25. The method of claim 24, wherein the advertisement references the first media segment.

26. A method comprising:

receiving, by a computing system and from a plurality of devices, log data indicating that a plurality of users caused a plurality of media segments to be outputted during a period of time;

determining, by the computing system, a plurality of intervals within the period of time, each interval having an equal duration;

generating, by the computing system and based at least in part on the log data, a plurality of records for storage in a database, wherein each record of the plurality of records comprises a plurality of elements, wherein each element of the plurality of elements indicates whether a user of the plurality of users caused a media segment of the plurality of media segments to be outputted throughout one of the intervals of the plurality of intervals, and wherein an element of the plurality of elements indicates a source from which the media segment was received by a device of the plurality of devices and associated with a first user; and determining, by the computing system and based on the plurality of records, that the first user of the plurality of users caused a first media segment of the plurality of media segments to be outputted by the device of the plurality of devices and associated with the first user and caused a second media segment to be outputted by a different device of the plurality of devices and associated with the first user.

27. The method of claim 26, wherein the second media segment comprises an advertisement associated with a provider, and wherein the first media segment comprises a different advertisement associated with the provider.

28. The method of claim 26, wherein the second media segment comprises an advertisement for the first media segment.

29. A method comprising:

receiving, by a computing system and from a plurality of devices, log data indicating that each of a plurality of devices outputted at least one of a first content asset or a second content asset during a period of time;

determining, by the computing system, a plurality of intervals within the period of time, each interval having an equal duration;

generating, by the computing system and based at least in part on the log data, a plurality of records for storage in a database, wherein each record of the plurality of records comprises a plurality of elements, and wherein each element of the plurality of elements indicates whether the first content asset or the second content asset was outputted throughout one of the intervals of the plurality of intervals;

determining, by the computing system and based on the plurality of records, a ratio of a quantity of the plurality of devices that outputted the second content asset to a quantity of devices that outputted the first content asset, wherein each device of the plurality of devices is associated with one of a premises associated with a device that outputted the first content asset, an account associated with a device that outputted the first content asset, or a viewer associated with a device that outputted the first content asset; and determining, by the computing system and based on the plurality of records, a ratio of a second quantity of the plurality of devices that outputted both the first content asset and the second content asset to the quantity of devices that outputted the first content asset.

30. The method of claim 29, wherein generating the plurality of records based at least in part on the log data comprises:

creating, by the computing system, a first record of the plurality of records associating a first device with a first plurality of elements;

determining, by the computing system, whether the first device outputted a content asset throughout a first interval of the plurality of intervals; and populating a first element of the first plurality of elements with a value based on the determining whether the first device outputted the content asset throughout the first interval.

31. The method of claim 30, wherein the first element indicates the content asset.

32. The method of claim 30, wherein the first element indicates a source from which the content asset was received by the first device.

33. The method of claim 29, wherein the log data comprises a plurality of content-viewing events associated with the output of a plurality of content assets by the plurality of devices.

34. The method of claim 29, wherein the first content asset comprises content referencing the second content asset.

* * * * *

UNITED STATES PATENT AND TRADEMARK OFFICE

CERTIFICATE OF CORRECTION

PATENT NO. : 10,089,592 B2
APPLICATION NO. : 13/360704
DATED : October 2, 2018
INVENTOR(S) : Robert Alan Orlowski It is certified that error appears in the above-identified patent and that said Letters Patent is hereby corrected as shown below:

In the Specification

Column 1, Cross-Reference to Related Applications, Line 17:
Delete "ATA" and insert --AT A--

Column 5, Background Information, Line 17:
Delete "Fourth Wall" and insert --FourthWall--

Column 18, Definitions, Line 11:
Delete "FIG." and insert --FIGS.--

Column 18, Definitions, Line 22:
After "means", delete "means"

Column 18, Definitions, Line 35:
After "means", delete "means"

Column 23, Detailed Description of the Drawings, Line 39:
Delete "13-2120" and insert --i3-2120--

Column 24, Detailed Description of the Drawings, Line 35:
Delete "FIG." and insert --FIGS.--

Column 24, Detailed Description of the Drawings, Line 47:
Delete "viewng" and insert --viewing--

Column 25, Detailed Description of the Drawings, Line 29:
After "the", delete "the"

Signed and Sealed this
Ninth Day of April, 2019

Andrei Iancu
*Director of the United States Patent and Trademark Office*

Column 34, Detailed Description of the Drawings, Line 1:
After “the”, delete “the”

Column 34, Detailed Description of the Drawings, Line 51:
After “the”, delete “the”

Column 35, Detailed Description of the Drawings, Line 32:
After “an”, delete “an”

Column 35, Detailed Description of the Drawings, Line 33:
After “the”, delete “the”

Column 35, Detailed Description of the Drawings, Line 65:
After “the”, delete “the”

Column 36, Detailed Description of the Drawings, Line 30:
After “of”, delete “of”

Column 37, Detailed Description of the Drawings, Line 40:
After “the”, delete “the”

Column 39, Detailed Description of the Drawings, Line 51:
After “an”, delete “an”

Column 39, Detailed Description of the Drawings, Line 52:
After “the”, delete “the”

Column 40, Detailed Description of the Drawings, Line 17:
After “the”, delete “the”

Column 41, Detailed Description of the Drawings, Line 8:
After “the”, delete “the”

Column 45, Detailed Description of the Drawings, Line 54:
After “the”, delete “the”

Column 48, Detailed Description of the Drawings, Line 37:
After “the”, delete “the”

Column 48, Detailed Description of the Drawings, Line 52:
Delete “the” and insert --there--

Column 57, Detailed Description of the Drawings, Line 48:
Delete “Analytic” and insert --Analytics--

Column 58, Detailed Description of the Drawings, Line 34:
Delete “Analytic” and insert --Analytics--

Column 65, Detailed Description of the Drawings, Line 67:
After “device”, delete “device”

Column 69, Detailed Description of the Drawings, Line 41:
After “data”, delete “data”

Column 69, Detailed Description of the Drawings, Line 45:
After “constructs.”, insert --¶--

Column 69, Detailed Description of the Drawings, Line 46:
After “data”, delete “data”

Column 69, Detailed Description of the Drawings, Line 46:
After “being”, delete “being”

Column 69, Detailed Description of the Drawings, Line 50:
After “data”, delete “data”

Column 69, Detailed Description of the Drawings, Line 55:
After “data”, delete “data”